US009906164B2

(12) United States Patent
Tamura et al.

(10) Patent No.: US 9,906,164 B2
(45) Date of Patent: Feb. 27, 2018

(54) POWER CONVERSION SYSTEM

(71) Applicant: Hitachi Automotive Systems, Ltd., Hitachinaka-shi, Ibaraki (JP)

(72) Inventors: Hiroshi Tamura, Tokyo (JP); Takeshi Matsuo, Hitachinaka (JP); Hiroyuki Yamada, Hitachinaka (JP); Nobuhiro Akasaka, Hitachinaka (JP); Sho Yaegaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/115,275

(22) PCT Filed: Dec. 8, 2014

(86) PCT No.: PCT/JP2014/082356
§ 371 (c)(1),
(2) Date: Jul. 29, 2016

(87) PCT Pub. No.: WO2015/118767
PCT Pub. Date: Aug. 13, 2015

(65) Prior Publication Data
US 2017/0005591 A1 Jan. 5, 2017

(30) Foreign Application Priority Data

Feb. 6, 2014 (JP) .................................. 2014-020898

(51) Int. Cl.
*H02M 7/537* (2006.01)
*B60L 11/12* (2006.01)
(Continued)

(52) U.S. Cl.
CPC .............. *H02M 7/537* (2013.01); *B60L 3/00* (2013.01); *B60L 9/18* (2013.01); *B60L 11/12* (2013.01);
(Continued)

(58) Field of Classification Search
CPC .. H02P 6/10; H02P 8/18; H02P 27/06; H02M 7/42; H02M 7/48; H02M 7/525; H02M 7/797
(Continued)

(56) References Cited

U.S. PATENT DOCUMENTS 5,416,686 A    5/1995  Azuma et al.
8,624,534 B2 * 1/2014  Iwatsuki ................... H02P 6/10
                                                318/400.17
(Continued)

FOREIGN PATENT DOCUMENTS

JP    6-339279 A     12/1994
JP    2005-328669 A  11/2005
(Continued)

OTHER PUBLICATIONS

International Search Report (PCT/ISA/210) issued in PCT Application No. PCT/JP2014/082356 dated Mar. 17, 2015, with English trans (two (2) pages).

*Primary Examiner* — Kyle J Moody
(74) *Attorney, Agent, or Firm* — Crowell & Moring LLP

(57) ABSTRACT

A surge according to a change of a switching state can be reduced without increasing a torque ripple of a motor. A first switching signal to control switching of a boost converter is generated on the basis of a comparison of a first duty command value and a first triangular wave carrier of the boost converter. A second switching signal to control switching of an inverter is generated on the basis of a comparison of a second duty command value and a second triangular wave carrier of the inverter. In addition, the second triangular wave carrier is generated such that a frequency of the second triangular wave carrier becomes equal to a frequency of the first triangular wave carrier and a phase of the second (Continued)

triangular wave carrier is different from a phase of the first triangular wave carrier by 180 degrees.

12 Claims, 27 Drawing Sheets

(51) Int. Cl.
    *B60L 11/14*     (2006.01)
    *B60L 15/00*     (2006.01)
    *B60L 15/02*     (2006.01)
    *H02M 1/14*     (2006.01)
    *H02M 7/797*     (2006.01)
    *H02P 29/50*     (2016.01)
    *B60L 3/00*     (2006.01)
    *B60L 9/18*     (2006.01)
    *H02P 27/06*     (2006.01)
    *H02M 7/48*     (2007.01)
    *H02P 27/08*     (2006.01)
    *H02P 8/18*     (2006.01)
    *H02P 6/10*     (2006.01)
    *H02M 1/00*     (2006.01)
    *H02P 5/74*     (2006.01)

(52) U.S. Cl.
CPC ............ *B60L 11/14* (2013.01); *B60L 15/007* (2013.01); *B60L 15/025* (2013.01); *H02M 1/14* (2013.01); *H02M 7/48* (2013.01); *H02M 7/797* (2013.01); *H02P 27/06* (2013.01); *H02P 27/08* (2013.01); *H02P 29/50* (2016.02); *B60L 2210/14* (2013.01); *B60L 2210/30* (2013.01); *B60L 2210/40* (2013.01); *B60L 2240/526* (2013.01); *B60L 2240/527* (2013.01); *B60L 2240/529* (2013.01); *H02M 2001/007* (2013.01); *H02M 2001/008* (2013.01); *H02P 5/74* (2013.01); *H02P 6/10* (2013.01); *H02P 8/18* (2013.01); *Y02T 10/643* (2013.01); *Y02T 10/7022* (2013.01); *Y02T 10/7077* (2013.01); *Y02T 10/7225* (2013.01); *Y02T 10/7241* (2013.01)

(58) Field of Classification Search
    USPC .................................. 363/132, 41, 56.02, 39
    See application file for complete search history.

(56) References Cited

U.S. PATENT DOCUMENTS

| | | | |
|---|---|---|---|
| 9,467,087 B2 * | 10/2016 | Kondo | ................. H02P 27/085 |
| 2012/0075900 A1 | 3/2012 | Nakagawa | |
| 2016/0204698 A1 * | 7/2016 | Yuzurihara | ......... H02M 3/1582 |
| | | | 363/132 |
| 2016/0280076 A1 * | 9/2016 | Yaegaki | .................... B60L 3/00 |

FOREIGN PATENT DOCUMENTS

| | | |
|---|---|---|
| JP | 2011-160570 A | 8/2011 |
| WO | WO 2010/143514 A1 | 12/2010 |

* cited by examiner

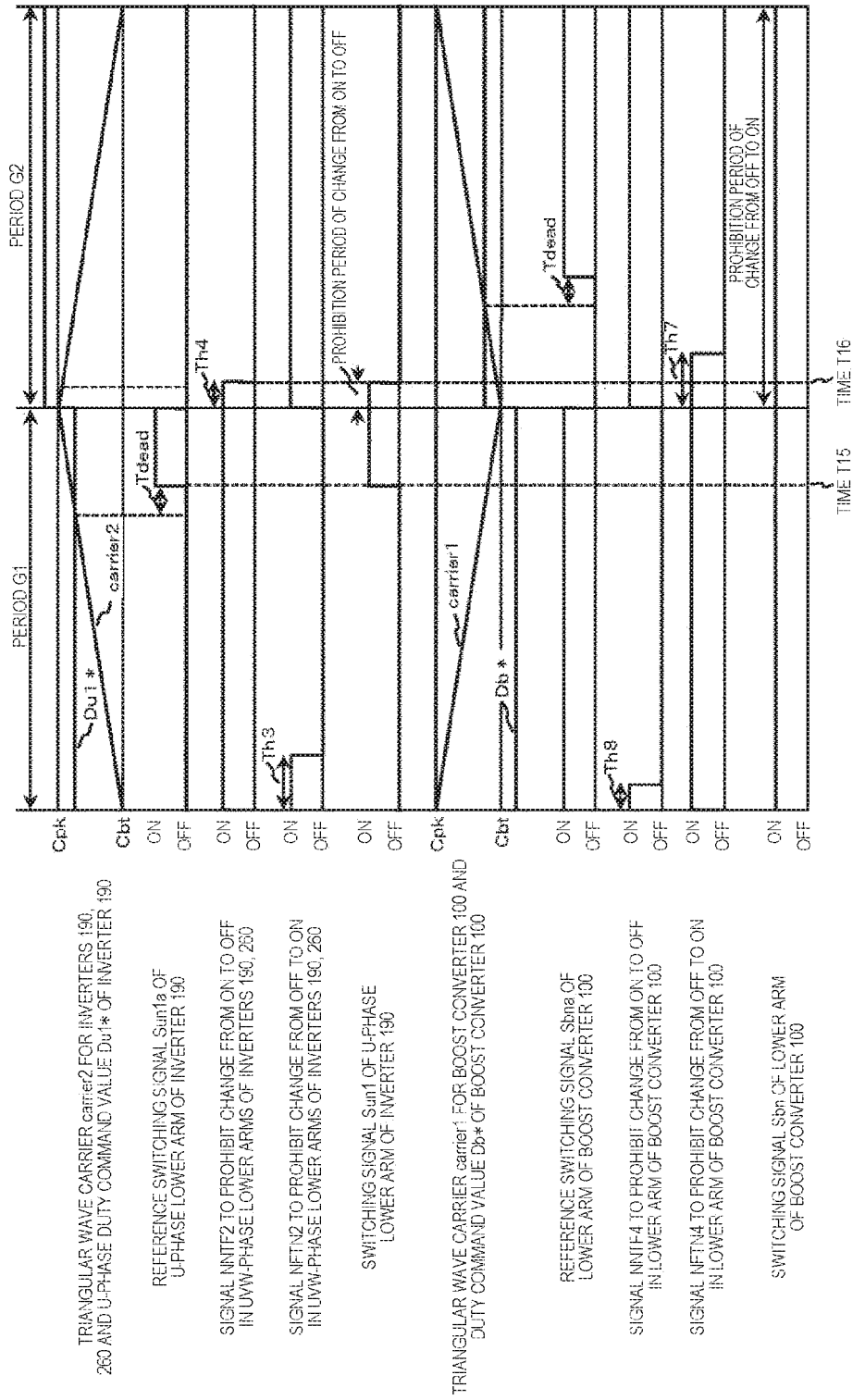

POWER CONVERSION SYSTEM

TECHNICAL FIELD

The present invention relates to an in-vehicle power-conversion system and particularly, to a power conversion system using a boost converter and an inverter.

BACKGROUND ART

An in-vehicle power conversion device using a boost converter to boost direct-current power and an inverter to convert the direct-current power output by the boost converter into alternating-current power is known. Each of the boost converter and the inverter controls power by a switching operation of each switching element.

In the power conversion device, there is a problem in that a surge voltage generated by the boost converter and the inverter increases according to a change of a switching state. PTL 1 describes the invention in which a switching control signal input to the inverter is corrected such that change timing of a switching state of the boost converter and change timing of a switching state of the inverter are not overlapped.

CITATION LIST

Patent Literature

PTL 1: Japanese Patent Application Laid-Open (JP-A) No. 2011-160570

SUMMARY OF INVENTION

Technical Problem

However, according to a method described in PTL 1, the frequency of prohibiting an output of a change command of the switching state to the switching element of the inverter over a predetermined period in synchronization with a change command of the switching state of the switching element, of the boost converter becomes high. That is, because distortion of an output voltage of the inverter increases according to correction of a control signal input to the inverter, a torque ripple of a motor increases and ride comfort of a vehicle is deteriorated.

An object of the present invention is to reduce a surge according to a change of a switching state without increasing a torque ripple of a motor.

Solution to Problem

To resolve the above problems, configurations described in claims are adopted. The present application includes a plurality of solutions to resolve the above problems, for example, a power conversion system, including: a boost converter which converts direct-current power into direct-current power having a different voltage value; an inverter which converts the direct-current power converted by the boost converter into alternating-current, power and outputs the alternating-current power to a motor; and a control device which controls a switching operation of the boost converter and a switching operation of the inverter; wherein the control device has a switching signal generation unit which generates a first switching signal to control switching of an upper arm of the boost converter and a second switching signal to control switching of an upper arm of each phase of the inverter, the switching signal generation unit generates the first switching signal, on the basis of a comparison of a first duty command value calculated on the basis of an output voltage command of the boost converter and a first triangular wave carrier, the switching signal generation unit generates the second switching signal, on the basis of a comparison of a second duty command value calculated on the basis of a torque command and a rotation speed of the motor and a second triangular wave carrier, and the second triangular wave carrier is generated such, that a frequency of the second triangular wave carrier becomes equal to a frequency of the first triangular wave carrier and a phase of the second triangular wave carrier is different from a phase of the first triangular wave carrier by 180 degrees.

Advantageous Effects of Invention

According to a power conversion device of the present invention, a surge according to a change of a switching state can be reduced without increasing a torque ripple of a motor.

BRIEF DESCRIPTION OF DRAWINGS

FIG. 3 illustrates a process sequence of a UVW-phase duty command update unit 610 of an inverter.

FIG. 29 is a diagram illustrating a third example of waveforms of a switching signal Sun1 of a U-phase lower arm of an inverter and a switching signal Sbn of a lower arm of a boost converter.

DESCRIPTION OF EMBODIMENTS

Hereinafter, embodiments of the present invention will be described using the drawings.

First Embodiment

Figure 1:
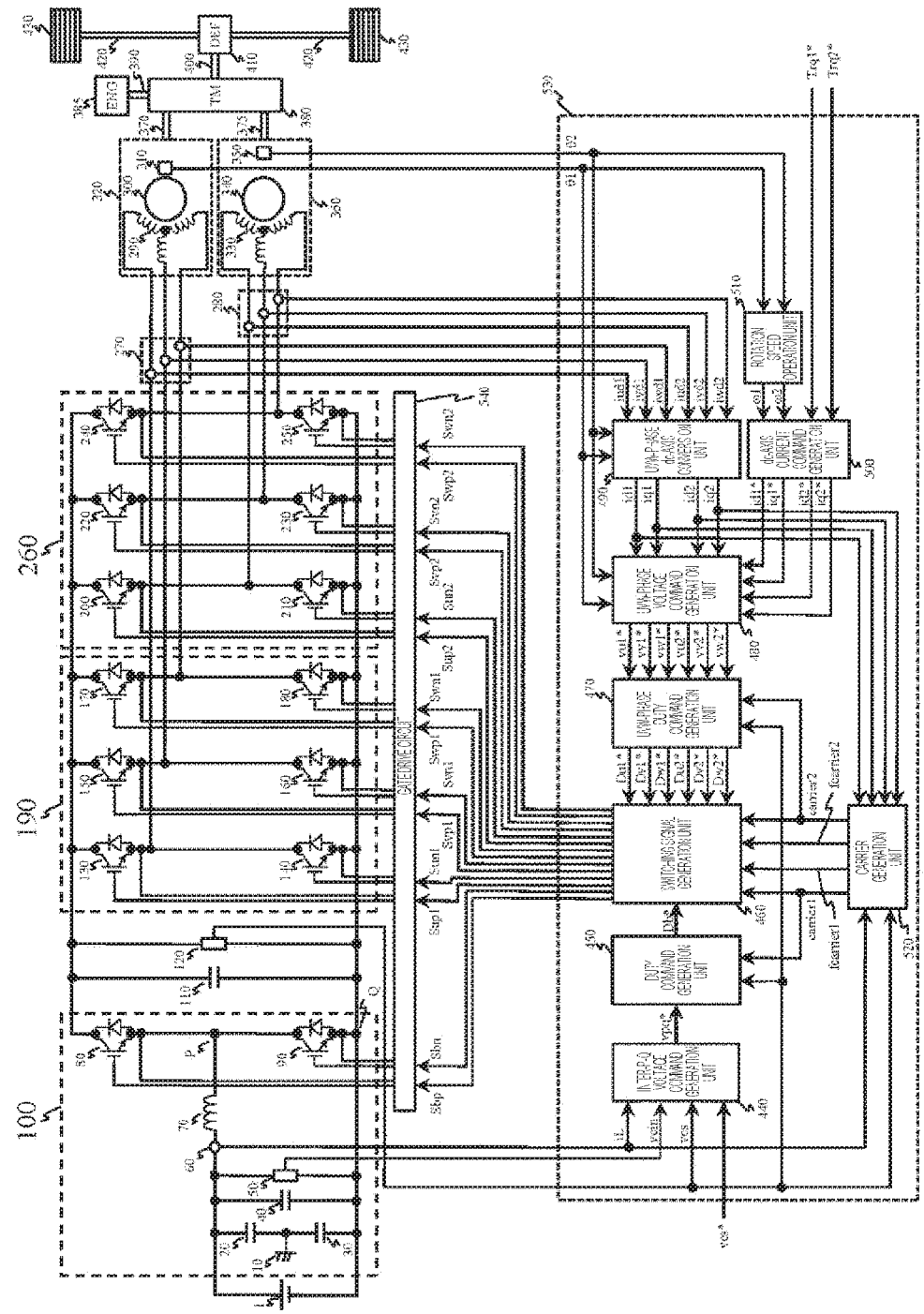
FIG. 1 is a diagram illustrating a power conversion system according to this embodiment.

FIG. 1 is a diagram illustrating a power conversion system according to a first embodiment of this embodiment. The power conversion system according to this embodiment includes a battery 1, a boost converter 100, inverters 190 and 260, a smoothing capacitor 110, a voltage sensor 120, current sensors 270 and 280, a control device 530, and a gate drive circuit 540. The control device 530 controls switching of a switching element of the boost converter 100, a switching element of the inverter 190, and a switching element of the inverter 260. The gate drive circuit 540 generates a gate voltage of the switching elements of the boost converter 100 and the inverters 190 and 260, on the basis of a switching signal generated by the control device 530.

A primary side of the boost converter 100 is connected to the battery 1. A secondary side of the boost converter 100 is connected to the smoothing capacitor 110. The voltage sensor 120 is connected in parallel to the smoothing capacitor 110. The voltage sensor 120 detects a voltage value of both ends of the smoothing capacitor 110. The voltage sensor 120 is configured by combining a division resistor and a non-inversion amplification circuit using an operational amplifier. As the battery 1, a nickel-hydrogen battery or a lithium-ion battery is used.

A direct-current side of each of the inverters 190 and 260 is connected to the smoothing capacitor 110. A three-phase alternating-current side of the inverter 190 is connected to a three-phase winding 290 wound around a stator of a motor generator 320. A three-phase, alternating-current side of the inverter 260 is connected to a three-phase winding 330 wound around a stator of a motor generator 360.

The motor generator 320 generates a rotation magnetic field by a three-phase alternating current flowing to the three-phase winding 290 wound around the stator, accelerates or decelerates a rotor 300 by the generated rotation magnetic field, and generates a torque of the motor generator 320. The generated torque of the motor generator 320 is transmitted to a transmission 380 via a motor generator shaft 370. Similar to the motor generator 320, the motor generator 360 generates a rotation magnetic field by a three-phase alternating current flowing to the three-phase winding 330 wound around the stator, accelerates or decelerates a rotor 340 by the generated rotation magnetic field, and generates a torque of the motor generator 360. The generated torque of the motor generator 360 is transmitted to the transmission 380 via a motor generator shaft 375. Each of the motor generators 320 and 360 installed in a vehicle preferably use a permanent magnet motor having a small size, high efficiency, and a high output. However, each of the motor generators 320 and 360 may be an induction motor.

An engine 385 controls intake, compression, explosion, and exhaust of a fuel, according to a torque command of the engine 385 received from a vehicle control device (not illustrated in the drawings), and generates a torque of the engine 385. The generated torque of the engine 385 is transmitted to the transmission 380 via a crank shaft 390. The transmission 380 transmits an addition torque of the transmitted torques of the motor generators 320 and 360 and the transmitted torque of the engine 385 to a differential gear 410 via a propeller shaft 400. The differential gear 410 converts the torque transmitted from the transmission 380 into a drive shaft torque and transmits the drive shaft torque to a drive shaft 420. The drive shaft 420 accelerates or decelerates rotation of drive wheels 430 of the vehicle by the transmitted drive shaft torque and accelerates or decelerates the vehicle (not illustrated in the drawings).

The motor generator 320 converts the torque of the engine 385 transmitted to the motor generator shaft 370 via the transmission 380 into power and charges the battery 1 with the converted power via the inverter 190 and the boost converter 100. Alternatively, the power can be supplied to the motor generator 360 via the inverter 190 and the inverter 260. In addition, the motor generator 320 can convert rotation energy of the drive wheels 430 transmitted to the motor generator shaft 370 via the drive shaft 420, the differential gear 410, the propeller shaft 400, and the transmission 380 in this order into power and charge the battery 1 with the converted power via the inverter 190 and the boost converter 100. Similar to the motor generator 320, the motor generator 360 converts the torque of the engine 385 transmitted to the motor generator shaft 375 via the transmission 380 into power and charges the battery 1 with the converted power via the inverter 260 and the boost converter 100. Alternatively, the power can be supplied to the motor generator 320 via the inverter 260 and the inverter 190. In addition, the motor generator 360 can convert rotation energy of the drive wheels 430 transmitted to the motor generator shaft 375 via the drive shaft 420, the differential gear 410, the propeller shaft 400, and the transmission 380 in this order into power and charge the battery 1 with the converted power via the inverter 260 and the boost converter 100.

A mode in which power is supplied from the battery 1 to the motor generators 320 and 360 via the boost converter 100 and the inverters 190 and 260 is defined as a power running mode and a mode in which the battery 1 is charged with power generated by the motor generators 320 and 360 via the inverters 190 and 260 and the boost converter 100 is defined as a regeneration mode. To realize low fuel consumption, a hybrid vehicle uses the power running mode maximally when a vehicle starts or is accelerated and uses the regeneration mode maximally when the vehicle is decelerated.

The boost converter 100 according to this embodiment includes Y capacitors 20 and 30, a chassis ground 10, a filter capacitor 40, a voltage sensor 50, a current, sensor 60, a reactor 70, a switching element 80 of an upper arm, and a switching element 90 of a lower arm. Each of the switching elements 80 and 90 is configured using an insulated gate bipolar transistor (IGBT) and a diode.

A high potential side of the Y capacitor 20 is connected to a high potential side of the battery 1, a high potential side of the filter capacitor 40, and one end of the voltage sensor 50 and is connected to one end of the reactor 70 via the current sensor 60. A low potential side, of the Y capacitor 20 is connected to the chassis ground 10 and a high potential side of the Y capacitor 30. A low potential side of the Y capacitor 30 is connected to a low potential side of the battery 1, a low potential side, of the filter capacitor 40, the other end of the voltage sensor 50, and an emitter side of an IGBT and an anode side of a diode configuring the switching element 90 of the lower arm of the boost converter 100. A collector side of the IGBT and a cathode side of the diode configuring the switching element 90 of the lower arm of the boost converter 100 are connected to an emitter side of an IGBT and an anode side of a diode configuring the switching element 80 of the upper arm of the boost converter 100 and a center point where these elements are connected and the other end of the reactor 70 are connected to each other. In addition, a collector side of the IGBT and a cathode side of the diode configuring the switching element 80 of the upper arm of the boost converter 100 are connected to a high potential side of the smoothing capacitor 110 and the emitter side of the IGBT and the anode side of the diode configuring the switching element 90 of the lower arm of the boost converter 100 are connected to a low potential side of the smoothing capacitor 110.

The inverter 190 according to this embodiment has switching elements 130 and 140 of U-phase upper and lower arms, switching elements 150 and 160 of V-phase upper and lower arms, and switching elements 170 and 180 of W-phase upper and lower arms.

An emitter side of an IGBT and an anode side of a diode configuring the switching element 130 of the U-phase upper arm of the inverter 190 are connected to a collector side of an IGBT and a cathode side of a diode configuring the switching element 140 of the U-phase lower arm of the inverter 190 and a center point where these elements are connected is connected to a U-phase winding of the three-phase winding 290 of the motor generator 320 via the current sensor 270.

An emitter side of an IGBT and an anode side of a diode configuring the switching element 150 of the V-phase upper arm of the inverter 190 are connected to a collector side of an IGBT and a cathode side of a diode configuring the switching element 160 of the V-phase lower arm of the inverter 190 and a center point where these elements are connected is connected to a V-phase winding of the three-phase winding 290 of the motor generator 320 via the current sensor 270.

An emitter side of an IGBT and an anode side of a diode configuring the switching element 170 of the W-phase upper arm of the inverter 190 are connected to a collector side of an IGBT and a cathode side of a diode configuring the switching element 180 of the W-phase lower arm of the inverter 190 and a center point where these elements are connected is connected to a W-phase winding of the three-phase winding 290 of the motor generator 320 via the current sensor 270.

The collector sides of the IGBTs and the cathode sides of the diodes configuring the switching elements 130, 150, and 170 of the UVW-phase upper arms of the inverter 190 are connected to the high potential side of the smoothing capacitor 110. The emitter sides of the IGBTs and the anode sides of the diodes configuring the switching elements 140, 160, and 180 of the UVW-phase lower arms of the inverter 190 are connected to the low potential side of the smoothing capacitor 110.

The inverter 260 according to this embodiment has switching elements 200 and 210 of U-phase upper and lower arms, switching elements 220 and 230 of V-phase upper and lower arms, and switching elements 240 and 250 of W-phase upper and lower arms.

An emitter side of an IGBT and an anode side of a diode configuring the switching element 200 of the U-phase upper arm of the inverter 260 are connected to a collector side of an IGBT and a cathode side of a diode configuring the switching element 210 of the U-phase lower arm of the inverter 260 and a center point where these elements are connected is connected to a U-phase winding of the three-phase winding 330 of the motor generator 360 via the current sensor 280.

An emitter side of an IGBT and an anode side of a diode configuring the switching element 220 of the V-phase upper arm of the inverter 260 are connected to a collector side of an IGBT and a cathode side of a diode configuring the switching element 230 of the V-phase lower arm of the inverter 260 and a center point where these elements are connected is connected to a V-phase winding of the three-phase winding 330 of the motor generator 360 via the current sensor 280.

An emitter side of an IGBT and an anode side of a diode configuring the switching element 240 of the W-phase upper arm of the inverter 260 are connected to a collector side of an IGBT and a cathode side of a diode configuring the switching element 250 of the W-phase lower arm of the inverter 260 and a center point where these elements are connected is connected to a W-phase winding of the three-phase winding 330 of the motor-generator 360 via the current sensor 280.

The collector sides of the IGBTs and the cathode sides of the diodes configuring the switching elements 200, 220, and 240 of the UVW-phase upper arms of the inverter 260 are connected to the high potential side of the smoothing capacitor 110. The emitter sides of the IGBTs and the anode sides of the diodes configuring the switching elements 210, 230, and 250 of the UVW-phase lower arms of the inverter 260 are connected to the low potential side of the smoothing capacitor 110.

In addition, each of the switching elements 80 and 90 of the boost converter 100, the switching elements 130, 140, 150, 160, 170, and 180 of the inverter 190, and the switching elements 200, 210, 220, 230, 240, and 250 of the inverter 260 may be configured using a MOSFET.

The control device 530 has an inter-P-Q voltage command generation unit 440 of the boost converter 100, a duty command generation unit 450 of the boost converter 100, a switching signal generation unit 460, a UVW-phase duty command generation unit 470 of the inverters 190 and 260, a UVW-phase voltage command generation unit 480 of the inverters 190 and 260, a UVW-phase dq-axis conversion unit 490, a dq-axis current command generation unit 500, a rotation speed operation unit 510, and a carrier generation unit 520.

The UVW-phase dq-axis conversion unit 490 calculates dq-axis current values $id1$ and $iq1$ of the motor generator 320, on the basis of UVW-phase current values $iud1$, $ivd1$, and $iwd1$ detected by the current sensor 270 and flowing to the three-phase winding 290 of the motor generator 320 and a magnetic pole position $\theta1$ of the rotor 300 of the motor generator 320 detected by an angle detector 310. In addition, the UVW-phase dq-axis conversion unit 490 calculates dq-axis current values id2 and iq2 of the motor generator 360, on the basis of UVW-phase current values iud2, ivd2, and iwd2 detected by the current sensor 280 and flowing to the three-phase winding 330 of the motor generator 360 and a magnetic pole position θ2 of the rotor 340 of the motor generator 360 detected by an angle detector 350. The calculated dq-axis current values id1, iq1, id2, and iq2 are input to the UVW-phase voltage command generation unit 480 of the inverters 190 and 260 and the carrier generation unit 520. As the angle detectors 310 and 350, a resolver or an encoder is used.

The rotation speed operation unit 510 calculates a rotation speed ω1 of the rotor 300 of the motor generator 320, on the basis of the magnetic pole position θ1 of the rotor 300 of the motor generator 320 detected by the angle detector 310. In addition, the rotation speed operation unit 510 calculates a rotation speed ω2 of the rotor 340 of the motor generator 360, on the basis of the magnetic pole position θ2 of the rotor 340 of the motor generator 360 detected by the angle detector 350. The calculated rotation speeds ω1 and ω2 are input to the dq-axis current command generation unit 500.

The dq-axis current command generation unit 500 generates dq-axis current command values id1* and iq1* of the motor generator 320, on the basis of a torque command Trq1* of the motor generator 320 received from a vehicle control device (not illustrated in the drawings) and the rotation speed ω1 calculated by the rotation speed operation unit 510. In addition, the dq-axis current command generation unit 500 generates dq-axis current command values id2* and iq2* of the motor generator 360, on the basis of a torque command Trq2* of the motor generator 360 received from the vehicle control device (not illustrated in the drawings) and the rotation speed ω2 calculated by the rotation speed operation unit 510. The generated dq-axis current command values id1*, iq1*, id2*, and iq2* are input to the UVW-phase voltage command generation unit 480 of the inverters 190 and 260.

The UVW-phase voltage command generation unit 480 generates UVW-phase voltage command values vu1*, vv1*, and vw1* of the inverter 190, such that the dq-axis current values id1 and iq1 are matched with the dq-axis current command values id1* and iq1*, on the basis of the magnetic pole position θ81 detected by the angle detector 310, the dq-axis current values id1 and iq1 calculated by the UVW-phase dq-axis conversion unit 490, and the dq-axis current command values id1* and iq1* generated by the dq-axis current command generation unit 500. In addition, the UVW-phase voltage command generation unit 480 generates UVW-phase voltage command values vu2*, vv2*, and vw2* of the inverter 260, such that the dq-axis current values id2 and iq2 are matched with the dq-axis current command values id2* and iq2*, on the basis of the magnetic pole position θ2 detected by the angle detector 350, the dq-axis current values id2 and iq2 calculated by the UVW-phase dq-axis conversion unit 490, and the dq-axis current command values id2* and iq2* generated by the dq-axis current command generation unit 500. The generated UVW-phase voltage command values vu1*, vv1*, vw1*, vu2*, vv2*, and vw2* are input to the UVW-phase duty command generation unit 470.

The inter-P-Q voltage command generation unit 440 generates a command value vpq* (hereinafter, referred to as an inter-P-Q voltage command value vpq*) of a voltage applied between a point P where the other end of the reactor 70 and the switching elements 80 and 90 of the upper and lower arms of the boost converter 100 are connected and a point Q where the low potential side of the battery 1 and the emitter side of the IGBT and the anode side of the diode configuring the switching element 90 of the lower arm of the boost converter 100 are connected, such that a voltage value vcs of both ends of the smoothing capacitor 110 is matched with an output voltage command vcs* of the boost converter 100, on the basis of the output voltage command vcs* of the boost converter 100 received from, the vehicle control device (not illustrated in the drawings), a current value iL detected by the current sensor 60 and flowing to the reactor 70, a voltage value vcin of both ends of the filter capacitor 40 detected by the voltage sensor 50, and the voltage value vcs of both ends of the smoothing capacitor 110 detected by the voltage sensor 120. The generated inter-P-Q voltage command value vpq* is input to the duty command generation unit 450 of the boost converter 100.

The carrier generation unit 520 generates a carrier frequency fcarrier1 for the boost converter 100, a triangular wave carrier carrier1 for the boost converter 100, a carrier frequency fcarrier2 for the inverters 190 and 260, and a triangular wave carrier carrier2 for the inverters 190 and 260, on the basis of the voltage value vcs of both ends of the smoothing capacitor 110 detected by the voltage sensor 120, the current value iL detected by the current sensor 60 and flowing to the reactor 70, and the dq-axis current values id1, iq1, id2, and iq2 calculated by the UVW-phase dq-axis conversion unit 450. The generated triangular wave carrier carrier1 for the boost converter 100 is input to the duty command generation unit 450 and the switching signal generation unit 460. The generated triangular wave carrier carrier2 for the inverters 190 and 260 is input to the UVW-phase duty command generation unit 470 and the switching signal generation unit 460. The generated carrier frequency fcarrier1 for the boost converter 100 and the generated, carrier frequency fcarrier2 for the inverters 190 and 260 are input to the switching signal generation unit 460. The carrier generation unit 520 will be described in detail using FIG. 2.

The UVW-phase duty command generation unit 470 generates UVW-phase duty command values Du1*, Dv1*, and Dw1* of the inverter 190, on the basis of the UVW-phase voltage command values vu1*, vv1*, and vw1* generated by the UVW-phase voltage command generation unit 480, the voltage value vcs of both ends of the smoothing capacitor 110 detected by the voltage sensor 120, and the triangular wave carrier carrier2 generated by the carrier generation unit 520. In addition, the UVW-phase duty command generation unit 470 generates UVW-phase duty command values Du2*, Dv2*, and Dw2* of the inverter 260, on the basis of the UVW-phase voltage command values vu2*, vv2*, and vw2* generated by the UVW-phase voltage command generation unit 480, the voltage value vcs of both ends of the smoothing capacitor 110 detected by the voltage sensor 120, and the triangular wave carrier carrier2 generated by the carrier generation unit 520. The generated UVW-phase duty command values Du1*, Dv1*, Dw1*, Du2*, Dv2*, and Dw2* are input to the switching signal generation unit 460. The UVW-phase duty command generation unit 470 will be described in detail using FIG. 7.

The duty command generation unit 450 generates a duty command value Db* of the boost converter 100, on the basis of the voltage value vcs of both ends of the smoothing capacitor 110 detected by the voltage sensor 120, the inter-P-Q voltage command value vpq* generated by the inter-P-Q voltage command generation unit 440, and the triangular wave carrier carrier1 generated by the carrier generation unit 520. The generated duty command value Db* is input to the switching signal generation unit 460. The duty command generation unit 450 will be described in detail using FIG. 9.

The switching signal generation unit 460 generates a switching signal Sup1 for the switching element 130 of the U-phase upper arm of the inverter 190, a switching signal Sun1 for the switching element 140 of the U-phase lower arm of the inverter 190, a switching signal Svp1 for the switching element 150 of the V-phase upper arm of the inverter 190, a switching signal Svn1 for the switching element 160 of the V-phase lower arm of the inverter 190, a switching signal Swp1 for the switching element 170 of the W-phase upper arm of the inverter 190, and a switching signal Swn1 for the switching element 180 of the W-phase lower arm of the inverter 190, on the basis of the UVW-phase duty command values Du1*, Dv1*, and Dw1* generated by the UVW-phase duty command generation unit 470, the triangular wave carrier carrier2 and the carrier frequency fcarrier2 for the inverters, and the carrier frequency fcarrier1 for the boost converter. In addition, the switching signal generation unit 460 generates a switching signal Sup2 for the switching element 200 of the U-phase upper arm of the inverter 260, a switching signal Sun2 for the switching element 210 of the U-phase lower arm of the inverter 260, a switching signal Svp2 for the switching element 220 of the V-phase upper arm of the inverter 260, a switching signal Svn2 for the switching element 230 of the V-phase lower arm of the inverter 260, a switching signal Swp2 for the switching element 240 of the W-phase upper arm of the inverter 260, and a switching signal Swn2 for the switching element 250 of the W-phase lower arm of the inverter 260, on the basis of the UVW-phase duty command values Du2*, Dv2*, and Dw2* generated by the UVW-phase duty command generation unit 470, the triangular wave carrier carrier2 and the carrier frequency fcarrier2 for the inverters, and the carrier frequency fcarrier1 for the boost converter. In addition, the switching signal generation unit 460 generates a switching signal Sbp for the switching element 80 of the upper arm of the boost converter 100 and a switching signal Sbn for the switching element 90 of the lower arm of the boost converter 100, on the basis of the duty command value Db* generated by the duty command generation unit 450, the triangular wave carrier carrier1 and the carrier frequency fcarrier1 for the boost converter, and the carrier frequency fcarrier2 for the inverters. The generated switching signals Sup1, Sun1, Svp1, Svn1, Swp1, and Swn1 for the switching elements 130, 140, 150, 160, 170, and 180 of the inverter 190, the generated switching signals Sup2, Sun2, Svp2, Svn2, Swp2, and Swn2 for the switching elements 200, 210, 220, 230, 240, and 250 of the inverter 260, and the generated switching signals Sbp and Sbn of the switching elements 80 and 90 of the boost converter 100 are input to the gate drive circuit 540. The switching signal generation unit 460 will be described in detail using FIG. 11.

The gate drive circuit 540 converts a voltage into a voltage capable of turning on and off each of the IGBTs configuring the switching elements 130, 140, 150, 160, 170, and 180 of the inverter 190, on the basis of the switching signals Sup1, Sun1, Svp1, Svn1, Swp1, and Swn1 generated by the switching signal, generation unit 460, and applies the converted voltage between a gate and an emitter of each of the IGBTs. In addition, the gate drive circuit 540 converts a voltage into a voltage capable of turning on and off each of the IGBTs configuring the switching elements 200, 210, 220, 230, 240, and 250 of the inverter 260, on the basis of the switching signals Sup2, Sun2, Svp2, Svn2, Swp2, and Swn2 generated by the switching signal generation unit 460, and applies the converted voltage between a gate and an emitter of each of the IGBTs. In addition, the gate drive circuit 540 converts a voltage into a voltage capable of turning on and off each of the IGBTs configuring the switching elements 80 and 90 of the boost converter 100, on the basis of the switching signals Sbp and Sbn generated by the switching signal generation unit 460, and applies the converted voltage between a gate and an emitter of each of the IGBTs.

As described above, the boost, converter 100 changes a ratio of ON and OFF of the switching element 80 of the upper arm and the switching element 90 of the lower arm in the boost converter 100 and controls the voltage value of both ends of the smoothing capacitor 110 at a voltage value equal to or more than a voltage value of the battery 1, according to the output voltage command vcs* of the boost, converter 100 received from the vehicle control device (not illustrated in the drawings). Outputs of the motor generators 320 and 360 can be improved by increasing input voltages of the inverters 190 and 260 using the boost converter 100.

In addition, the inverter 190 converts a direct-current voltage of the smoothing capacitor 110 into a three-phase alternating-current voltage of a variable voltage and a variable frequency, according to the torque command Trq1* of the motor generator 320 received from the vehicle control device (not illustrated in the drawings). The inverter 190 applies the converted three-phase alternating-current voltage to the three-phase winding 290 of the motor generator 320, controls a three-phase alternating current flowing to the three-phase winding 290 of the motor generator 320, and controls the torque of the motor generator 320 indirectly. Similar to the inverter 190, the inverter 260 converts a direct-current voltage of the smoothing capacitor 110 into a three-phase alternating-current voltage of a variable voltage and a variable frequency, according to the torque command Trq2* of the motor generator 360 received from the vehicle control device (not illustrated in the drawings). The inverter 260 applies the converted three-phase alternating-current voltage to the three-phase winding 330 of the motor generator 360, controls a three-phase alternating current flowing to the three-phase winding 330 of the motor generator 360, and controls the torque of the motor generator 360 indirectly.

The power conversion system is configured as described above, so that the torque of the motor generator 320 can be controlled to be matched with the torque command Trq1* of the motor generator 320 received from the vehicle control device (not illustrated in the drawings). In addition, the torque of the motor generator 360 can be controlled to be matched with the torque command Trq2* of the motor generator 360. In addition, the output voltage vcs (the voltage value vcs of both ends of the smoothing capacitor 110) of the boost converter 100 can be controlled to be matched with the output voltage command vcs* of the boost converter 100.

Next, a configuration of the carrier generation unit 520 will be described in detail.

Figure 2:
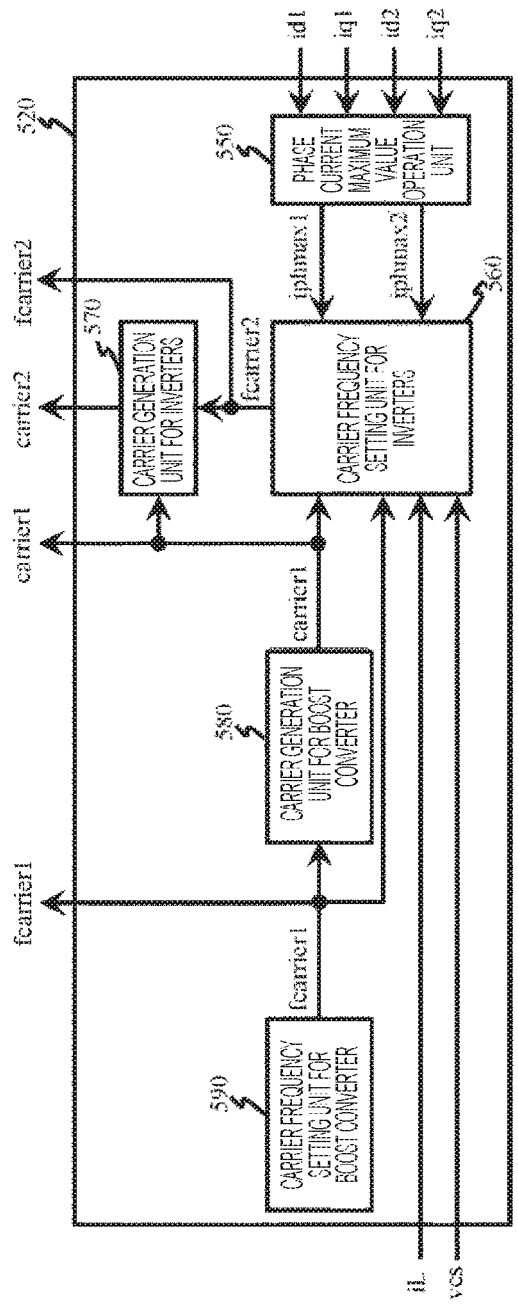
FIG. 2 is a diagram illustrating a configuration of a carrier generation unit 520.

FIG. 2 is a diagram illustrating the configuration of the carrier generation unit 520. The carrier generation unit 520 has a phase current maximum value operation unit 550, a carrier frequency setting unit 560 for the inverters 190 and 260, a carrier generation unit 570 for the inverters 190 and 260, a carrier generation unit 580 for the boost converter 100, and a carrier frequency setting unit 590 for the boost converter 100.

The carrier frequency setting unit 590 for the boost converter outputs a value of the carrier frequency fcarrier1 for the boost converter 100 that is previously stored in a memory of a microcomputer. The output value of the carrier frequency fcarrier1 is input to the carrier generation unit 580 for the boost converter, the carrier frequency setting unit 560 for the inverters, and the switching signal generation unit 460.

The carrier generation unit 580 for the boost converter generates the triangular wave carrier carrier1 for the boost converter 100, on the basis of the carrier frequency fcarrier1 input from the carrier frequency setting unit 590 for the boost converter. The generated triangular wave carrier carrier1 is input to the carrier frequency setting unit 560 for the inverters, the carrier generation unit 570 for the inverters, the switching signal generation unit 460, and the duty command generation unit 450. A process sequence of the carrier generation unit 580 for the boost converter will be described using FIG. 3.

The phase current maximum value operation unit 550 calculates a maximum value iphmax1 of a phase current of the motor generator 320 by a formula (1), using the dq-axis current values id1 and iq1 of the motor generator 320.

[Mathematical Formula 1]

$$iphmax1=\sqrt{id1^2+iq1^2} \qquad (1)$$

In addition, the phase current maximum value operation unit 550 calculates a maximum value iphmax2 of a phase current of the motor generator 360 by a formula (2), using the dq-axis current values id2 and iq2 of the motor generator 360.

[Mathematical Formula 2]

$$iphmax2=\sqrt{id2^2+iq2^2} \qquad (2)$$

The calculated maximum value iphmax1 of the phase current of the motor generator 320 and the calculated maximum value iphmax2 of the phase current of the motor generator 360 are input to the carrier frequency setting unit 560 for the inverters.

The carrier frequency setting unit 560 for the inverters sets the carrier frequency fcarrier2 for the inverters 190 and 260, on the basis of the current value iL flowing to the reactor 70, the voltage value vcs of both ends of the smoothing capacitor 110, the carrier frequency fcarrier1 set by the carrier frequency setting unit 590 for the boost converter, the triangular wave carrier carrier1 generated by the carrier generation unit 580 for the boost converter, and the maximum values iphmax1 and iphmax2 of the phase currents calculated by the phase current maximum value operation unit 550. The set carrier frequency fcarrier2 is input to the carrier generation unit 570 for the inverters and the switching signal generation unit 460. A process sequence of the carrier frequency setting unit 560 for the inverters will be described using FIG. 4.

The carrier generation unit 570 for the inverters generates the triangular wave carrier carrier2 for the inverters 190 and 260, on the basis of the carrier frequency fcarrier2 set by the carrier frequency setting unit 560 for the inverters and the triangular wave carrier carrier1 generated by the carrier generation unit 580 for the boost converter. The generated triangular wave carrier carrier2 for the inverters 190 and 260 is input to the UVW-phase duty command generation unit 470 and the switching signal generation unit 460. A process sequence of the carrier generation unit 570 for the inverters will be described using FIG. 5.

Figure 3:
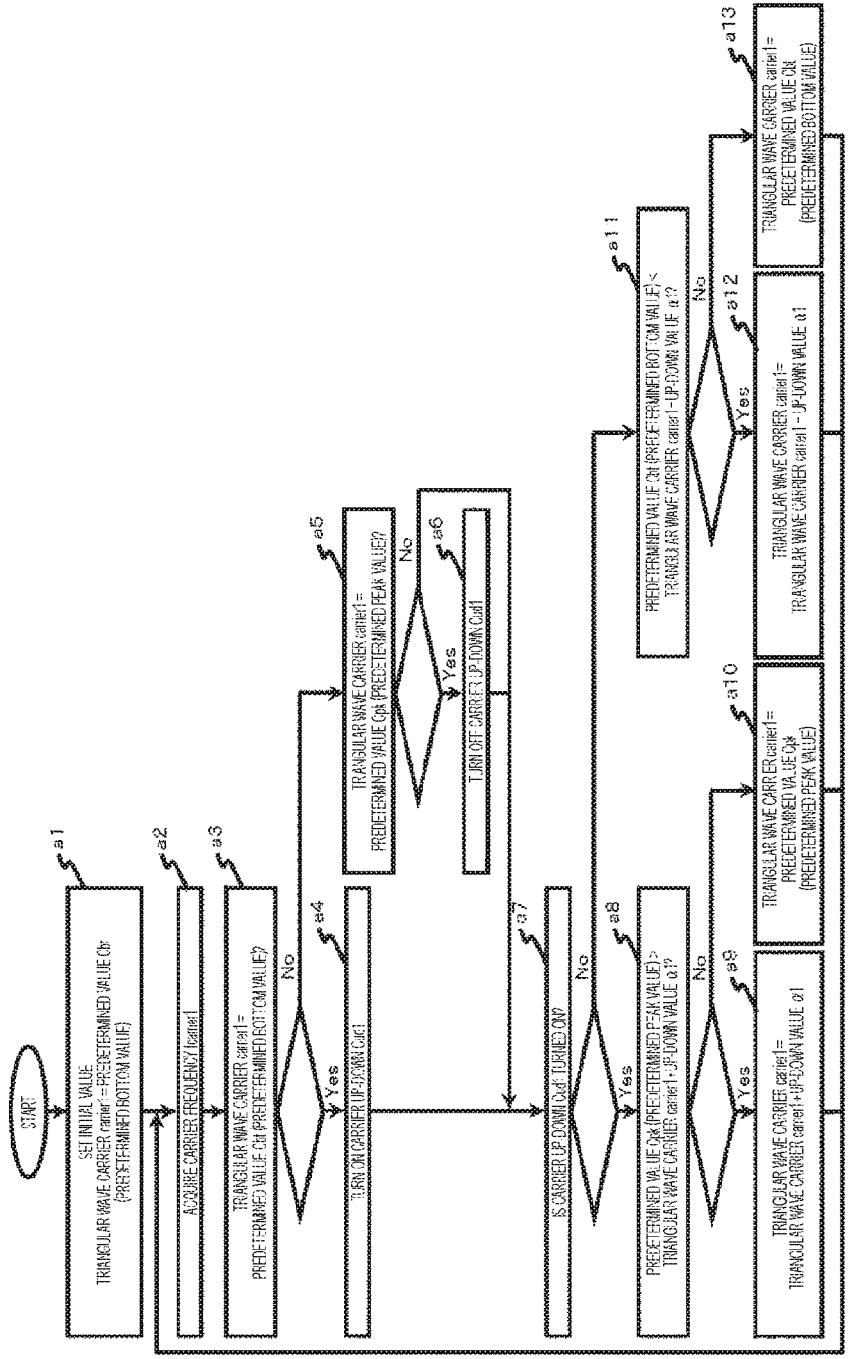
FIG. 3 illustrates a process sequence of a carrier generation unit 580 for a boost converter.

FIG. 3 is a diagram illustrating a process sequence of the carrier generation unit 580 for the boost converter illustrated in FIG. 2.

In step a1, the carrier generation unit 580 for the boost converter sets an initial value of the triangular wave carrier carrier1 for the boost converter to a predetermined bottom value Cbt. The initial value of the triangular wave carrier carrier1 may be set to a predetermined peak value Cpk.

In step a2, the carrier generation unit 580 for the boost converter acquires the carrier frequency fcarrier1 for the boost converter.

In step a3, the carrier generation unit 580 for the boost converter determines whether a value of the triangular wave carrier carrier1 for the boost converter is equal to the predetermined bottom value Cbt. In step a3, when the value of the triangular wave carrier carrier1 is equal to the predetermined bottom value Cbt, the carrier generation unit 580 for the boost converter proceeds to step a4. Meanwhile, in step a3, when the value of the triangular wave carrier carrier1 is not equal to the predetermined bottom value Cbt, the carrier generation unit 580 for the boost converter proceeds to step a5.

In step a4, the carrier generation unit 580 for the boost converter sets carrier up-down Cud1 to ON and proceeds to a process of step a7.

In step a5, the carrier generation unit 580 for the boost converter determines whether the value of the triangular wave carrier carrier1 is equal to the predetermined peak value Cpk. In step a5, when the value of the triangular wave carrier carrier1 is equal to the predetermined peak value Cpk, the carrier generation unit 580 for the boost converter proceeds to step a6. Meanwhile, in step a5, when the value of the triangular wave carrier carrier1 is not equal to the predetermined peak value Cpk, the carrier generation unit 580 for the boost converter proceeds to the process of step a7, without changing a state of the carrier up-down Cud1.

Here, the carrier up-down Cud1 is used for determining whether the triangular wave carrier carrier1 for the boost converter rises or falls. Specifically, when the carrier up-down Cud1 is turned on, the triangular wave carrier carrier1 rises and when the carrier up-down Cud1 is turned off, the triangular wave carrier carrier1 falls.

In step a6, the carrier generation unit 580 for the boost converter sets the carrier up-down Cud1 to OFF and proceeds to the process of step a7.

In step a7, the carrier generation unit 580 for the boost converter determines whether the carrier up-down Cud1 is turned on. In step a7, when the carrier up-down Cud1 is turned on, the carrier generation unit 580 for the boost converter proceeds to step a8. Meanwhile, in step a7, when the carrier up-down Cud1 is not turned on, the carrier generation unit 580 for the boost converter proceeds to step a11.

In step a8, the carrier generation unit 580 for the boost converter determines whether the predetermined peak value Cpk is larger than a value obtained by adding the value of the triangular wave carrier carrier1 for the boost converter to an up-down value α1 obtained by substituting an operation cycle Tcal1 of the carrier generation unit 520, the predetermined peak value Cpk, the predetermined bottom value Cbt, and the carrier frequency fcarrier1 for the boost converter for a formula (3).

[Mathematical Formula 3]

$$\alpha1=2\cdot Tcal1\cdot(Cpk-Cbt)\cdot fcarrier1 \qquad (3)$$

Here, the up-down value α1 is a value of the triangular wave carrier carrier1 that is changed at one operation cycle of the carrier generation unit 580 for the boost converter. In step a8, when the predetermined peak value Cpk is larger than the value obtained by adding the value of the triangular wave carrier carrier1 to the up-down value α1, the carrier generation unit 580 for the boost converter proceeds to step a9. Meanwhile, in step a8, when the predetermined peak value Cpk is not larger than the value obtained by adding the value of the triangular wave carrier carrier1 to the up-down value α1, the carrier generation unit 580 for the boost converter proceeds to step a10.

In step a9, the carrier generation unit 580 for the boost converter adds the up-down value α1 to the current value of the triangular wave carrier carrier1 and then returns to a process of step a2.

In step a10, the carrier generation unit 580 for the boost converter matches the value of the triangular wave carrier carrier1 with the predetermined peak value Cpk and then returns to the process of step a2.

In step a11, the carrier generation unit 580 for the boost converter determines whether the predetermined bottom value Cbt is smaller than a value obtained by subtracting the up-down value α1 from the value of the triangular wave carrier carrier1. In step a11, when the predetermined bottom value Cbt is smaller than the value obtained by subtracting the up-down value α1 from the value of the triangular wave carrier carrier1, the carrier generation unit 580 for the boost converter proceeds to step a12. Meanwhile, in step a11, when the predetermined bottom value Cbt is not smaller than the value obtained by subtracting the up-down value α1 from the value of the triangular wave carrier carrier1, the carrier generation unit 580 for the boost converter proceeds to step a13.

In step a12, the carrier generation unit 580 for the boost converter subtracts the up-down value α1 from the current value of the triangular wave carrier carrier1 and then returns to the process of step a2.

In step a13, the carrier generation unit 580 for the boost converter matches the value of the triangular wave carrier carrier1 with the predetermined bottom value Cbt and then returns to the process of step a2.

The carrier generation unit 580 for the boost converter repeats the processes of steps a1 to a13 described above and generates the triangular wave carrier carrier1 for the boost converter. The generated triangular wave carrier carrier1 is input to the carrier frequency setting unit 560 for the inverters, the carrier generation unit 570 for the inverters, the switching signal generation unit 460, and the duty command generation unit 450 of the boost converter 100, as described in FIG. 2.

As such, the triangular wave carrier carrier1 for the boost converter is generated, so that a frequency of the triangular wave carrier carrier1 for the boost converter can be matched with the carrier frequency fcarrier1.

Figure 4:
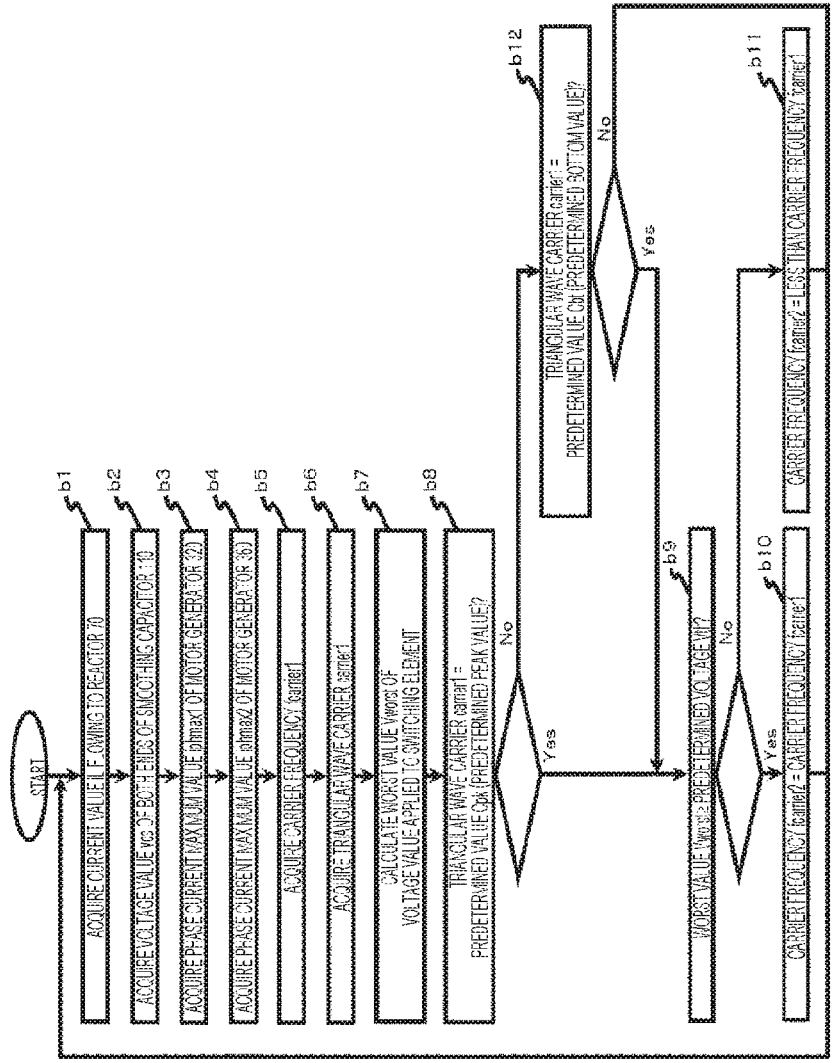
FIG. 4 illustrates a process sequence of a carrier frequency setting unit 560 for an inverter.

FIG. 4 is a diagram illustrating a process sequence of the carrier frequency setting unit 560 for the inverters illustrated in FIG. 2.

In step b1, the carrier frequency setting unit 560 for the inverters acquires the current value iL flowing to the reactor 70.

In step b2, the carrier frequency setting unit 560 for the inverters acquires the voltage value vcs of both ends of the smoothing capacitor 110.

In step b3, the carrier frequency setting unit 560 for the inverters acquires the maximum value iphmax1 of the phase current of the motor generator 320 calculated by the phase current maximum value operation unit 550.

In step b4, the carrier frequency setting unit 560 for the inverters acquires the maximum value iphmax2 of the phase current of the motor generator 360 calculated by the phase current maximum value operation unit 550.

In step b5, the carrier frequency setting unit 560 for the inverters acquires the carrier frequency fcarrier1 set by the carrier frequency setting unit 590 for the boost converter.

In step b6, the carrier frequency setting unit 560 for the inverters acquires the triangular wave carrier carrier1 generated by the carrier generation unit 580 for the boost converter. In addition, order of steps b1 to b6 may be changed.

In step b7, the carrier frequency setting unit 560 for the inverters calculates a worst value Vworst of the voltage applied to the switching elements 80, 90, 130, 140, 150, 160, 170, 180, 200, 210, 220, 230, 240, and 250 of the boost converter 100 and the inverters 190 and 260, on the basis of data acquired by steps b1 to b4 described above. For the worst value Vworst, a previously measured value is stored as map data corresponding to a combination of the current value iL flowing to the reactor 70, the voltage vcs of both ends of the smoothing capacitor 110, the maximum value iphmax1 of the phase current of the motor generator 320, and the maximum value iphmax2 of the phase current of the motor generator 360 in a memory (not illustrated in the drawings) of a microcomputer. Because it is known that the worst value Vworst is generated when the switching element of the upper arm (lower arm) of the boost converter 100 and the switching elements of the upper arms (lower arms) of the inverters 130 and 260 simultaneously change from OFF to ON or simultaneously change from ON to OFF, the worst value Vworst can be previously measured. In addition, the worst value Vworst may be calculated using an approximation formula.

In step b8, the carrier frequency setting unit 560 for the inverters determines whether the value of the triangular wave carrier carrier1 acquired by step b6 is equal to the predetermined peak value Cpk. In step b8, when the value of the triangular wave carrier carrier1 is equal to the predetermined peak value Cpk, the carrier frequency setting unit 560 for the inverters proceeds to step b9. Meanwhile, in step b8, when the value of the triangular wave carrier carrier1 is not equal to the predetermined peak value Cpk, the carrier frequency setting unit 560 for the inverters proceeds to step b12.

In step b9, the carrier frequency setting unit 560 for the inverters determines whether the worst value Vworst is equal to or more than a predetermined voltage Vth. In step b9, when the worst value Vworst is equal to or more than the predetermined voltage Vth, the carrier frequency setting unit 560 for the inverters proceeds to step b10. Meanwhile, in step b9, when the worst value Vworst is not equal to or more than the predetermined voltage Vth, the carrier frequency setting unit 560 for the inverters proceeds to step b11.

In step b10, the carrier frequency setting unit 560 for the inverters matches the value of the carrier frequency fcarrier2 for the inverters with the value of the carrier frequency fcarrier1 for the boost converter. Then, the carrier frequency setting unit for the inverters returns to a process of step b1.

In step b11, the carrier frequency setting unit 560 for the inverters sets the value of the carrier frequency fcarrier2 for the inverters to a value smaller than the value of the carrier frequency fcarrier1 for the boost converter. Then, the carrier frequency setting unit for the inverters returns to the process of step b1.

In step b12, the carrier frequency setting unit 560 for the inverters determines whether the value of the triangular wave carrier carrier1 is equal to the predetermined bottom value Cbt. In step b12, when the value of the triangular wave carrier carrier1 is equal to the predetermined bottom value Cbt, the carrier frequency setting unit 560 for the inverters executes the processes of steps b9 to b11 described above and then returns to the process of step b1. Meanwhile, in step b12, when the value of the triangular wave carrier carrier1 is not equal to the predetermined bottom value Cbt, the carrier frequency setting unit 560 for the inverters returns to the process of step b1, without changing the value of the carrier frequency fcarrier2.

The carrier frequency setting unit 560 for the inverters repeats the processes described above and generates the carrier frequency fcarrier2 for the inverters. The generated carrier frequency fcarrier2 is input to the carrier generation unit 570 for the inverters and the switching signal generation unit 460.

As such, the carrier frequency fcarrier2 for the inverters is set, so that the value of the carrier frequency fcarrier2 for the inverters can be matched with the carrier frequency fcarrier1 for the boost converter, when the worst value Vworst is equal to or more than the predetermined voltage Vth. In addition, when the worst value Vworst is less than the predetermined voltage Vth, the value of the carrier frequency fcarrier2 for the inverters can be set to a value smaller than the value of the carrier frequency fcarrier1 for the boost converter. Therefore, because switching loss of the switching elements of the inverters can be reduced when the worst value Vworst is less than the predetermined voltage Vth, high efficiency of the inverters can be realized. In addition, when the value of the triangular wave carrier carrier1 for the boost converter is matched with the predetermined peak value Cpk and when the value of the triangular wave carrier carrier1 for the boost converter is matched with the predetermined bottom value Cbt, the value of the carrier frequency fcarrier2 for the inverters can be changed.

Figure 5:
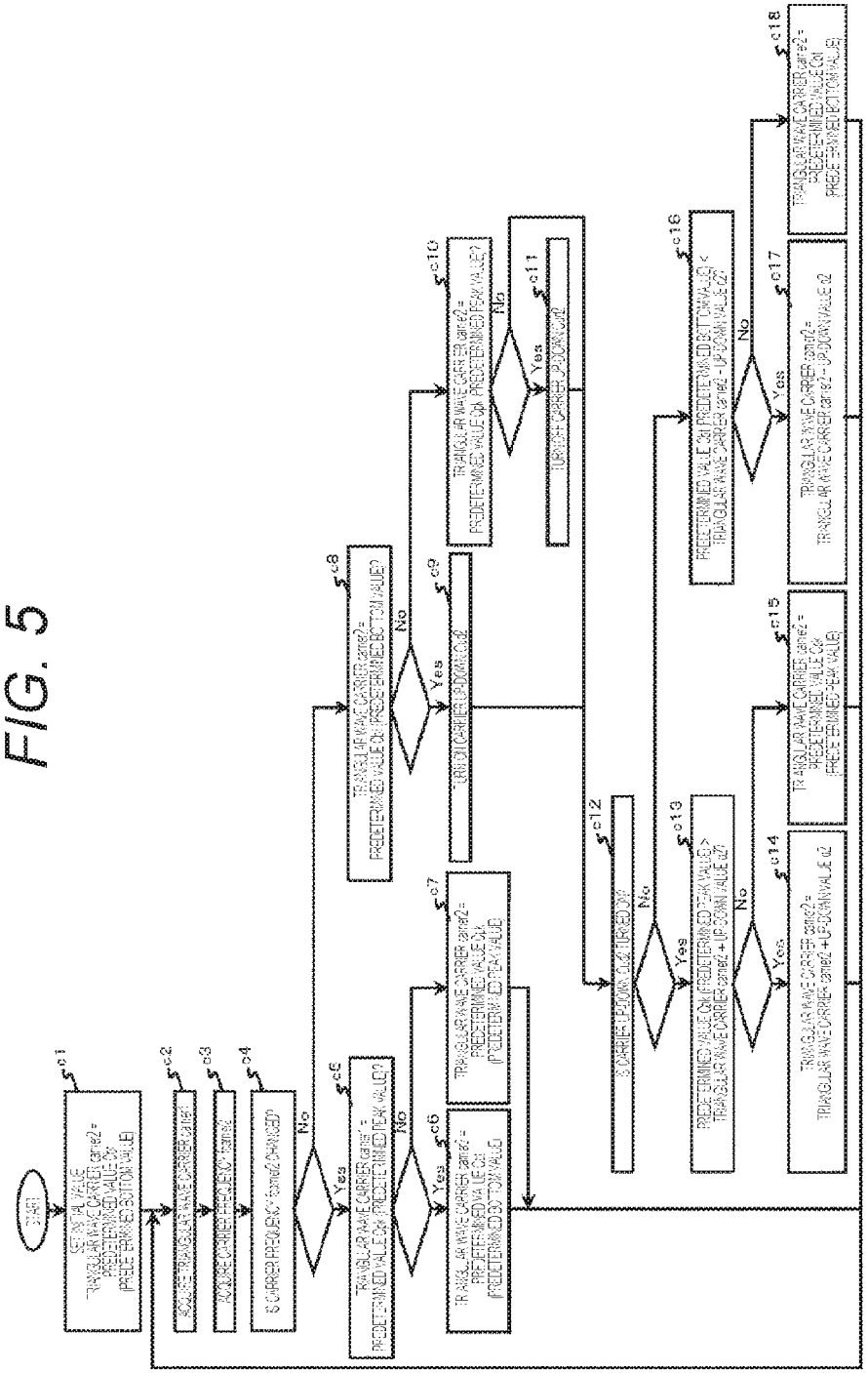
FIG. 5 illustrates a process sequence of a carrier generation unit 570 for an inverter.

FIG. 5 is a diagram illustrating a process sequence of the carrier generation unit 570 for the inverters illustrated in FIG. 2.

In step c1, the carrier generation unit 570 for the inverters matches an initial value of the triangular wave carrier carrier2 for the inverters with the predetermined bottom value Cbt. In addition, the initial value of the triangular wave carrier carrier2 may be matched with the predetermined peak value Cpk.

In step c2, the carrier generation unit 570 for the inverters acquires the triangular wave carrier carrier1 generated by the carrier generation unit 580 for the boost converter.

In step c3, the carrier generation unit 570 for the inverters acquires the carrier frequency fcarrier2 set by the carrier frequency setting unit 560 for the inverters. In addition, order of steps c2 and c3 may be changed.

In step c4, the carrier generation unit 570 for the inverters determines whether the value of the carrier frequency fcarrier2 acquired by step c3 changes from a value of the carrier frequency fcarrier2 acquired before one operation cycle of the carrier generation unit 570 for the inverters. In step c4, when the value of the carrier frequency fcarrier2 changes, the carrier generation unit 570 for the inverters proceeds to step c5. Meanwhile, in step c4, when the value of the carrier frequency fcarrier2 does not change, the carrier generation unit 570 for the inverters proceeds to step c8.

In step c5, the carrier generation unit 570 for the inverters determines whether the value of the triangular wave carrier carrier1 for the boost converter is equal to the predetermined peak value Cpk. In step c5, when the value of the triangular wave carrier carrier1 is equal to the predetermined peak value Cpk, the carrier generation unit 570 for the inverters proceeds to step c6. Meanwhile, in step c5, when the value of the triangular wave carrier carrier1 is not equal to the predetermined peak value Cpk, the carrier generation unit 570 for the inverters proceeds to step c7.

In step c6, the carrier generation unit 570 for the inverters matches the value of the triangular wave carrier carrier2 for the inverters with the predetermined bottom value Cbt and then returns to a process of step c2.

In step c7, the carrier generation unit 570 for the inverters matches the value of the triangular wave carrier carrier2 with the predetermined peak value Cpk and then returns to the process of step c2.

In step c8, the carrier generation unit 570 for the inverters determines whether the value of the triangular wave carrier carrier2 is equal to the predetermined bottom value Cbt. In step c8, when the value of the triangular wave carrier carrier2 is equal to the predetermined bottom value Cbt, the carrier generation unit 570 for the inverters proceeds to step c9. Meanwhile, in step c8, when the value of the triangular wave carrier carrier2 is not equal to the predetermined bottom, value Cbt, the carrier generation unit 570 for the inverters proceeds to step c10.

In step c9, the carrier generation unit 570 for the inverters sets carrier up-down Cud2 to ON and proceeds to step c12.

Here, the carrier up-down Cud2 is used for determining whether the triangular wave carrier carrier2 for the inverters rises or falls. Specifically, when the carrier up-down Cud2 is turned on, the triangular wave carrier carrier2 rises and when the carrier up-down Cud2 is turned off, the triangular wave carrier carrier2 falls.

In step c10, the carrier generation unit 570 for the inverters determines whether the value of the triangular wave carrier carrier2 is equal to the predetermined peak value Cpk. In step c10, when the value of the triangular wave carrier carrier2 is equal to the predetermined peak value Cpk, the carrier generation unit 570 for the inverters proceeds to step c11. Meanwhile, in step c10, when the value of the triangular wave carrier carrier2 is not equal to the predetermined peak value Cpk, the carrier generation unit 570 for the inverters proceeds to step c12, without changing a state of the carrier up-down Cud2.

In step c11, the carrier generation unit 570 for the inverters sets the carrier up-down Cud2 to OFF and proceeds to step c12.

In step c12, the carrier generation unit 570 for the inverters determines whether the carrier up-down Cud2 is turned on. In step c12, when the carrier up-down Cud2 is turned on, the carrier generation unit 570 for the inverters proceeds to step c13. Meanwhile, in step c12, when the carrier up-down Cud2 is not turned on, the carrier generation unit 570 for the inverters proceeds to step c16.

In step c13, the carrier generation unit 570 for the inverters determines whether the predetermined peak, value Cpk is larger than a value obtained by adding the value of the triangular wave carrier carrier2 for the inverters to an up-down value α2 obtained by substituting an operation cycle Tcal1 of the carrier generation unit 520, the predetermined peak value Cpk, the predetermined bottom value Cbt, and the carrier frequency fcarrier2 for the inverters for a formula (4).

[Mathematical Formula 4]

$$\alpha 2 = 2 \cdot Tcal1 \cdot (Cpk - Cbt) \cdot fcarrier2 \quad (4)$$

Here, the up-down value α2 is a value of the triangular wave carrier carrier2 that is changed at one operation cycle of the carrier generation unit 570 for the inverters. In step c13, when the predetermined peak value Cpk is larger than the value obtained by adding the value of the triangular wave carrier carrier2 to the up-down value α2, the carrier generation unit 570 for the inverters proceeds to step c14. Meanwhile, in step c13, when the predetermined peak value Cpk is not larger than the value obtained by adding the value of the triangular wave carrier carrier2 for the inverters 190 and 260 to the up-down value α2, the carrier generation unit 570 for the inverters proceeds to step c15.

In step c14, the carrier generation unit 570 for the inverters adds the up-down value α2 to the current value of the triangular wave carrier carrier2 for the inverters and then returns to a process of step c2.

In step c15, the carrier generation unit 570 for the inverters matches the value of the triangular wave carrier carrier2 with the predetermined peak value Cpk and then returns to the process of step c2.

In step c16, the carrier generation unit 570 for the inverters determines whether the predetermined bottom value Cbt is smaller than a value obtained by subtracting the up-down value α2 from the value of the triangular wave carrier carrier2. In step c16, when the predetermined bottom value Cbt is smaller than the value obtained by subtracting the up-down value α2 from the value of the triangular wave carrier carrier2, the carrier generation unit 570 for the inverters proceeds to step c17. Meanwhile, in step c16, when the predetermined bottom value Cbt is not smaller than the value obtained by subtracting the up-down value α2 from the value of the triangular wave carrier carrier2, the carrier generation unit 570 for the inverters proceeds to step c18.

In step c17, the carrier generation unit 570 for the inverters subtracts the up-down value α2 from the current value of the triangular wave carrier carrier2 and then returns to the process of step c2.

In step c18, the carrier generation unit 570 for the inverters matches the value of the triangular wave carrier carrier2 with the predetermined bottom value Cbt and then returns to the process of step c2.

The carrier generation unit 570 for the inverters repeats the processes described above and generates the triangular wave carrier carrier2 for the inverters 190 and 260. The generated triangular wave carrier carrier2 for the inverters 190 and 260 is input to the switching signal generation unit 460 and the UVW-phase duty command generation unit 470.

As such, the triangular wave carrier carrier2 for the inverters is generated, so that a frequency of the triangular wave carrier carrier2 can be matched with the value of the carrier frequency fcarrier2. In addition, when the carrier frequency fcarrier2 for the inverters is set to the same value as the value of the carrier frequency fcarrier1 for the boost converter, the triangular wave carrier carrier2 for the inverters can have a waveform in which a frequency is equal to the frequency of the triangular wave carrier carrier1 for the boost converter and a phase is different from a phase of the triangular wave carrier carrier1 for the boost converter by 180 degrees.

Figure 6:
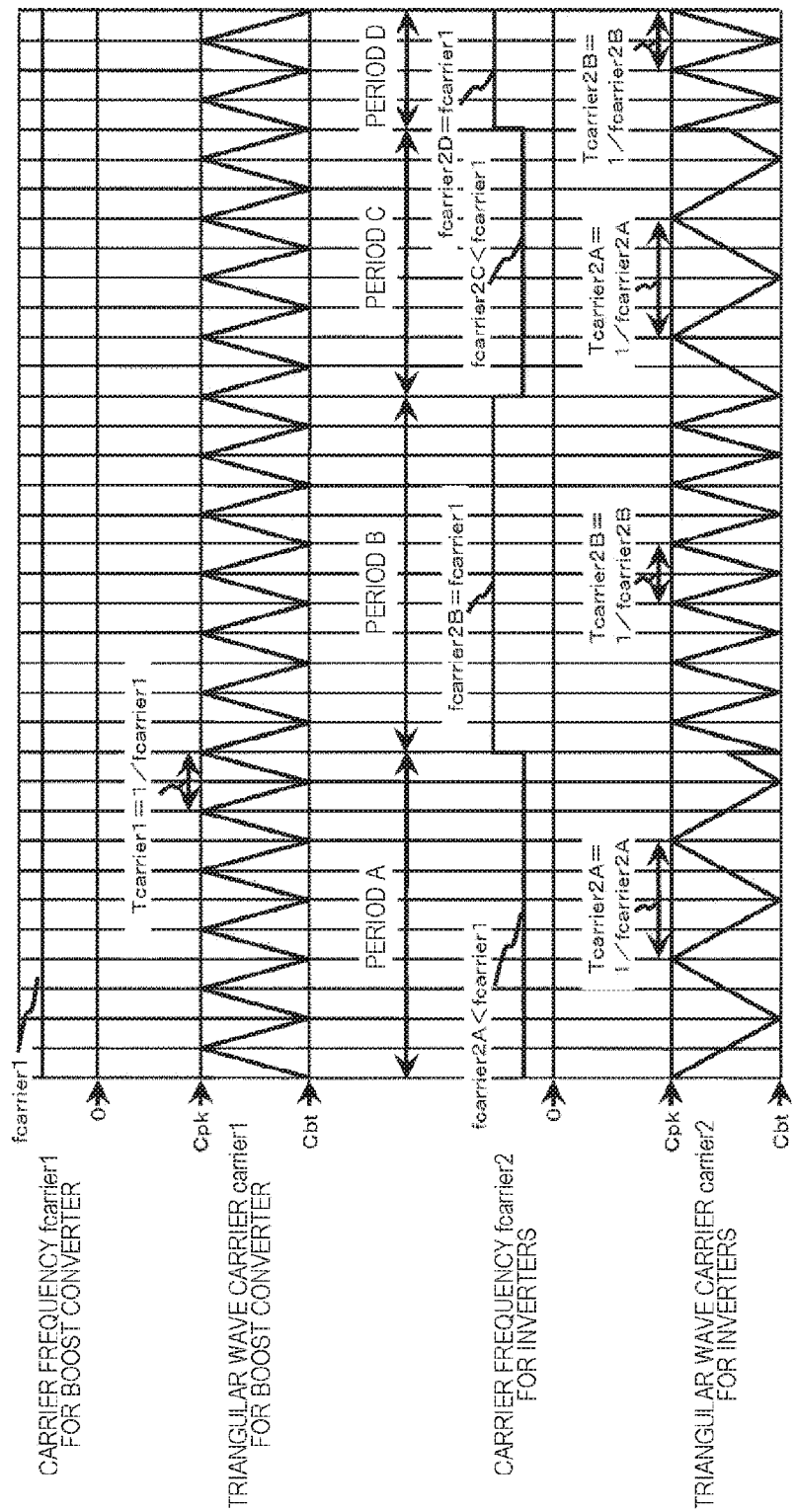
FIG. 6 is a diagram illustrating waveforms of a carrier frequency and a triangular wave carrier for a boost converter and a carrier frequency and a triangular wave carrier for an inverter.

FIG. 6 is a diagram, illustrating waveforms of the carrier frequency fcarrier1 and the triangular wave carrier carrier1 for the boost converter and the carrier frequency fcarrier2 and the triangular wave carrier carrier2 for the inverters.

Because the carrier-frequency fcarrier1 for the boost converter is set to the value previously stored in the memory (not illustrated in the drawings) of the microcomputer by the carrier frequency setting unit 590 for the boost converter as described above, the carrier frequency fcarrier1 for the boost converter has a constant value. Therefore, the triangular wave carrier carrier1 for the boost converter generated on the basis of the carrier frequency fcarrier1 for the boost converter becomes a waveform that rises from the predetermined bottom, value Cbt to the predetermined peak value Cpk after falling from the predetermined peak value Cpk to the predetermined bottom value Cbt, at a constant cycle Tcarrier1.

As described above, when the worst value Vworst is equal to or more than the predetermined voltage Vth, the carrier frequency fcarrier2 for the inverters becomes the same frequency as the carrier frequency fcarrier1 for the boost converter. In addition, when the worst value Vworst is less than the predetermined voltage Vth, the carrier frequency fcarrier2 for the inverters has a value smaller than a value of the carrier frequency fcarrier1 for the boost converter. The carrier frequency fcarrier2 for the inverters changes when the triangular wave carrier carrier1 for the boost converter is matched, with the predetermined peak value Cpk and when the triangular wave carrier carrier1 for the boost converter is matched with the predetermined bottom value Cbt.

In FIG. 6, a period A is a period where the worst value Vworst is less than the predetermined voltage Vth. In addition, a period B is a period where the worst value Vworst is equal to or more than the predetermined voltage Vth. In addition, a period C is a period where the worst value Vworst is less than the predetermined voltage Vth. In addition, a period D is a period where the worst value Vworst is equal to or more than the predetermined voltage Vth.

Therefore, a carrier frequency fcarrier2A for the inverters in the period A has a value smaller than the value of the carrier frequency fcarrier1 for the boost converter. A carrier frequency fcarrier2B for the inverters in the period B has a value equal to the value of the carrier frequency fcarrier1 for the boost converter. A carrier frequency fcarrier2C for the inverters in the period C has a value smaller than the value of the carrier frequency fcarrier1 for the boost converter. A carrier frequency fcarrier2D for the inverters in the period D has a value equal to the value of the carrier frequency fcarrier1 for the boost converter.

In addition, timing when the carrier frequency fcarrier2 for the inverters changes is when the triangular wave carrier carrier1 for the boost converter is matched with the predetermined peak value Cpk and when the triangular wave carrier carrier1 for the boost converter is matched with the predetermined bottom value Cbt. Therefore, in the period A, the triangular wave carrier carrier2 for the inverters generated on the basis of the carrier frequency fcarrier2 for the inverters becomes a waveform that rises from the predetermined bottom value Cbt to the predetermined peak value Cpk after falling from, the predetermined peak value Cpk to the predetermined bottom value Cbt, at a cycle Tcarrier2A. In the period B, the triangular wave carrier carrier2 for the inverters becomes a waveform that rises from the predetermined bottom value Cbt to the predetermined peak value Cpk after falling from the predetermined peak value Cpk to the predetermined bottom value Cbt, at a cycle Tcarrier2B. In the period C, the triangular wave carrier carrier2 for the inverters becomes a waveform that rises from the predetermined bottom value Cbt to the predetermined peak value Cpk after falling from the predetermined peak, value Cpk to the predetermined bottom value Cbt, at a cycle Tcarrier2C. In the period D, the triangular wave carrier carrier2 for the inverters becomes a waveform that rises from the predetermined bottom value Cbt to the predetermined peak value Cpk after falling from the predetermined peak value Cpk to the predetermined bottom value Cbt, at a cycle Tcarrier2D.

When a period proceeds from the period A to the period B, the triangular wave carrier carrier2 for the inverters is set to the predetermined bottom value Cbt, because the triangular wave carrier carrier1 for the boost converter is matched with the predetermined peak value Cpk. When a period proceeds from the period B to the period C, the triangular wave carrier carrier2 for the inverters is set to the predetermined bottom value Cbt, because the triangular wave carrier carrier1 for the boost converter is matched with the predetermined peak value Cpk. When a period proceeds from the period C to the period D, the triangular wave carrier carriers for the inverters is set to the predetermined peak value Cpk, because the triangular wave carrier carrier1 for the boost converter is matched with the predetermined bottom value Cbt.

Next, a configuration of the UVW-phase duty command generation unit 470 of the inverters 190 and 260 will be described in detail.

Figure 7:
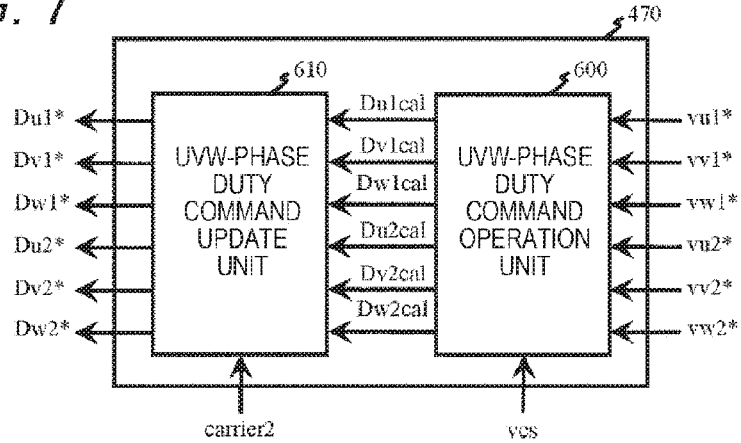
FIG. 7 is a diagram illustrating a configuration of a UVW-phase duty command generation unit 470 of an inverter.

FIG. 7 is a diagram illustrating the configuration of the UVW-phase duty command generation unit 470. The UVW-phase duty command generation unit 470 has a UVW-phase duty command operation unit 600 and a UVW-phase duty command update unit 610. A process sequence of the UVW-phase duty command update unit 610 will be described using FIG. 8.

The UVW-phase duty command operation unit 600 calculates UVW-phase duty command operation values Du1cal, Dv1cal, and Dw1cal of the inverter 190 and UVW-phase duty command operation values Du2cal, Dv2cal, and Dw2cal of the inverter 260, on the basis of the UVW-phase voltage command values vu1*, vv1*, and vw1* of the inverter 190, the UVW-phase voltage command values vu2*, vv2*, and vw2* of the inverter 260, and the voltage value vcs of both ends of the smoothing capacitor 110.

Here, a method of calculating the UVW-phase duty command operation values Du1cal, Dv1cal, Dw1cal, Du2cal, Dv2cal, and Dw2cal will be described in detail.

The UVW-phase duty command operation unit 600 substitutes the acquired U-phase voltage command value vu1*, the voltage value vcs of both ends of the smoothing capacitor 110, the predetermined peak value Cpk, and the predetermined bottom value Cbt for a formula (5) and calculates the U-phase duty command operation value Du1cal of the inverter 190.

[Mathematical Formula 5]

$$Du1cal = \frac{vu1^* \cdot \left(\sqrt{Cpk^2} + \sqrt{Cbt^2}\right)}{vcs} + Cbt + \frac{(Cpk + Cbt)}{2} \quad (5)$$

The UVW-phase duty command operation unit 600 substitutes the acquired V-phase voltage command value vv1*, the voltage value vcs of both ends of the smoothing capacitor 110, the predetermined peak value Cpk, and the predetermined bottom value Cbtt for a formula (6) and calculates the V-phase duty command operation value Dv1cal of the inverter 190.

[Mathematical Formula 6]

$$Dv1cal = \frac{vv1^* \cdot \left(\sqrt{Cpk^2} + \sqrt{Cbt^2}\right)}{vcs} + Cbt + \frac{(Cpk + Cbt)}{2} \quad (6)$$

The UVW-phase duty command operation unit 600 substitutes the acquired W-phase voltage command value vw1*, the voltage value vcs of both ends of the smoothing capacitor 110, the predetermined peak value Cpk, and the predetermined bottom value Cbt for a formula (7) and calculates the W-phase duty command operation value Dw1cal of the inverter 190.

[Mathematical Formula 7]

$$Dw1cal = \frac{vw1^* \cdot \left(\sqrt{Cpk^2} + \sqrt{Cbt^2}\right)}{vcs} + Cbt + \frac{(Cpk + Cbt)}{2} \quad (7)$$

The UVW-phase duty command operation unit 600 substitutes the acquired U-phase voltage command value vu2*, the voltage value vcs of both ends of the smoothing capacitor 110, the predetermined peak value Cpk, and the predetermined bottom value Cbt for a formula (8) and calculates the U-phase duty command operation value Du2cal of the inverter 260.

[Mathematical Formula 8]

$$Du2cal = \frac{vu2^* \cdot \left(\sqrt{Cpk^2} + \sqrt{Cbt^2}\right)}{vcs} + Cbt + \frac{(Cpk + Cbt)}{2} \quad (8)$$

The UVW-phase duty command operation unit 600 substitutes the acquired V-phase voltage command value vv2*, the voltage value vcs of both ends of the smoothing capacitor 110, the predetermined peak value Cpk, and the predetermined bottom value Cbt for a formula (9) and calculates the V-phase duty command operation value Dv2cal of the inverter 260.

[Mathematical Formula 9]

$$Dv2cal = \frac{vv2^* \cdot \left(\sqrt{Cpk^2} + \sqrt{Cbt^2}\right)}{vcs} + Cbt + \frac{(Cpk + Cbt)}{2} \quad (9)$$

The UVW-phase duty command operation unit 600 substitutes the acquired W-phase voltage command value vw2*, the voltage value vcs of both ends of the smoothing capacitor 110, the predetermined peak value Cpk, and the predetermined bottom value Cbt for a formula (10) and calculates the W-phase duty command operation value Dw2cal of the inverter 260.

[Mathematical Formula 10]

$$Dw2cal = \frac{vw2^* \cdot \left(\sqrt{Cpk^2} + \sqrt{Cbt^2}\right)}{vcs} + Cbt + \frac{(Cpk + Cbt)}{2} \quad (10)$$

The UVW-phase duty command operation unit 600 inputs the UVW-phase duty command operation values Du1cal, Dv1cal, and Dw1cal of the inverter 190 and the UVW-phase duty command operation values Du2cal, Dv2cal, and Dw2cal of the inverter 260 calculated by the method described above to the UVW-phase duty command update unit 610. In addition, calculation order of the UVW-phase duty command operation values Du1cal, Dv1cal, Dw1cal, Du2cal, Dv2cal, and Dw2cal may be changed.

The UVW-phase duty command update unit 610 calculates the UVW-phase duty command values Du1*, Dv1*, and Dw1* of the inverter 190 and the UVW-phase duty command values Du2*, Dv2*, and Dw2* of the inverter 260, on the basis of the UVW-phase duty command operation values Du1cal, Dv1cal, Dw1cal, Du2cal, Dv2cal, and Dw2cal and the triangular wave carrier carrier2 for the inverters.

Figure 8:
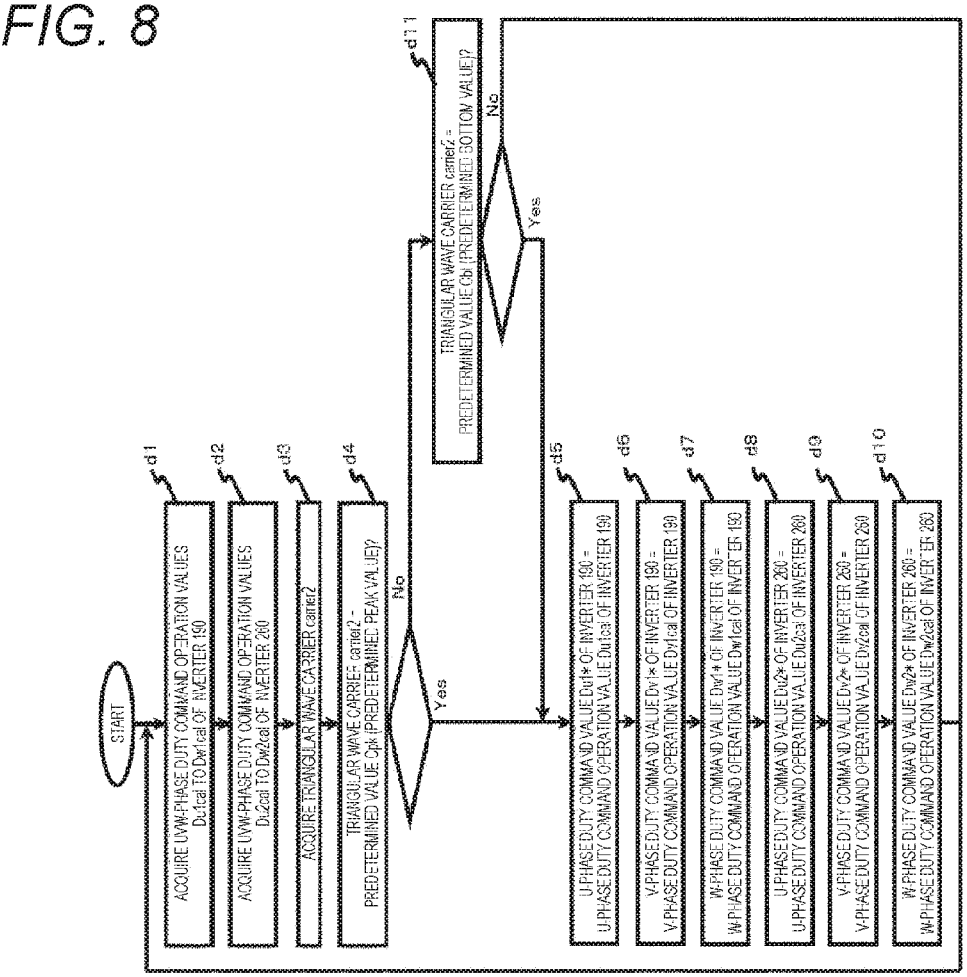

FIG. 8 is a diagram illustrating a process sequence of the UVW-phase duty command update unit 610.

In step d1, the UVW-phase duty command update unit 610 acquires the UVW-phase duty command operation values Du1cal, Dv1cal, and Dw1cal.

In step d2, the UVW-phase duty command update unit 610 acquires the UVW-phase duty command operation values Du2cal, Dv2cal, and Dw2cal.

In step d3, the UVW-phase duty command update unit 610 acquires the triangular wave carrier carrier2 for the inverters 190 and 260. In addition, order of steps d1 to d3 may be changed.

In step d4, the UVW-phase duty command update unit 610 determines whether the value of the triangular wave carrier carrier2 is equal to the predetermined peak value Cpk. In step d4, when the value of the triangular wave carrier carrier2 is equal to the predetermined peak value Cpk, the UVW-phase duty command update unit 610 proceeds to step d5. Meanwhile, in step d4, when the value of the triangular wave carrier carrier2 is not equal to the predetermined peak value Cpk, the UVW-phase duty command update unit 610 proceeds to step d11.

In step d5, the UVW-phase duty command update unit 610 sets the U-phase duty command operation value Du1cal of the inverter 190 to the U-phase duty command value Du1* of the inverter 190.

In step d6, the UVW-phase duty command update unit 610 sets the V-phase duty command operation value Dv1cal of the inverter 190 to the V-phase duty command value Dv1* of the inverter 190.

In step d7, the UVW-phase duty command update unit 610 sets the W-phase duty command operation value Dw1cal of the inverter 190 to the W-phase duty command value Dw1* of the inverter 190.

In step d8, the UVW-phase duty command update unit 610 sets the U-phase duty command operation value Du2cal of the inverter 260 to the U-phase duty command value Du2* of the inverter 260.

In step d9, the UVW-phase duty command update unit 610 sets the V-phase duty command operation value Dv2cal of the inverter 260 to the V-phase duty command value Dv2* of the inverter 260.

In step d10, the UVW-phase duty command update unit 610 sets the W-phase duty command operation value Dw2cal of the inverter 260 to the W-phase duty command value Dw2* of the inverter 260. Then, the UVW-phase duty command update unit 610 returns to a process of step d1.

In step d11, the UVW-phase duty command update unit 610 determines whether the value of the triangular wave carrier carrier2 is equal to the predetermined bottom value Cbt. In step d11, when the value of the triangular wave carrier carrier2 is equal to the predetermined bottom value Cbt, the UVW-phase duty command update unit 610 executes processes of steps d5 to d10 and then returns to the process of step d1. Meanwhile, in step d11, when the value of the triangular wave carrier carrier2 is not equal to the predetermined bottom value Cbt, the UVW-phase duty command update unit 610 returns to the process of step d1, without changing values of the UVW-phase duty command values Du1*, Dv1*, Dw1*, Du2*, Dv2*, and Dw2*.

The UVW-phase duty command update unit 610 repeats the processes described above and generates the UVW-phase duty command values Du1*, Dv1*, Dw1*, Du2*, Dv2*, and Dw2*. The generated UVW-phase duty command values Du1*, Dv1*, Dw1*, Du2*, Dv2*, and Dw2* are input to the switching signal generation unit 460.

As such, the UVW-phase duty command values Du1*, Dv1*, Dw1*, Du2*, Dv2*, and Dw2* are generated, so that the UVW-phase duty command values Du1*, Dv1*, Dw1*, Du2*, Dv2*, and Dw2* can be changed when the value of the triangular wave carrier carrier2 is matched with the predetermined peak value Cpk and when the value of the triangular wave carrier carrier2 is matched with the predetermined bottom value Cbt.

Next, a configuration of the duty command generation unit 450 of the boost converter 100 will be described.

Figure 9:
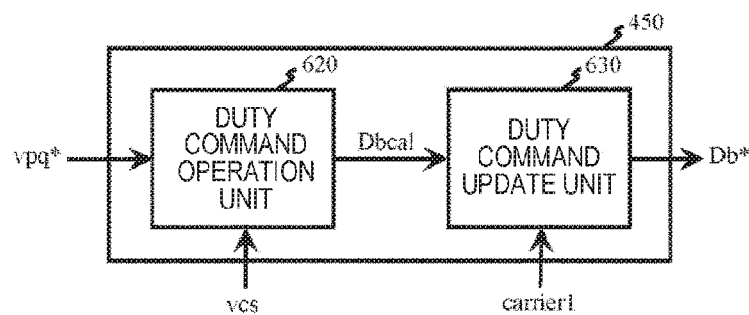
FIG. 9 is a diagram illustrating a configuration of a duty command generation unit 450 of a boost converter.

FIG. 9 is a diagram illustrating a configuration of the duty command generation unit 450. The duty command generation unit 450 includes a duty command operation unit 620 and a duty command, update unit 630. A process sequence of the duty command update unit 630 will be described using FIG. 10. The duty command operation unit 620 calculates a duty command operation value Dbcal of the boost converter, on the basis of the inter-P-Q voltage command value vpq* generated by the inter-P-Q voltage command generation unit 440 and the voltage value vcs of both ends of the smoothing capacitor 110.

Here, a method of calculating the duty command operation value Dbcal of the boost converter will be described in detail. The duty command operation unit 620 calculates the duty command value Dbcal for substituting the acquired inter-P-Q voltage command value vpq*, the voltage value vcs of both ends of the smoothing capacitor 110, the predetermined peak value Cpk, and the predetermined bottom value Cbt for a formula (11).

[Mathematical Formula 11]

$$Dbcal = \frac{vpq^* \cdot \left(\sqrt{Cpk^2} + \sqrt{Cbt^2}\right)}{vcs} + Cbt \quad (11)$$

The duty command operation unit 620 inputs the duty command operation value Dbcal calculated by the method described above to the duty command update unit 630.

The duty command update unit 630 calculates the duty command value Db* of the boost converter 100, on the basis of the duty command operation value Dbcal and the triangular wave carrier carrier1 for the boost converter 100.

Figure 10:
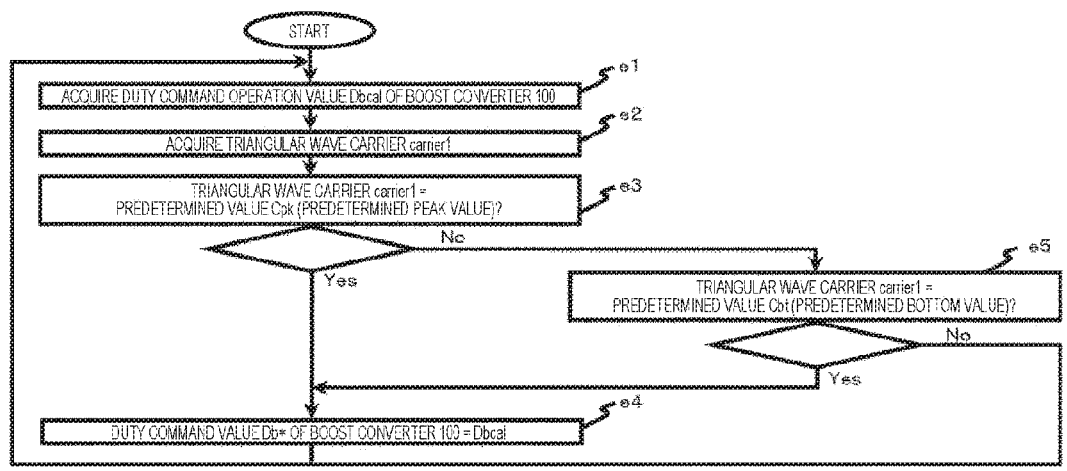
FIG. 10 illustrates a process sequence of a duty command update unit 630 of a boost converter.

FIG. 10 is a diagram illustrating a process sequence of the duty command update unit 630.

In step e1, the duty command update unit 630 acquires the duty command operation value Dbcal of the boost converter 100.

In step e2, the duty command update unit 630 acquires the triangular wave carrier carrier1. In addition, order of steps e1 and e2 may be changed.

In step e3, the duty command update unit 630 determines whether the value of the triangular wave carrier carrier1 is equal to the predetermined peak value Cpk. In step e3, when the value of the triangular wave carrier carrier1 is equal to the predetermined peak value Cpk, the duty command update unit 630 proceeds to step e4. Meanwhile, in step e3, when the value of the triangular wave carrier carrier1 is not equal to the predetermined peak value Cpk, the duty command update unit 630 proceeds to step e5.

In step e4, the duty command update unit 630 sets the duty command operation value Dbcal to the duty command value Db* and then returns to a process of step e1.

In step e5, the duty command update unit 630 determines whether the value of the triangular wave carrier carrier1 is equal to the predetermined bottom value Cbt. In step e5, when the value of the triangular wave carrier carrier1 is equal to the predetermined bottom value Cbt, the duty command update unit 630 executes a process of step e4 and then returns to the process of step e1. Meanwhile, in step e5, when the value of the triangular wave carrier carrier1 is not equal to the predetermined bottom value Cbt, the duty command update unit 630 returns to the process of step e1, without changing the value of the duty command value Db*.

The duty command update unit 630 repeats the processes described above and generates the duty command value Db*. The generated duty command value Db* is input to the switching signal generation unit 460.

As such, the duty command value Db* of the boost converter 100 is generated, so that the duty command value Db* of the boost converter can be changed when the value of the triangular wave carrier carrier1 for the boost converter is matched with the predetermined peak value Cpk and when the value of the triangular wave carrier carrier1 for the boost converter is matched with the predetermined bottom value Cbt.

Next, a configuration of the switching signal generation unit 460 will be described.

Figure 11:
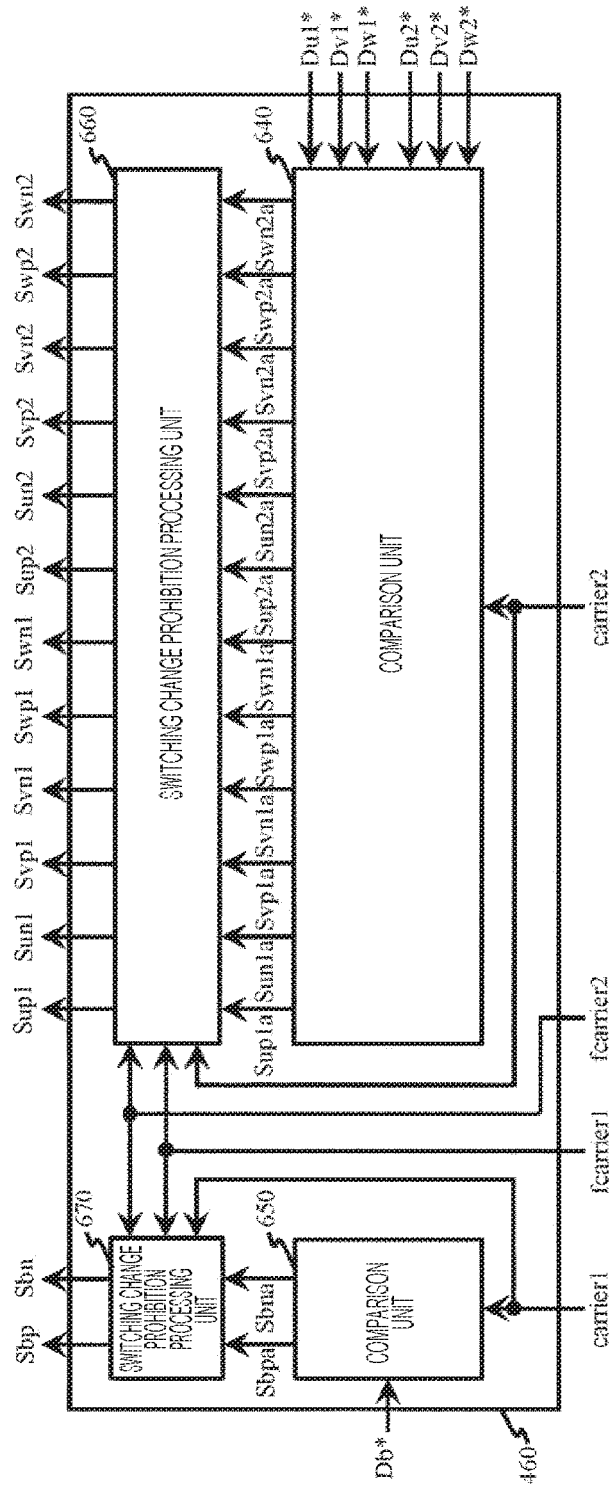
FIG. 11 is a diagram illustrating a configuration of a switching signal generation unit 460.

FIG. 11 is a diagram illustrating the configuration of the switching signal generation unit 460. The switching signal generation unit 460 has comparison units 640 and 650 and switching change prohibition processing unit 660 and 670.

The comparison unit 640 for the inverters compares the triangular wave carrier carrier2 and the UVW-phase duty command values Du1*, Dv1*, Dw1*, Du2*, Dv2*, and Dw2* for the inverters. The comparison unit 640 generates reference switching signals Sup1*a*, Sun1*a*, Svp1*a*, Svn1*a*, Swp1*a*, and Swn1*a* of the inverter 190, on the basis of the UVW-phase duty command values Du1*, Dv1*, and Dw1* of the inverter 190 and the triangular wave carrier carrier2 for the inverters. In addition, the comparison unit 640 generates reference switching signals Sup2*a*, Sun2*a*, Svp2*a*, Svn2*a*, Swp2*a*, and Swn2*a* of the inverter 260 on the basis of the UVW-phase duty command values Du2*, Dv2*, and Dw2* of the inverter 260 and the triangular wave carrier carrier2 for the inverters. A process sequence of the comparison unit 640 will be described using FIG. 12.

The comparison unit 650 for the boost converter compares the triangular wave carrier carrier1 for the boost converter and the duty command value Db* of the boost converter and generates reference switching signals Sbpa and Sbna. The comparison unit 650 generates the reference switching signals Sbpa and Sbna of the boost converter, on the basis of the duty command value Db* for the boost converter and the triangular wave carrier carrier1 for the boost converter. A process sequence of the comparison unit 650 will be described using FIG. 18.

The switching change prohibition processing unit 660 for the inverters prohibits a change of switching of the reference switching signals Sup1*a*, Sun1*a*, Svp1*a*, Svn1*a*, Swp1*a*, Swn1*a*, Sup2*a*, Sun2*a*, Svp2*a*, Svn2*a*, Swp2*a*, and Swn2*a* generated by the comparison unit 640. The switching change prohibition processing unit 660 generates the switching signals Sup1, Sun1, Svp1, Svn1, Swp1, and Swn1 of the UVW-phase upper and lower arms of the inverter 190 and the switching signals Sup2, Sun2, Svp2, Svn2, Swp2, and Swn2 of the UVW-phase upper and lower arms of the inverter 260, on the basis of the reference switching signals Sup1*a*, Sun1*a*, Svp1*a*, Svn1*a*, Swp1*a*, Swn1*a*, Sup2*a*, Sun2*a*, Svp2*a*, Svn2*a*, Swp2*a*, and Swn2*a*, the triangular wave carrier carrier2 and the carrier frequency fcarrier2 for the inverters, and the carrier frequency fcarrier1 for the boost converter. A process sequence of the switching change prohibition processing unit 660 will be described using FIG. 13.

The switching change prohibition processing unit 670 for the boost converter prohibits a change of switching of the reference switching signals Sbpa and Sbna generated by the comparison unit 650. The switching change prohibition processing unit 670 for the boost converter generates the switching signals Sbp and Sbn of the upper and lower arms of the boost converter, on the basis of the reference switching signals Sbpa and Sbna of the upper and lower arms of the boost converter, the triangular wave carrier carrier1 and the carrier frequency fcarrier1 for the boost converter, and the carrier frequency fcarrier2 for the inverters. A process sequence of the switching change prohibition processing unit 670 will be described using FIG. 19.

Figure 12:
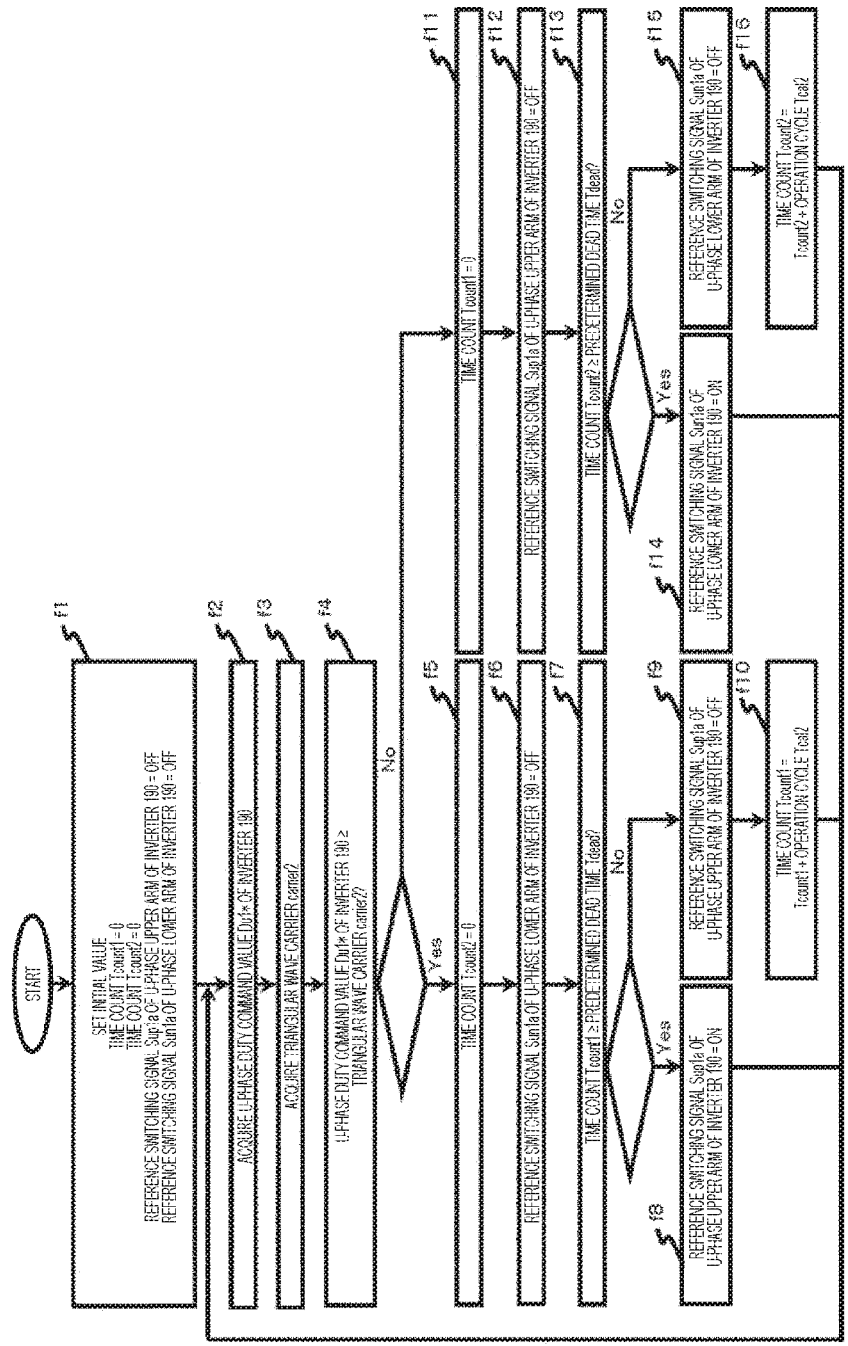
FIG. 12 illustrates a process sequence of a comparison unit 640 for an inverter.

FIG. 12 is a diagram illustrating a process sequence of the comparison unit 640 for the inverters. Here, a method of generating the reference switching signal Sup1*a* of the U-phase upper arm of the inverter 190 and the reference switching signal Sun1*a* of the U-phase lower arm of the inverter 190 will be described in detail.

In step f1, the comparison unit 640 sets time counts Tcount1 and Tcount2 to 0 and sets the reference switching signal Sup1*a* of the U-phase upper arm of the inverter 190 and the reference switching signal Sun1*a* of the U-phase lower arm of the inverter 190 to OFF.

In step f2, the comparison unit 640 acquires the U-phase duty command value Du1* of the inverter 190.

In step f3, the comparison unit 640 acquires the triangular wave carrier carrier2. In addition, order of processes of steps f2 and f3 may be changed.

In step f4, the comparison unit 640 determines whether the U-phase duty command value Du1* of the inverter 190 is equal to or larger than a value of the triangular wave carrier carrier2. In step f4, when the U-phase duty command value Du1* of the inverter 190 is equal to or larger than the value of the triangular wave carrier carrier2, the comparison unit 640 proceeds to step f5. Meanwhile, in step f4, when the U-phase duty command value Du1* of the inverter 190 is not equal to or larger than the value of the triangular wave carrier carrier2, the comparison unit 640 proceeds to step f11.

In step f5, the comparison unit 640 sets the time count Tcount2 to 0.

In step f6, the comparison unit 640 sets the reference switching signal Sun1*a* of the U-phase lower arm of the inverter 190 to OFF.

In step f7, the comparison unit 640 determines whether the time count Tcount1 is equal to or more than a predetermined dead time Tdead. In step f7, when the time count Tcount1 is equal to or more than the predetermined dead time Tdead, the comparison unit 640 proceeds to step f8. Meanwhile, in step f7, when the time count Tcount1 is not equal to or more than the predetermined dead time Tdead, the comparison unit 640 proceeds to step f9.

In step f8, the comparison unit 640 sets the reference switching signal Sup1*a* of the U-phase upper arm of the inverter 190 to ON and returns to a process of step f2.

In step f9, the comparison unit 640 sets the reference switching signal Sup1a of the U-phase upper arm of the inverter 190 to OFF.

In step f10, the comparison unit 640 adds an operation cycle Tcal2 of the switching signal generation unit 460 to the current time count Tcount1, updates a value of the time count Tcount1, and returns to the process of step f2.

In step f11, the comparison unit 640 sets the time count Tcount1 to 0.

In step f12, the comparison unit 640 sets the reference switching signal Sup1a of the U-phase upper arm of the inverter 190 to OFF.

In step f13, the comparison unit 640 determines whether the time count Tcount2 is equal to or more than the predetermined dead time Tdead. In step f13, when the time count Tcount2 is equal to or more than the predetermined dead time Tdead, the comparison unit 640 proceeds to step f14. Meanwhile, in step f13, when the time count Tcount2 is not equal to or more than the predetermined dead time Tdead, the comparison unit 640 proceeds to step f15.

In step f14, the comparison unit 640 sets the reference switching signal Sun1a of the U-phase lower arm of the inverter 190 to ON and returns to the process of step f2.

In step f15, the comparison unit 640 sets the reference switching signal Sun1a of the U-phase lower arm of the inverter 190 to OFF.

In step f16, the comparison unit 640 adds the operation cycle Tcal2 of the switching signal generation unit 460 to the current time count Tcount2, updates a value of the time count Tcount2, and returns to the process of step f2.

The comparison unit 640 repeats the processes described above and generates the reference switching signal Sup1a of the U-phase upper arm of the inverter 190 and the reference switching signal Sun1a of the U-phase lower arm of the inverter 190. The generated reference switching signals Sup1a and Sun1a are input to the switching change prohibition processing unit 660 for the inverters.

As such, the reference switching signal Sup1a of the U-phase upper arm of the inverter 190 and the reference switching signal Sun1a of the U-phase lower arm of the inverter 190 are generated, so that the reference switching signal Sup1a of the U-phase upper arm of the inverter 190 can change from OFF to ON, when the predetermined dead time Tdead passes after the U-phase duty command value Du1* of the inverter 190 becomes equal to or larger than the value of the triangular wave carrier carrier2. In addition, the reference switching signal Sup1a of the U-phase upper arm of the inverter 190 can change from ON to OFF, when the U-phase duty command value Du1* of the inverter 190 becomes smaller than the value of the triangular wave carrier carrier2. In addition, the reference switching signal Sun1a of the U-phase lower arm of the inverter 190 can change from ON to OFF, when the U-phase duty command value Du1* of the inverter 190 becomes equal to or larger than the value of the triangular wave carrier carrier2. In addition, the reference switching signal Sun1a of the U-phase lower arm of the inverter 190 can change from OFF to ON, when the predetermined dead time Tdead passes after the U-phase duty command value Du1* of the inverter 190 becomes smaller than the value of the triangular wave carrier carrier2.

Here, the method of generating the reference switching signal Sup1a of the U-phase upper arm of the inverter 190 and the reference switching signal Sun1a of the U-phase lower arm of the inverter 190 has been described. However, the reference switching signals Svp1a, Svn1a, Swp1a, and Swn1a of the upper and lower arms of the V and W phases of the inverter 190 and the reference switching signals Sup2a, Sun2a, Svp2a, Svn2a, Swp2a, and Swn2a of the UVW-phase upper and lower arms of the inverter 260 are generated on the basis of the process sequence described above.

Figure 13:
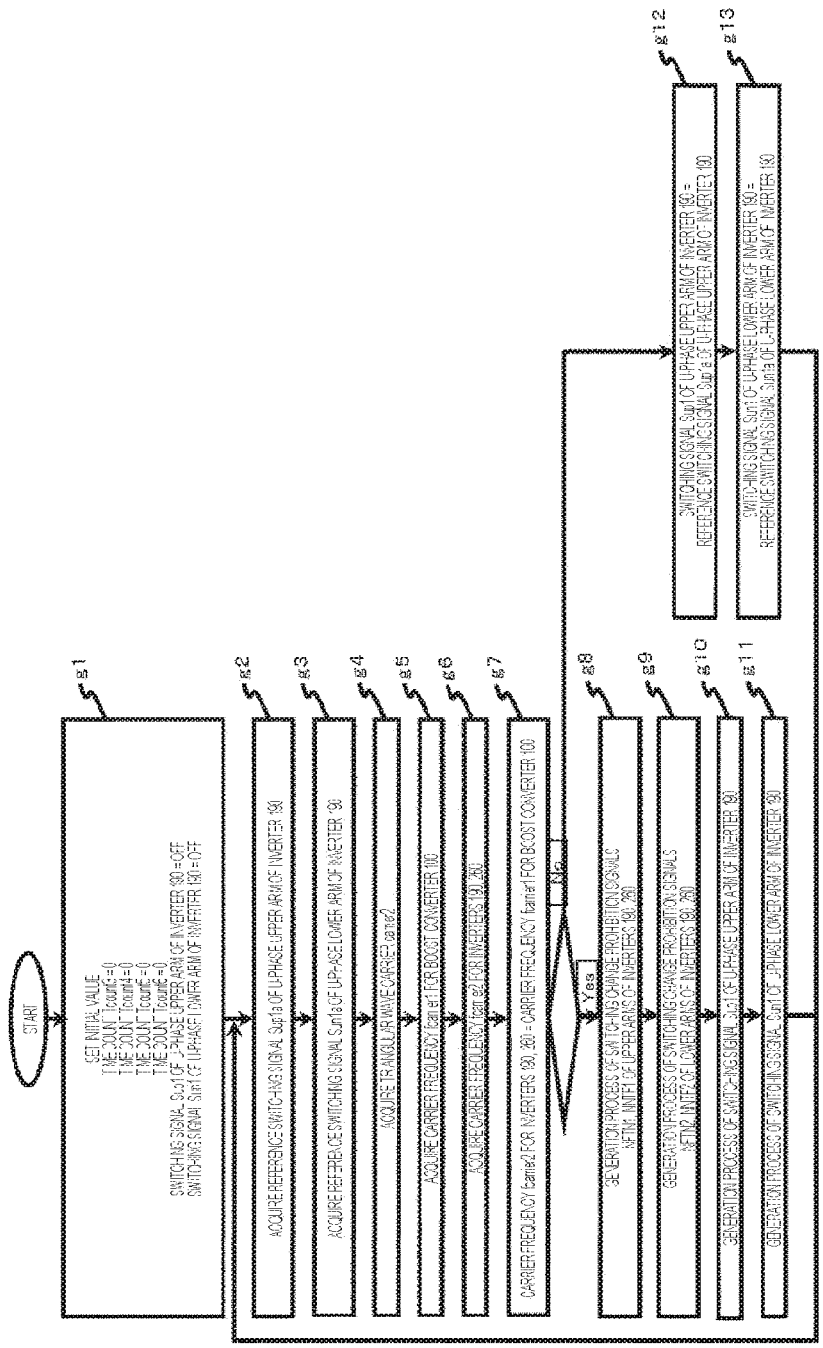
FIG. 13 illustrates a process sequence of a switching change prohibition processing unit 660 for an inverter.

FIG. 13 is a diagram illustrating a process sequence of the switching change prohibition processing unit 660 for the inverters. Here, a method of generating the switching signal Sup1 of the U-phase upper arm of the inverter 190 and the switching signal Sun1 of the U-phase lower arm of the inverter 190 will be described in detail.

In step g1, the switching change prohibition processing unit 660 sets time counts Tcount3, Tcount4, Tcount5, and Tcount6 to 0 and sets the switching signal Sup1 of the U-phase upper arm of the inverter 190 and the switching signal Sun1 of the U-phase lower arm of the inverter 190 to OFF.

In step g2, the switching change prohibition processing unit 660 acquires the reference switching signal Sup1a of the U-phase upper arm of the inverter 190.

In step g3, the switching change prohibition processing unit 660 acquires the reference switching signal Sun1a of the U-phase lower arm of the inverter 190.

In step g4, the switching change prohibition processing unit 660 acquires the triangular wave carrier carrier2 for the inverters 190 and 260.

In step g5, the switching change prohibition processing unit 660 acquires the carrier frequency fcarrier1 for the boost converter 100.

In step g6, the switching change prohibition processing unit 660 acquires the carrier frequency fcarrier2 for the inverters 190 and 260. In addition, order of processes of steps g2 to g6 may be changed.

In step g7, the switching change prohibition processing unit 660 determines whether the value of the carrier frequency fcarrier2 for the inverters is equal to the value of the carrier frequency fcarrier1 for the boost converter. In step g7, when the value of the carrier frequency fcarrier2 for the inverters is equal to the value of the carrier frequency fcarrier1 for the boost converter, the switching change prohibition processing unit 660 proceeds to step g8. Meanwhile, in step g7, when the value of the carrier frequency fcarrier2 for the inverters is not equal to the value of the carrier frequency fcarrier1 for the boost converter, the switching change prohibition processing unit 660 proceeds to step g12.

In step g8, the switching change prohibition processing unit 660 generates a signal NFTN1 to prohibit a change from OFF to ON in the UVW-phase upper arms of the inverters and a signal NNTF1 to prohibit a change from ON to OFF in the UVW-phase upper arms of the inverters. A detailed generation sequence of the switching change prohibition signals NFTN1 and NNTF1 will be described using FIG. 14.

In step g9, the switching change prohibition processing unit 660 generates a signal NFTN2 to prohibit a change from OFF to ON in the UVW-phase lower arms of the inverters and a signal NNTF2 to prohibit a change from ON to OFF in the UVW-phase lower arms of the inverters. A detailed generation sequence of the switching change prohibition signals NFTN2 and NNTF2 will be described using FIG. 15.

In step g10, the switching change prohibition processing unit 660 generates the switching signal Sup1, on the basis of the reference switching signal Sup1a and the switching change prohibition signals NFTN1 and NNTF1. A detailed generation sequence of the switching signal Sup1 will be described using FIG. 16.

In step g11, the switching change prohibition processing unit 660 generates the switching signal Sun1, on the basis of the reference switching signal Sun1a and the switching change prohibition signals NFTN2 and NNTF2, and then returns to a process of step g2. A detailed generation sequence of the switching signal Sun1 will be described using FIG. 17.

In step g12, the switching change prohibition processing unit 660 sets the reference switching signal Sup1a of the U-phase upper arm of the inverter 190 to the switching signal Sup1 of the U-phase upper arm of the inverter 190.

In step g13, the switching change prohibition processing unit 660 sets the reference switching signal Sun1a of the U-phase lower arm of the inverter 190 to the switching signal Sun1 of the U-phase lower arm of the inverter 190 and then returns to the process of step g2.

The switching change prohibition processing unit 660 repeats the processes described above and generates the switching signal Sup1 of the U-phase upper arm of the inverter 190 and the switching signal Sun1 of the U-phase lower arm of the inverter 190. The generated switching signal Sup1 of the U-phase upper arm of the inverter 190 and the generated switching signal Sun1 of the U-phase lower arm of the inverter 190 are input to the gate drive circuit 540.

Here, the method of generating the switching signal Sup1 of the U-phase upper arm of the inverter 190 and the switching signal Sun1 of the U-phase lower arm of the inverter 190 has been described. However, the switching signals Svp1, Svn1, Swp1, and Swn1 of the upper and lower arms of the V and W phases of the inverter 190 and the switching signals Sup2, Sun2, Svp2, Svn2, Swp2, and Swn2 of the UVW-phase upper and lower arms of the inverter 260 are generated on the basis of the process sequence described above.

Figure 14:
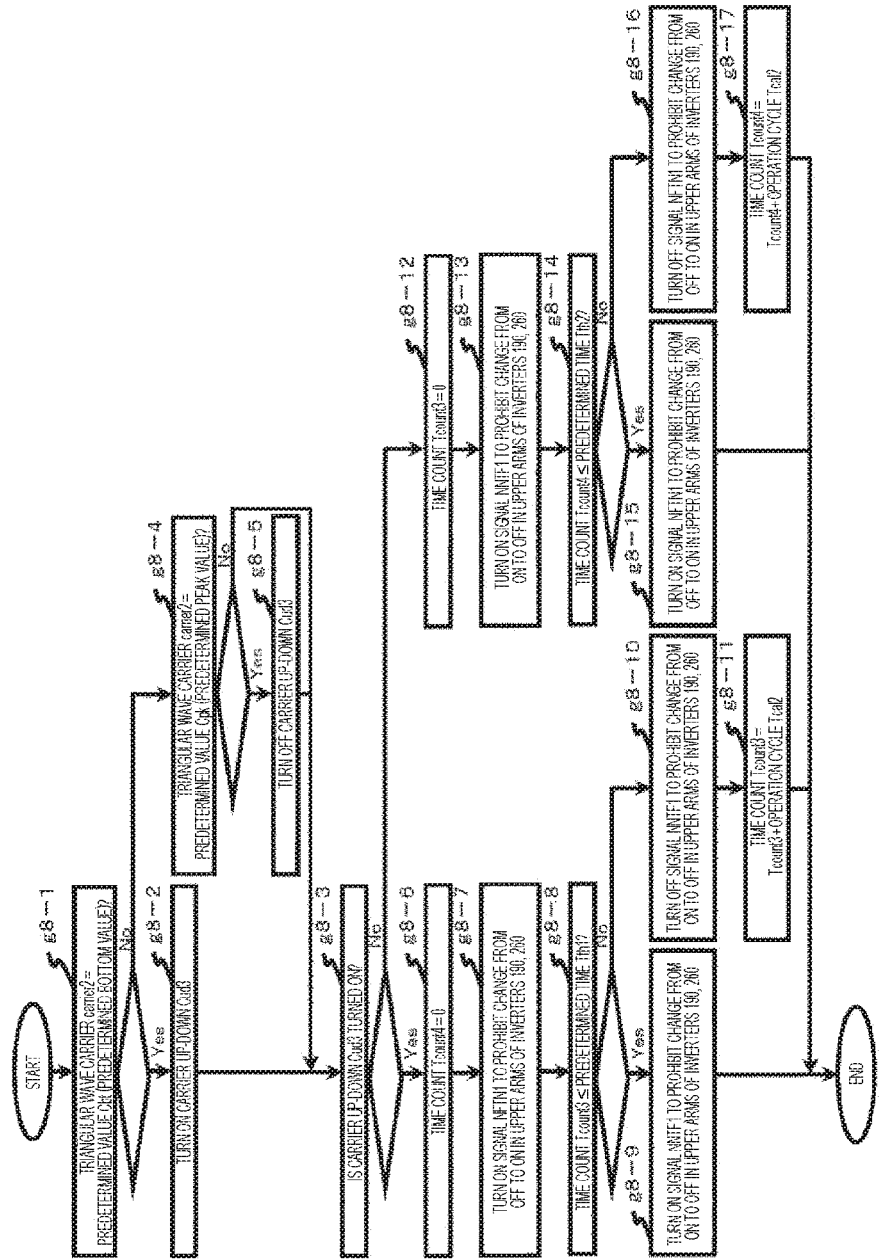
FIG. 14 is a diagram illustrating step g8 of FIG. 13.

FIG. 14 is a diagram illustrating a generation sequence (step g8) of the switching change prohibition signals NFTN1 and NNTF1 of the UVW-phase upper arms in the switching change prohibition processing unit 660 for the inverters illustrated in FIG. 13.

In step g8-1, the switching change prohibition processing unit 660 determines whether the value of the triangular wave carrier carrier2 is equal to the predetermined bottom value Cbt. In step g8-1, when the value of the triangular wave carrier carrier2 is equal to the predetermined bottom value Cbt, the switching change prohibition processing unit 660 proceeds to step g8-2. Meanwhile, in step g8-1, when the value of the triangular wave carrier carrier2 is not equal to the predetermined bottom value Cbt, the switching change prohibition processing unit 660 proceeds to step g8-4.

In step g8-2, the switching change prohibition processing unit 660 sets carrier up-down Cud3 to ON and proceeds to step g8-3.

Here, the carrier up-down Cud3 is used for determining whether the triangular wave carrier carrier2 rises from the predetermined bottom value Cbt to the predetermined peak value Cpk or falls from the predetermined peak value Cpk to the predetermined bottom value. Specifically, when the carrier up-down Cud3 is turned on, this period becomes a period where the triangular wave carrier carrier2 rises from, the predetermined bottom value Cbt to the predetermined peak value Cpk and when the carrier up-down Cud3 is turned off, this period becomes a period where the triangular wave carrier carrier2 falls from the predetermined peak value Cpk to the predetermined bottom value Cbt.

In step g8-3, the switching change prohibition processing unit 660 determines whether the carrier up-down Cud3 is turned on. In step g8-3, when the carrier up-down Cud3 is turned on, the switching change prohibition processing unit 660 proceeds to step g8-6. Meanwhile, in step g8-3, when the carrier up-down Cud3 is not turned on, the switching change prohibition processing unit 660 proceeds to step g8-12.

In step g8-4, the switching change prohibition processing unit 660 determines whether the value of the triangular wave carrier carrier2 is equal to the predetermined peak value Cpk. In step g8-4, when, the value of the triangular wave carrier carrier2 is equal to the predetermined peak value Cpk, the switching change prohibition processing unit 660 proceeds to step g8-5. Meanwhile, in step g8-4, when the value of the triangular wave carrier carrier2 is not equal to the predetermined peak value Cpk, the switching change prohibition processing unit 660 proceeds to a process of step g8-3, without changing a state of the carrier up-down Cud3.

In step g8-5, the switching change prohibition processing unit 660 sets the carrier up-down Cud3 to OFF and proceeds to the process of step g8-3.

In step g8-6, the switching change prohibition processing unit 660 sets the time count Tcount4 to 0.

In step g8-7, the switching change prohibition processing unit 660 sets the signal NFTN1 to prohibit the change from OFF to ON in the UVW-phase upper arms of the inverters to ON.

In step g8-8, the switching change prohibition processing unit 660 determines whether the time count Tcount3 is equal to or less than a predetermined time Tth1. In step g8-8, when the time count Tcount3 is equal to or less than the predetermined time Tth1, the switching change prohibition processing unit 660 proceeds to step g8-9. Meanwhile, in step g8-8, when the time count Tcount3 is not equal to or less than the predetermined time Tth1, the switching change prohibition processing unit 660 proceeds to step g8-10.

In step g8-9, the switching change prohibition processing unit 660 sets the signal NNTF1 to prohibit the change from ON to OFF in the UVW-phase upper arms of the inverters to ON.

In step g8-10, the switching change prohibition processing unit 660 sets the signal NNTF1 to prohibit the change from ON to OFF in the UVW-phase upper arms of the inverters to OFF.

In step g8-11, the switching change prohibition processing unit 660 adds the operation cycle Tcal2 of the switching signal generation unit 460 to the current time count Tcount3 and updates a value of the time count Tcount3.

In step g8-12, the switching change prohibition processing unit 660 sets the time count Tcount3 to 0.

In step g8-13, the switching change prohibition processing unit 660 sets the signal NNTF1 to prohibit the change from ON to OFF in the UVW-phase upper arms of the inverters to ON.

In step g8-14, the switching change prohibition processing unit 660 determines whether the time count Tcount4 is equal to or less than a predetermined time Tth2. In step g8-14, when the time count Tcount4 is equal to or less than the predetermined time Tth2, the switching change prohibition processing unit 660 proceeds to step g8-15. Meanwhile, in step g8-14, when the time count Tcount4 is not equal to or less than the predetermined time Tth2, the switching change prohibition processing unit 660 proceeds to step g8-16.

In step g8-15, the switching change prohibition processing unit 660 sets the signal NFTN1 to prohibit the change from OFF to ON in the UVW-phase upper arms of the inverters to ON.

In step g8-16, the switching change prohibition processing unit 660 sets the signal NFTN1 to prohibit the change from OFF to ON in the UVW-phase upper arms of the inverters to OFF.

In step g8-17, the switching change prohibition processing unit 660 adds the operation cycle Tcal2 of the switching signal generation unit 460 to the current time count Tcount4 and updates a value of the time count Tcount4.

The change from OFF to ON in the UVW-phase upper arms of the inverters is prohibited when the signal NFTN1 to prohibit the change from OFF to ON in the upper arms is turned on and is permitted when the signal NFTN1 to prohibit the change from OFF to ON in the upper arms is turned off. In addition, the change from ON to OFF in the upper arms is prohibited when the signal NNTF1 to prohibit the change from ON to OFF in the upper arms is turned on and is permitted when the signal NNTF1 to prohibit the change from ON to OFF in the upper arms is turned off.

Figure 15:
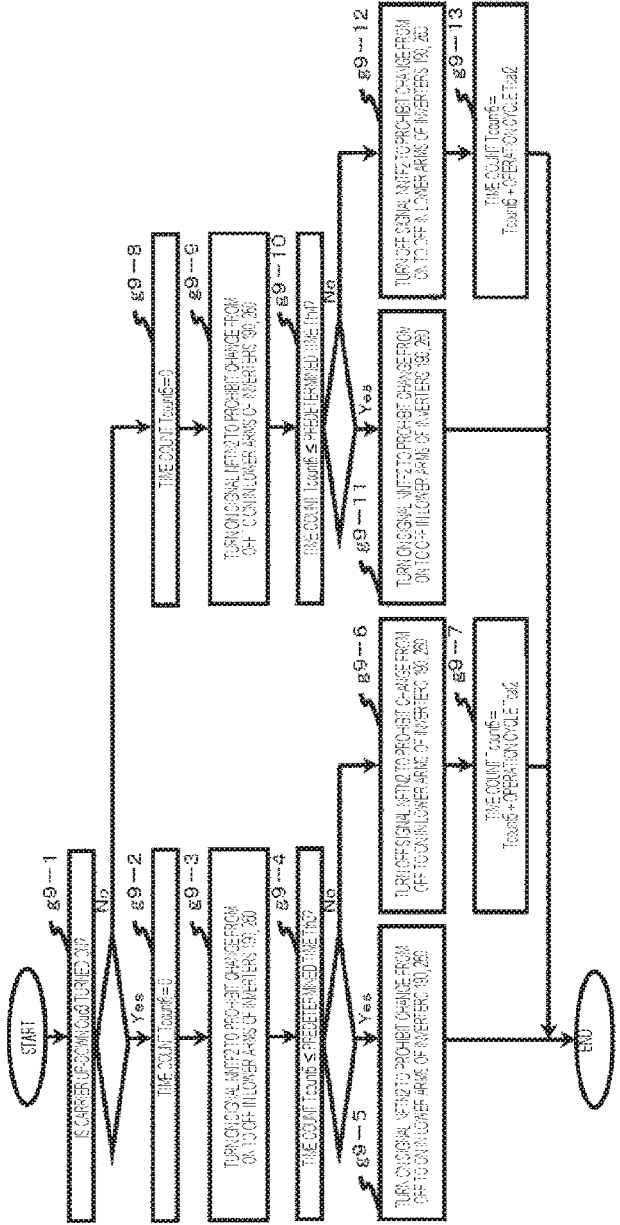
FIG. 15 is a diagram illustrating step g9 of FIG. 13.

FIG. 15 is a diagram illustrating a generation sequence of the switching change prohibition signals NFTN2 and NNTF2 of the UVW-phase lower arms in the switching change prohibition processing unit 660 for the inverters illustrated in FIG. 13.

In step g9-1, the switching change prohibition processing unit 660 determines whether the carrier up-down Cud3 is turned on. In step g9-1, when the carrier up-down Cud3 is turned on, the switching change prohibition processing unit 660 proceeds to step g9-2. Meanwhile, in step g9-1, when the carrier up-down Cud3 is not turned on, the switching change prohibition processing unit 660 proceeds to step g9-8.

In step g9-2, the switching change prohibition processing unit 660 sets the time count Tcount6 to 0.

In step g9-3, the switching change prohibition processing unit 660 sets the signal NNTF2 to prohibit the change from ON to OFF in the UVW-phase lower arms of the inverters to ON.

In step g9-4, the switching change prohibition processing unit 660 determines whether the time count Tcount5 is equal to or less than a predetermined time Tth3. In step g9-4, when the time count Tcount5 is equal to or less than the predetermined time Tth3, the switching change prohibition processing unit 660 proceeds to step g9-5. Meanwhile, in step g9-4, when the time count Tcount5 is not equal to or less than the predetermined time Tth3, the switching change prohibition processing unit 660 proceeds to step g9-6.

In step g9-5, the switching change prohibition processing unit 660 sets the signal NFTN2 to prohibit the change from OFF to ON in the UVW-phase lower arms of the inverters to ON.

In step g9-6, the switching change prohibition processing unit 660 sets the signal NFTN2 to prohibit the change from OFF to ON in the UVW-phase lower arms of the inverters to OFF.

In step g9-7, the switching change prohibition processing unit 660 adds the operation cycle Tcal2 of the switching signal generation unit 460 to the current time count Tcount5 and updates a value of the time count Tcount5.

In step g9-8, the switching change prohibition processing unit 660 sets the time count Tcount5 to 0.

In step g9-9, the switching change prohibition processing unit 660 sets the signal NFTN2 to prohibit the change from OFF to ON in the UVW-phase lower arms of the inverters to ON.

In step g9-10, the switching change prohibition processing unit 660 determines whether the time count Tcount6 is equal to or less than a predetermined time Tth4. In step g9-10, when the time count Tcount6 is equal to or less than the predetermined time Tth4, the switching change prohibition processing unit 660 proceeds to step g9-11. Meanwhile, in step g9-10, when the time count Tcount6 is not equal to or less than the predetermined time Tth4, the switching change prohibition processing unit 660 proceeds to step g9-12.

In step g9-11, the switching change prohibition processing unit 660 sets the signal NMTF2 to prohibit the change from ON to OFF in the UVW-phase lower arms of the inverters to ON.

In step g9-12, the switching change prohibition processing unit 660 sets the signal NNTF2 to prohibit the change from ON to OFF in the UVW-phase lower arms of the inverters to OFF.

In step g9-13, the switching change prohibition processing unit 660 adds the operation cycle Tcal2 of the switching signal generation unit 460 to the current time count Tcount6 and updates a value of the time count Tcount6.

The change from OFF to ON in the UVW-phase lower arms of the inverters is prohibited when the signal NFTN2 to prohibit the change from OFF to ON in the lower arms is turned on and is permitted when the signal NFTN2 to prohibit the change from OFF to ON in the lower arms is turned off. In addition, the change from ON to OFF in the lower arms is prohibited when the signal NNTF2 to prohibit the change from ON to OFF in the lower arms is turned on and is permitted when the signal NNTF2 to prohibit the change from ON to OFF in the lower arms is turned off. In addition, the predetermined time Tth1 is set to less than the predetermined time Tth3. The predetermined time Tth4 is set to less than the predetermined time Tth2.

As such, the predetermined times Tth1, Tth2, Tth3, and Th4 are set, so that the U-phase lower arm of the inverter 190 can be changed from OFF to ON after the U-phase upper arm of the inverter 190 is changed from ON to OFF. In addition, the U-phase upper arm of the inverter 190 can be changed from OFF to ON after the U-phase lower arm of the inverter 190 is changed from ON to OFF. As a result, the U-phase upper arm of the inverter 190 and the U-phase lower arm of the inverter 190 can be prevented from being turned on at the same time. This is applicable to the V and W phases of the inverter 190 and the U, V, and W phases of the inverter 260.

Figure 16:
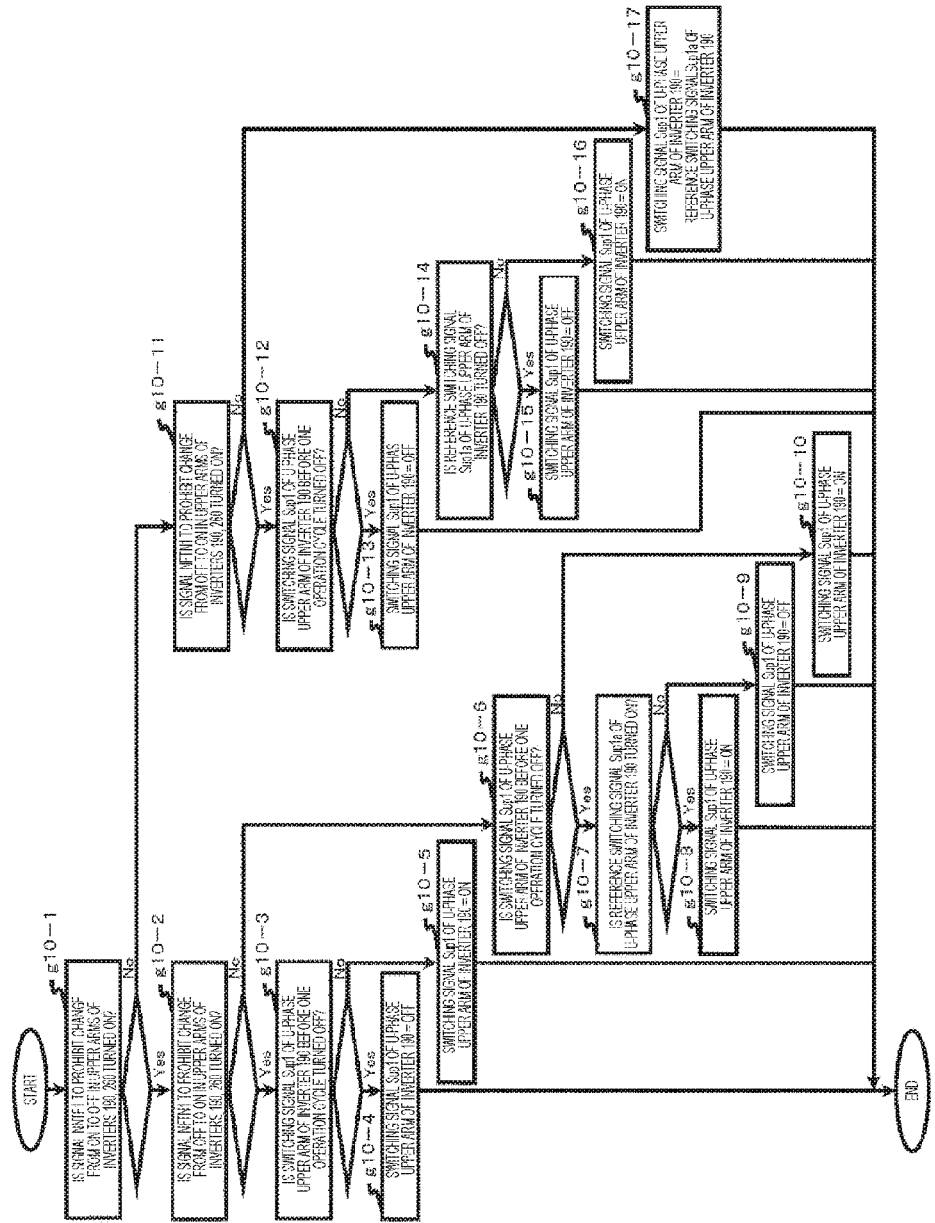
FIG. 16 is a diagram illustrating step g10 of FIG. 13.

FIG. 16 is a diagram illustrating a generation sequence of the switching signal Sup1 of the U-phase upper arm of the inverter 190 in the switching change prohibition processing unit 660 for the inverters illustrated in FIG. 13.

In step g10-1, the switching change prohibition processing unit 660 determines whether the signal NNTF1 to prohibit the change from ON to OFF in the UVW-phase upper arms of the inverters is turned on. In step g10-1, when the signal NNTF1 to prohibit the change from ON to OFF in the upper arms of the inverter is turned on, the switching change prohibition processing unit 660 proceeds to step g10-2. Meanwhile, in step g10-1, when the change prohibition signal NNTF1 is not turned on, the switching change prohibition processing unit 660 proceeds to step g10-11.

In step g10-2, the switching change prohibition processing unit 660 determines whether the signal NFTN1 to prohibit the change from OFF to ON in the UVW-phase upper arms of the inverters is turned on. In step g10-2, when the signal NFTN1 to prohibit the change from OFF to ON in the upper arms is turned on, the switching change prohibition processing unit 660 proceeds to step g10-3. Meanwhile, in step g10-2, when the change prohibition signal NFTN1 is not turned on, the switching change prohibition processing unit 660 proceeds to step g10-6.

In step g10-3, the switching change prohibition processing unit 660 determines whether the switching signal Sup1 of the U-phase upper arm of the inverter 190 before one operation cycle is turned off. In step g10-3, when the switching signal Sup1 before one operation cycle is turned off, the switching change prohibition processing unit 660 proceeds to step g10-4. Meanwhile, in step g10-3, when the switching signal Sup1 before one operation cycle is not turned off, the switching change prohibition processing unit 660 proceeds to step g10-5.

In step g10-4, the switching change prohibition processing unit 660 sets the switching signal Sup1 to OFF.

In step g10-5, the switching change prohibition processing unit 660 sets the switching signal Sup1 to ON.

In step g10-6, the switching change prohibition processing unit 660 determines whether the switching signal Sup1 before one operation cycle is turned off. In step g10-6, when the switching signal Sup1 before one operation cycle is turned off, the switching change prohibition processing unit 660 proceeds to step g10-7. Meanwhile, in step g10-6, when the switching signal Sup1 before one operation cycle is not turned off, the switching change prohibition processing unit 660 proceeds to step g10-10.

In step g10-7, the switching change prohibition processing unit 660 determines whether the reference switching signal Sup1*a* of the U-phase upper arm of the inverter is turned on. In step g10-7, when the reference switching signal Sup1*a* is turned on, the switching change prohibition processing unit 660 proceeds to step g10-8. Meanwhile, in step g10-7, when the reference switching signal Sup1*a* is not turned on, the switching change prohibition processing unit 660 proceeds to step g10-9.

In step g10-8, the switching change prohibition processing unit 660 sets the switching signal Sup1 to ON.

In step g10-9, the switching change prohibition processing unit 660 sets the switching signal Sup1 to OFF.

In step g10-10, the switching change prohibition processing unit 660 sets the switching signal Sup1 to ON.

In step g10-11, the switching change prohibition processing unit 660 determines whether the change prohibition signal NFTN1 is turned on. In step g10-11, when the change prohibition signal NFTN1 is turned on, the switching change prohibition processing unit 660 proceeds to step g10-12. Meanwhile, in step g10-11, when the change prohibition signal NFTN1 is not turned on, the switching change prohibition processing unit 660 proceeds to step g10-17.

In step g10-12, the switching change prohibition processing unit 660 determines whether the switching signal Sup1 before one operation cycle is turned off. In step g10-12, when the switching signal Sup1 before one operation cycle is turned off, the switching change prohibition processing unit 660 proceeds to step g10-13. Meanwhile, in step g10-12, when the switching signal Sup1 before one operation cycle is not turned off, the switching change prohibition processing unit 660 proceeds to step g10-14.

In step g10-13, the switching change prohibition processing unit 660 sets the switching signal Sup1 to OFF.

In step g10-14, the switching change prohibition processing unit 660 determines whether the reference switching signal Sup1*a* is turned off. In step g10-14, when the reference switching signal Sup1*a* is turned off, the switching change prohibition processing unit 660 proceeds to step g10-15. Meanwhile, in step g10-14, when the reference switching signal Sup1*a* is not turned off, the switching change prohibition processing unit 660 proceeds to step g10-16.

In step g10-15, the switching change prohibition processing unit 660 sets the switching signal Sup1 to OFF.

In step g10-16, the switching change prohibition processing unit 660 sets the switching signal Sup1 to ON.

In step g10-17, the switching change prohibition processing unit 660 sets the reference switching signal Sup1*a* to the switching signal Sup1.

The switching change prohibition processing unit 660 executes the processes described above and generates the switching signal Sup1 of the U-phase upper arm of the inverter 190. The generated switching signal Sup1 of the U-phase upper arm of the inverter 190 is input to the gate drive circuit 540.

As such, the switching signal Sup1 is generated, so that the switching signal Sup1 of the U-phase upper arm of the inverter can be prevented from, changing from ON to OFF, in a period where the signal NNTF1 to prohibit the change from ON to OFF in the UVW-phase upper arms of the inverters is turned on, in the case in which the carrier frequency fcarrier2 for the inverters is equal to the carrier frequency fcarrier1 for the boost converter. In addition, the switching signal Sup1 can be prevented from changing from OFF to ON, in a period where the signal NFTN1 to prohibit the change from OFF to ON in the UVW-phase upper arms of the inverters is turned on, in the case in which the carrier frequency fcarrier2 for the inverters is equal to the carrier frequency fcarrier1 for the boost converter.

That is, the switching signal Sup1 becomes a signal maintaining ON or OFF, in a period where both the change prohibition signal NNTF1 and the change prohibition signal NFTN1 are turned on, in the case in which the carrier frequency fcarrier2 for the inverters is equal to the carrier frequency fcarrier1 for the boost converter. In addition, the switching signal Sup1 becomes a signal of a state in which ON or OFF is maintained or a state in which the change from OFF to ON is made, in a period where the change prohibition signal NNTF1 is turned on and the change prohibition signal NFTN1 is turned off. In addition, the switching signal Sup1 becomes a signal of a state in which ON or OFF is maintained or a state in which the change from ON to OFF is made, in a period where the change prohibition signal NNTF1 is turned off and the change prohibition signal NFTN1 is turned on. In addition, the switching signal Sup1 becomes a signal of a state in which ON or OFF is maintained, a state in which the change from ON to OFF is made, or a state in which the change from OFF to ON is made, in a period where both the change prohibition signal NNTF1 and the change prohibition signal NFTN1 are turned off.

Here, the method of generating the switching signal Sup1 of the U-phase upper arm of the inverter 190 has been described. However, the switching signals Svp1 and Swp1 of the VW-phase upper arms of the inverter 190 and the switching signals Sup2, Svp2, and Swp2 of the UVW-phase upper arms of the inverter 260 are generated on the basis of the process sequence described above.

Figure 17:
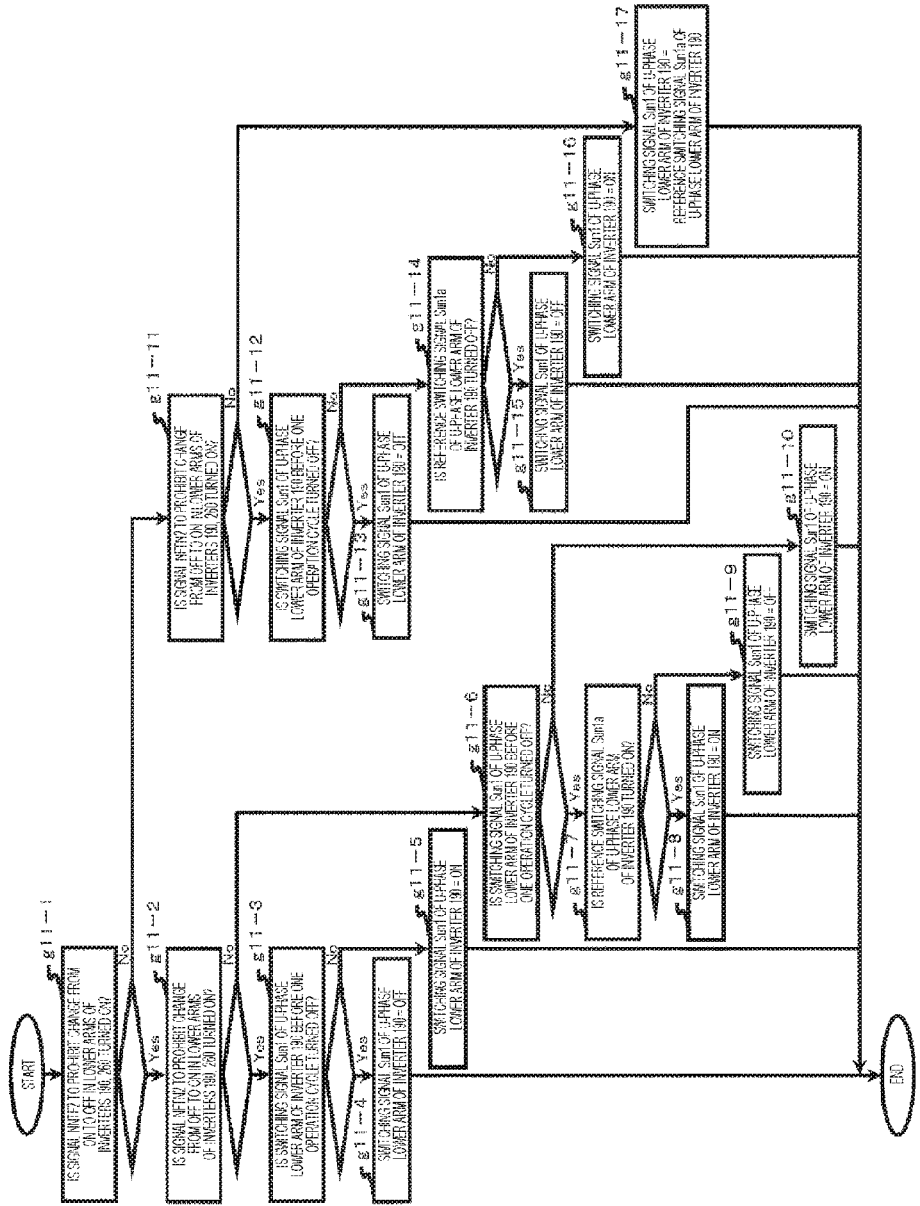
FIG. 17 is a diagram illustrating step g11 of FIG. 13.

FIG. 17 is a diagram illustrating a generation sequence of the switching signal Sun1 of the U-phase lower arm of the inverter 190 in the switching change prohibition processing unit 660 for the inverters illustrated in FIG. 13.

In step g11-1, the switching change prohibition processing unit 660 determines whether the signal NNTF2 to prohibit the change from ON to OFF in the UVW-phase lower arms of the inverters 190 and 260 is turned on. In step g11-1, when the change prohibition signal NNTF2 is turned on, the switching change prohibition processing unit 660 proceeds to step g11-2.

In step g11-2, the switching change prohibition processing unit 660 determines whether the change prohibition signal NFTN2 is turned on. In step g11-2, when the change prohibition signal NFTN2 is turned on, the switching change prohibition processing unit 660 proceeds to step g11-3. Meanwhile, in step g11-2, when the change prohibition signal NFTN2 is not turned, on, the switching change prohibition processing unit 660 proceeds to step g11-6.

In step g11-3, the switching change prohibition processing unit 660 determines whether the switching signal Sun1 of the U-phase lower arm of the inverter 190 before one operation cycle is turned off. In step g11-3, when the switching signal Sun1 before one operation cycle is turned off, the switching change prohibition processing unit 660 proceeds to step g11-4.

In step g11-4, the switching change prohibition processing unit 660 sets the switching signal Sun1 to OFF. In addition, in step g11-3, when the switching signal Sun1 before one operation cycle is not turned off, the switching change prohibition processing unit 660 proceeds to step g11-5.

In step g11-5, the switching change prohibition processing unit 660 sets the switching signal Sun1 to ON.

In step g11-6, the switching change prohibition processing unit 660 determines whether the switching signal Sun1 before one operation cycle is turned off. In step g11-6, when the switching signal Sun1 before one operation cycle is turned off, the switching change prohibition processing unit 660 proceeds to step g11-7. Meanwhile, in step g11-6, when the switching signal Sun1 before one operation cycle is not turned off, the switching change prohibition processing unit 660 proceeds to step g11-10.

In step g11-7, the switching change prohibition processing unit 660 determines whether the reference switching signal Sun1$a$ is turned on. In step g11-7, when the reference switching signal Sun1$a$ is turned on, the switching change prohibition processing unit 660 proceeds to step g11-8.

In step g11-8, the switching change prohibition processing unit 660 sets the switching signal Sun1 to ON. In addition, in step g11-7, when the reference switching signal Sun1$a$ is not turned on, the switching change prohibition processing unit 660 proceeds to step g11-9.

In step g11-9, the switching change prohibition processing unit 660 sets the switching signal Sun1 to OFF.

In step g11-10, the switching change prohibition processing unit 660 sets the switching signal Sun1 to ON. In addition, in step g11-1, when the change prohibition signal NNTF2 is not turned on, the switching change prohibition processing unit 660 proceeds to step g11-11.

In step g11-11, the switching change prohibition processing unit 660 determines whether the change prohibition signal NFTN2 is turned on. In step g11-11, when the change prohibition signal NFTN2 is turned on, the switching change prohibition processing unit 660 proceeds to step g11-12. Meanwhile, in step g11-11, when the change prohibition signal NFTN2 is not turned on, the switching change prohibition processing unit 660 proceeds to step g11-17.

In step g11-12, the switching change prohibition processing unit 660 determines whether the switching signal Sun1 before one operation cycle is turned off. In step g11-12, when the switching signal Sun1 before one operation cycle is turned off, the switching change prohibition processing unit 660 proceeds to step g11-13.

In step g11-13, the switching change prohibition processing unit 660 sets the switching signal Sun1 to OFF. In addition, in step g11-12, when the switching signal Sun1 before one operation cycle is not turned off, the switching change prohibition processing unit 660 proceeds to step g11-14.

In step g11-14, the switching change prohibition processing unit 660 determines whether the reference switching signal Sun1$a$ is turned off. In step g11-14, when the reference switching signal Sun1$a$ is turned off, the switching change prohibition processing unit 660 proceeds to step g11-15. Meanwhile, in step g11-14, when the reference switching signal Sun1$a$ is not turned off, the switching change prohibition processing unit 660 proceeds to step g11-16.

In step g11-15, the switching change prohibition processing unit 660 sets the switching signal Sun1 to OFF.

In step g11-16, the switching change prohibition processing unit 660 sets the switching signal Sun1 to ON.

In step g11-17, the switching change prohibition processing unit 660 sets the reference switching signal Sun1$a$ to the switching signal Sun1.

The switching change prohibition processing unit 660 executes the processes described above and generates the switching signal Sun1 of the U-phase lower arm of the inverter 190. The generated switching signal Sun1 is input to the gate drive circuit 540.

As such, the switching signal Sun1 is generated, so that the switching signal Sun1 of the U-phase lower arm of the inverter 190 can be prevented from changing from ON to OFF, in a period where the signal NMTF2 to prohibit the change from ON to OFF in the UVW-phase lower arms of the inverters is turned on, in the case in which the carrier frequency fcarrier2 for the inverters is equal to the carrier frequency fcarrier1 for the boost converter. In addition, the switching signal Sun1 of the U-phase lower arm of the inverter 190 can be prevented from changing from OFF to ON, in a period where the change prohibition signal NFTN2 is turned on, in the case in which the carrier frequency fcarrier2 for the inverters is equal to the carrier frequency fcarrier1 for the boost converter.

That is, the switching signal Sun1 of the U-phase lower arm of the inverter becomes a signal maintaining ON or OFF, in a period where both the signal NNTF2 to prohibit the change from ON to OFF in the UVW-phase lower arms of the inverters and the signal NFTN2 to prohibit the change from OFF to ON in the UVW-phase lower arms of the inverters are turned on, in the case in which the carrier frequency fcarrier2 for the inverters is equal to the carrier frequency fcarrier1 for the boost converter. In addition, the switching signal Sun1 becomes a signal of a state in which ON or OFF is maintained or a state in which the change from OFF to ON is made, in a period where the change prohibition signal NNTF2 is turned on and the change prohibition signal NFTN2 is turned off. In addition, the switching signal Sun1 becomes a signal of a state in which ON or OFF is maintained or a state in which the change from ON to OFF is made, in a period where the change prohibition signal NNTF2 is turned off and the change prohibition signal NFTN2 are turned on. In addition, the switching signal Sun1 becomes a signal of a state in which ON or OFF is maintained, a state in which the change from ON to OFF is made, or a state in which the change from OFF to ON is made, in a period where both the change prohibition signal NNTF2 and the change prohibition signal NFTN2 are turned off.

Here, the method of generating the switching signal Sun1 of the U-phase lower arm of the inverter 190 has been described. However, the switching signal Svn1 and Swn1 of the VW-phase lower arms of the inverter 190 and the switching signals Sun2, Svn2, and Swn2 of the UVW-phase lower arms of the inverter 260 are generated on the basis of the process sequence described above.

Figure 18:
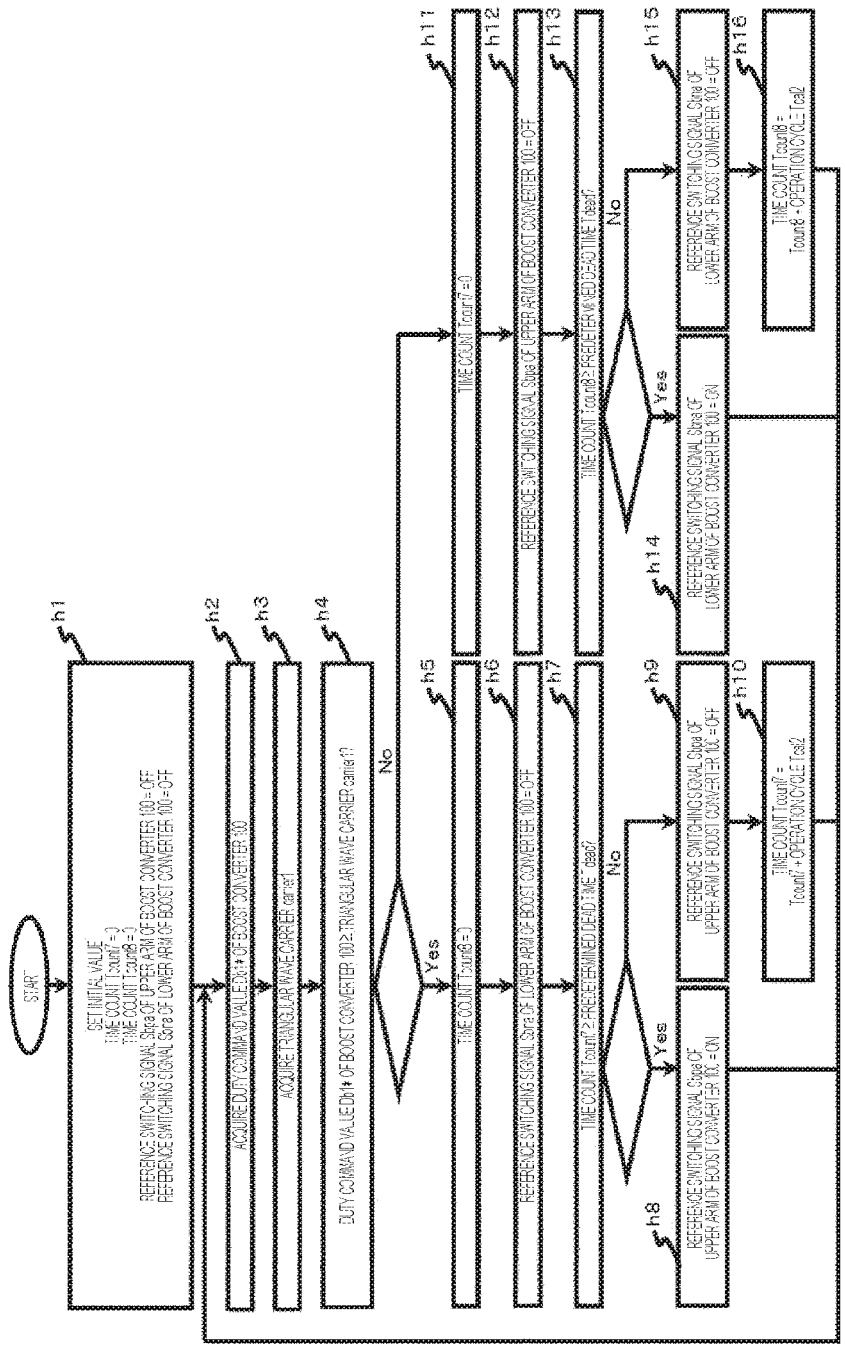
FIG. 18 is a diagram illustrating a process sequence of a comparison unit 650 for a boost converter.

FIG. 18 is a diagram illustrating a process sequence of the comparison unit 650 for the boost converter.

In step h1, the comparison unit 650 sets time counts Tcount7 and Tcount8 to 0 and sets the reference switching signal Sbpa of the upper arm of the boost converter and the reference switching signal Sbna of the lower arm of the boost converter to OFF.

In step h2, the comparison unit 650 acquires the duty command value Db* of the boost converter.

In step h3, the comparison unit 650 acquires the triangular wave carrier carrier1 for the boost converter. In addition, order of processes of steps h2 and h3 may be changed.

In step h4, the comparison unit 650 determines whether the duty command value Db* of the boost converter is equal to or larger than a value of the triangular wave carrier carrier1. In step h4, when the duty command value Db* is equal to or larger than the value of the triangular wave carrier carrier1, the comparison unit 650 proceeds to step h5. Meanwhile, in step h4, when the duty command value Db* is not equal to or larger than the value of the triangular wave carrier carrier1, the comparison unit 650 proceeds to step h11.

In step h5, the comparison unit 650 sets the time count Tcount5 to 0.

In step h6, the comparison unit 650 sets the reference switching signal Sbna of the lower arm of the boost converter to OFF.

In step h7, the comparison unit 650 determines whether the time count Tcount7 is equal to or more than the predetermined dead time Tdead. In step h7, when the time count Tcount7 is equal to or more than the predetermined dead time Tdead, the comparison unit 650 proceeds to step h8. Meanwhile, in step h7, when the time count Tcount7 is not equal to or more than the predetermined dead time Tdead, the comparison unit 650 proceeds to step h9.

In step h8, the comparison unit 650 sets the reference switching signal Sbpa of the upper arm of the boost converter to ON and then returns to a process of step h2.

In step h9, the comparison unit sets the reference switching signal Sbpa of the upper arm of the boost converter to OFF.

In step h10, the comparison unit 650 adds an operation cycle Tcal2 of the switching signal generation unit 460 to the current time count Tcount7, updates a value of the time count Tcount7, and returns to the process of step h2.

In step h11, the comparison unit 650 sets the time count Tcount7 to 0.

In step h12, the comparison unit 650 sets the reference switching signal Sbpa of the upper arm of the boost converter to OFF.

In step h13, the comparison unit 650 determines whether the time count Tcount8 is equal to or more than the predetermined dead time Tdead. In step h13, when the time count Tcount8 is equal to or more than the predetermined dead time Tdead, the comparison unit 650 proceeds to step h14. Meanwhile, in step h13, when the time count Tcount5 is not equal to or more than the predetermined dead time Tdead, the comparison unit 650 proceeds to step h15.

In step h14, the comparison unit 650 sets the reference switching signal Sbna of the lower arm of the boost converter to ON and then returns to the process of step h2.

In step h15, the comparison unit 650 sets the reference switching signal Sbna of the lower arm of the boost converter to OFF.

In step h16, the comparison unit 650 adds the operation cycle Tcal2 of the switching signal generation unit 460 to the current time count Tcount5, updates a value of the time count Tcount5, and returns to the process of step h2.

The comparison unit 650 for the boost converter repeats the processes described above and generates the reference switching signal Sbpa of the upper arm of the boost converter and the reference switching signal Sbna of the lower arm of the boost converter. The generated reference switching signals Sbpa and Sbna are input to the switching change prohibition processing unit 660 for the inverters.

As such, the reference switching signal Sbpa of the upper arm of the boost converter and the reference switching signal Sbna of the lower arm of the boost converter are generated, so that the reference switching signal Sbpa can change from OFF to ON, when the predetermined dead time Tdead passes after the duty command value Db* of the boost converter becomes equal to or larger than the value of the triangular wave carrier carrier1. In addition, the reference switching signal Sbpa can change from ON to OFF, when the duty command value Db* becomes smaller than the value of the triangular wave carrier carrier1. In addition, the reference switching signal Sbna can change from ON to OFF, when the duty command value Db* becomes equal to or larger than the value of the triangular wave carrier carrier1. In addition, the reference switching signal Sbna can change from OFF to ON, when the predetermined dead time Tdead passes after the duty command value Db* becomes smaller than the value of the triangular wave carrier carrier1.

Figure 19:
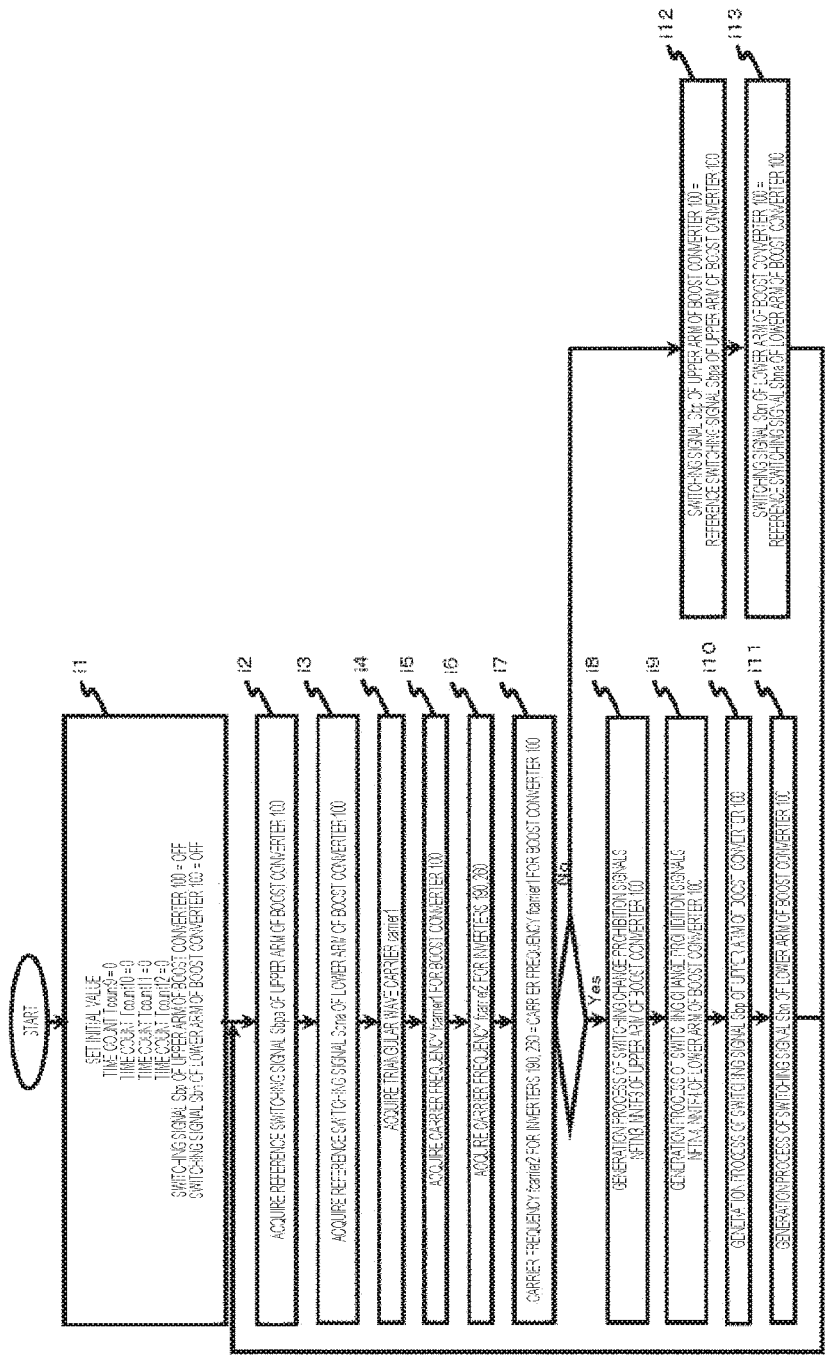
FIG. 19 illustrates a process sequence of a switching change prohibition processing unit 670 for a boost converter.

FIG. 19 is a diagram illustrating a process sequence of the switching change prohibition processing unit 670 for the boost converter.

In step i1, the switching change prohibition processing unit 670 sets time counts Tcount9, Tcount10, Tcount11, and Tcount12 to 0 and sets the switching signal Sbp of the upper arm of the boost converter and the switching signal Sbn of the lower arm of the boost converter to OFF.

In step i2, the switching change prohibition processing unit 670 acquires the reference switching signal Sbpa of the upper arm of the boost converter.

In step i3, the switching change prohibition processing unit 670 acquires the reference switching signal Sbna of the lower arm of the boost converter.

In step i4, the switching change prohibition processing unit 670 acquires the triangular wave carrier carrier1 for the boost converter.

In step i5, the switching change prohibition processing unit 670 acquires the carrier frequency fcarrier1 for the boost converter.

In step i6, the switching change prohibition processing unit 670 acquires the carrier frequency fcarrier2 for the inverters. In addition, order of processes of steps i2 to i6 may be changed.

In step i7, the switching change prohibition processing unit 670 determines whether the value of the carrier frequency fcarrier2 for the inverters is equal to the value of the carrier frequency fcarrier1 for the boost converter. In step i7, when the value of the carrier frequency fcarrier2 for the inverters is equal to the value of the carrier frequency fcarrier1 for the boost converter, the switching change prohibition processing unit 670 proceeds to step i8. Meanwhile, in step i7, when the value of the carrier frequency fcarrier2 for the inverters is not equal to the value of the carrier frequency fcarrier1 for the boost converter, the switching change prohibition processing unit 670 proceeds to step i12.

In step i8, the switching change prohibition processing unit 670 generates a signal NFTN3 to prohibit a change from OFF to ON in the upper arm of the boost converter and a signal NNTF3 to prohibit a change from ON to OFF in the upper arm of the boost converter. A detailed generation sequence of the switching change prohibition signals NFTN3 and NNTF3 will be described in detail using FIG. 20.

In step i9, the switching change prohibition processing unit 670 generates a signal NFTN4 to prohibit a change from OFF to ON in the lower arm of the boost converter and a signal NNTF4 to prohibit a change from ON to OFF in the lower arm of the boost converter. A detailed generation sequence of the switching change prohibition signals NFTN4 and NNTF4 will be described using FIG. 21.

In step i10, the switching change prohibition processing unit 670 generates the switching signal Sbp of the upper arm of the boost converter, on the basis of the reference switching signal Sbpa and the switching change prohibition signals NFTN3 and NNTF3. A detailed generation sequence of the switching signal Sbp will be described using FIG. 22.

In step i11, the switching change prohibition processing unit 670 generates the switching signal. Sbn of the lower arm of the boost converter, on the basis of the reference switching signal Sbna and the switching change prohibition signals NFTN4 and NNTF4, and returns to a process of step i2. A detailed generation sequence of the switching signal Sbn will be described using FIG. 23.

In step i12, the switching change prohibition processing unit 670 sets the reference switching signal Sbpa to the switching signal Sbp.

In step i13, the switching change prohibition processing unit 670 sets the reference switching signal Sbna to the switching signal Sbn and returns to the process of step i2.

The switching change prohibition processing unit 670 for the boost converter repeats the processes described above and generates the switching signal Sbp of the upper arm of the boost converter and the switching signal Sbn of the lower arm of the boost converter. The generated switching signals Sbp and Sbn are input to the gate drive circuit 540.

Figure 20:
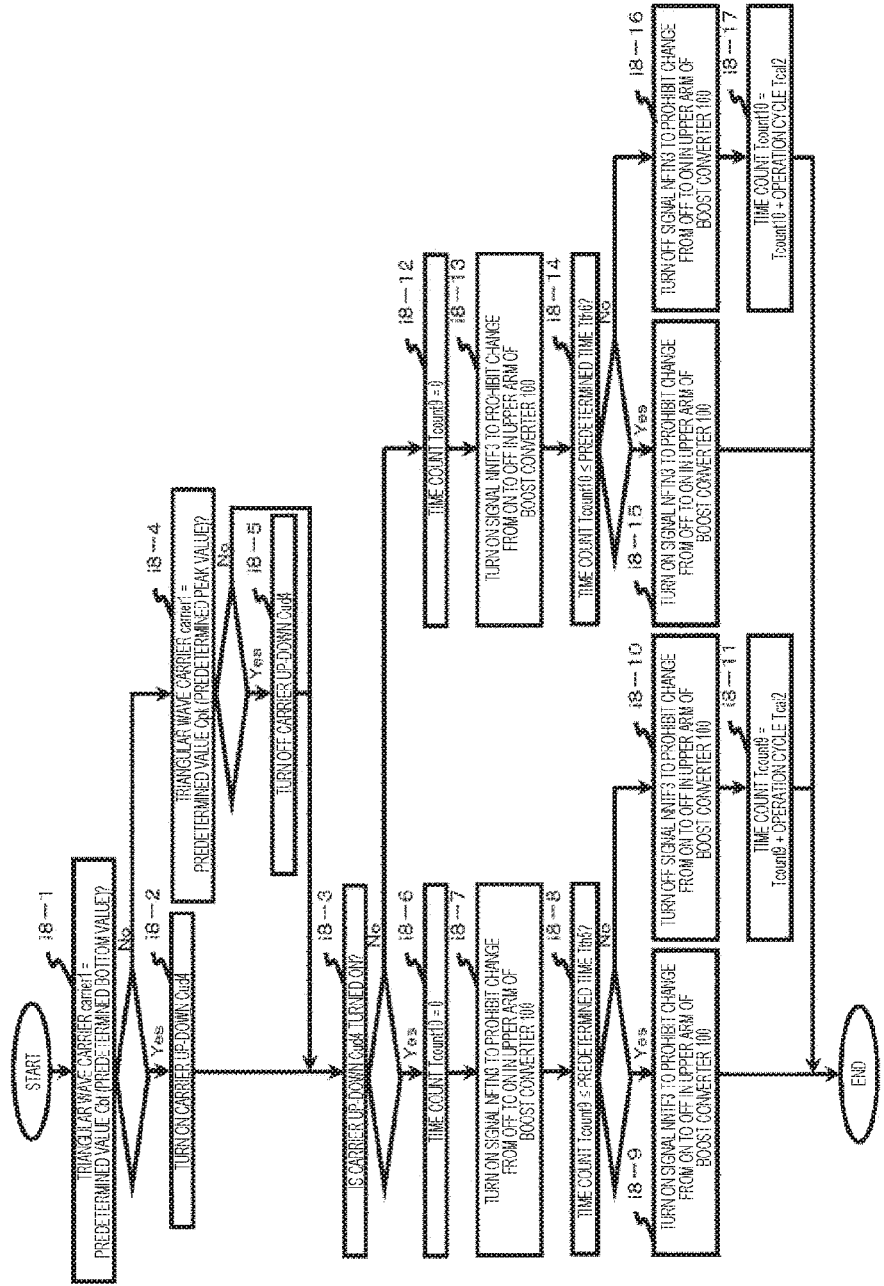
FIG. 20 is a diagram illustrating step i8 of FIG. 19.

FIG. 20 is a diagram illustrating a generation sequence of the switching change prohibition signals NFTN3 and NNTF3 in the switching change prohibition processing unit 670 for the boost converter illustrated in FIG. 19.

In step i8-1, the switching change prohibition processing unit 670 determines whether the value of the triangular wave carrier carrier1 for the boost converter is equal to the predetermined bottom value Cbt. In step i8-1, when the value of the triangular wave carrier carrier1 is equal to the predetermined bottom value Cbt, the switching change prohibition processing unit 670 proceeds to step i8-2. Meanwhile, in step i8-1, when the value of the triangular wave carrier carrier1 is not equal to the predetermined bottom value Cbt, the switching change prohibition processing unit 670 proceeds to step i8-4.

In step i8-2, the switching change prohibition processing unit 670 sets carrier up-down Cud4 to ON and proceeds to step i8-3.

In step i8-3, the switching change prohibition processing unit 670 determines whether the carrier up-down Cud4 is turned on. In step i8-3, when the carrier up-down Cud4 is turned on, the switching change prohibition processing unit 670 proceeds to step i8-6. Meanwhile, in step i8-3, when the carrier up-down Cud4 is not turned on, the switching change prohibition processing unit 670 proceeds to step i8-12.

In step i8-4, the switching change prohibition on processing unit 670 determines whether the value of the triangular wave carrier carrier1 is equal to the predetermined peak value Cpk. In step i8-4, when the value of the triangular wave carrier carrier1 is equal to the predetermined peak value Cpk, the switching change prohibition processing unit 670 proceeds to step i8-5. Meanwhile, in step i8-4, when the value of the triangular wave carrier carrier1 is not equal to the predetermined peak value Cpk, the switching change prohibition processing unit 670 proceeds to step i8-3, without changing a state of the carrier up-down Cud4.

Here, the carrier up-down Cud4 is used for determining whether the triangular wave carrier carrier1 for the boost converter rises from the predetermined bottom value Cbt to the predetermined peak value Cpk or falls from the predetermined peak value Cpk to the predetermined bottom value. Specifically, when the carrier up-down Cud4 is turned on, this period becomes a period where the triangular wave carrier carrier1 rises from the predetermined bottom, value Cbt to the predetermined peak value Cpk and when the carrier up-down Cud4 is turned off, this period becomes a period where the triangular wave carrier carrier1 falls from, the predetermined peak value Cpk to the predetermined bottom value Cbt.

In step i8-5, the switching change prohibition processing unit 670 sets the carrier up-down Cud4 to OFF and proceeds to step i8-3.

In step i8-6, the switching change prohibition processing unit 670 sets the time count Tcount10 to 0.

In step i8-7, the switching change prohibition processing unit 670 sets the signal NFTN3 to prohibit the change from OFF to ON in the upper arm of the boost converter to ON.

In step i8-8, the switching change prohibition processing unit 670 determines whether the time count Tcount9 is equal to or less than a predetermined time Tth5. In step i8-8, when the time count Tcount9 is equal to or less than the predetermined time Tth5, the switching change prohibition processing unit 670 proceeds to step i8-9. Meanwhile, in step i8-8, when the time count Tcount9 is not equal to or less than the predetermined time Tth5, the switching change prohibition processing unit 670 proceeds to step i8-10.

In step i8-9, the switching change prohibition processing unit 670 sets the change prohibition signal NNTF3 to ON.

In step i8-10, the switching change prohibition processing unit 670 sets the change prohibition signal NNTF3 to OFF.

In step i8-11, the switching change prohibition processing unit 670 adds the operation cycle Tcal2 of the switching signal generation unit 460 to the current time count Tcount9 and updates a value of the time count Tcount9.

In step i8-12, the switching change prohibition processing unit 670 sets the time count Tcount9 to 0.

In step i8-13, the switching change prohibition processing unit 670 sets the change prohibition signal NNTF3 to ON.

In step i8-14, the switching change prohibition processing unit 670 determines whether the time count Tcount10 is equal to or less than a predetermined time Tth6. In step i8-14, when the time count Tcount10 is equal to or less than the predetermined time Tth6, the switching change prohibition processing unit 670 proceeds to step i8-15. Meanwhile, in step i8-14, when the time count Tcount10 is not equal to or less than the predetermined time Tth6, the switching change prohibition processing unit 670 proceeds to step i8-16.

In step i8-15, the switching change prohibition processing unit 670 sets the change prohibition signal NFTN3 to ON.

In step i8-16, the switching change prohibition processing unit 670 sets the change prohibition signal NFTN3 to OFF.

In step i8-17, the switching change prohibition processing unit 670 adds the operation cycle Tcal2 of the switching signal generation unit 460 to the current time count Tcount10 and updates a value of the time count Tcount10.

The change from OFF to ON in the upper arm of the boost converter 100 is prohibited, when the change prohibition signal NFTN3 is turned on and is permitted when the change prohibition signal NFTN3 is turned off. In addition, the change from ON to OFF is prohibited when the change prohibition signal NNTF3 is turned on and is permitted when the change prohibition signal NNTF3 is turned off.

Figure 21:
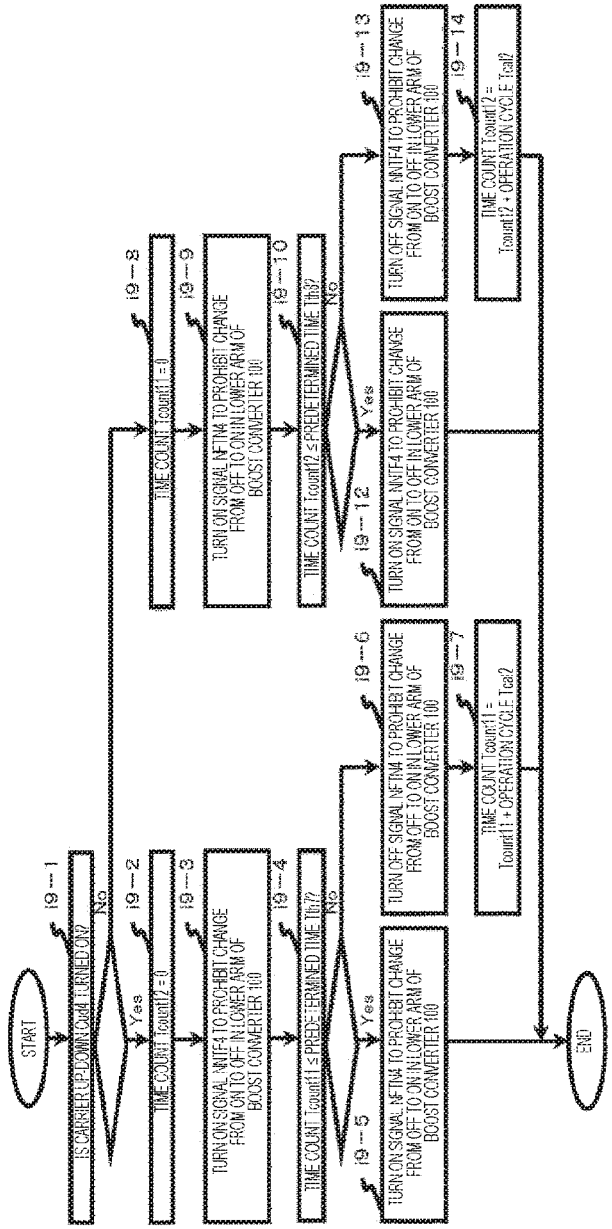
FIG. 21 is a diagram illustrating step i9 of FIG. 19.

FIG. 21 is a diagram illustrating a generation sequence of the switching change prohibition signals NFTN4 and NNTF4 in the switching change prohibition processing unit 670 for the boost converter illustrated in FIG. 19.

In step i9-1, the switching change prohibition processing unit 670 determines whether the carrier up-down Cud4 is turned on. In step i9-1, when the carrier up-down Cud4 is turned on, the switching change prohibition processing unit 670 proceeds to step i9-2. Meanwhile, in step i9-1, when the carrier up-down Cud4 is not turned on, the switching change prohibition processing unit 670 proceeds to step i9-8.

In step i9-2, the switching change prohibition processing unit 670 sets the time count Tcount12 to 0.

In step i9-3, the switching change prohibition processing unit 670 sets the signal NNTF4 to prohibit the change from ON to OFF in the lower arm of the boost converter to ON.

In step i9-4, the switching change prohibition processing unit 670 determines whether the time count Tcount11 is equal to or less than a predetermined time Tth7. In step i9-4, when the time count Tcount11 is equal to or less than the predetermined time Tth7, the switching change prohibition processing unit 670 proceeds to step i9-5. Meanwhile, in step i9-4, when the time count Tcount11 is not equal to or less than the predetermined time Tth7, the switching change prohibition processing unit 670 proceeds to step i9-6.

In step i9-5, the switching change prohibition processing unit 670 sets the signal NFTN4 to prohibit the change from OFF to ON in the lower arm of the boost converter to ON.

In step i9-6, the switching change prohibition processing unit 670 sets the change prohibition signal NFTN4 to OFF.

In step i9-7, the switching change prohibition processing unit 670 adds the operation cycle Tcal2 of the switching signal generation unit 460 to the current time count Tcount11 and updates a value of the time count Tcount11.

In step i9-8, the switching change prohibition processing unit 670 sets the time count Tcount11 to 0.

In step i9-9, the switching change prohibition processing unit 670 sets the signal NFTN4 to prohibit the change from OFF to ON in the lower arm of the boost converter to ON.

In step i9-10, the switching change prohibition processing unit 670 determines whether the time count Tcount12 is equal to or less than a predetermined time Tth8. In step i9-10, when the time count Tcount12 is equal to or less than the predetermined time Tth8, the switching change prohibition processing unit 670 proceeds to step i9-12.

In step i9-12, the switching change prohibition processing unit 670 sets the signal NNTF4 to prohibit the change from ON to OFF in the lower arm of the boost converter to ON. In addition, in step i9-10, when the time count Tcount12 is not equal to or less than the predetermined time Tth8, the switching change prohibition processing unit 670 proceeds to step i9-13.

In step i9-13, the switching change prohibition processing unit 670 sets the change prohibition signal NNTF4 to OFF.

In step i9-14, the switching change prohibition processing unit 670 adds the operation cycle Tcal2 of the switching signal generation unit 460 to the current time count Tcount12 and updates a value of the time count Tcount12.

The change from OFF to ON in the lower arm of the boost converter 100 is prohibited, when the change prohibition signal NFTN4 is turned on and is permitted when the change prohibition signal NFTN4 is turned off. In addition, the change from ON to OFF is prohibited when the change prohibition signal NNTF4 is turned on and is permitted when the change prohibition signal NNTF4 is turned off. In addition, the predetermined time Tth5 is set to less than the predetermined time Tth7. The predetermined time Tth8 is set to less than the predetermined time Tth6.

As such, the predetermined times Tth5, Tth6, Tth7, and Tth8 are set, so that the lower arm of the boost converter can be changed from OFF to ON after the upper arm of the boost converter is changed from ON to OFF. In addition, the upper arm can be changed from OFF to ON after the lower arm is changed from ON to OFF. As a result, the upper arm of the boost converter 100 and the lower arm of the boost converter 100 can be prevented from being turned on at the same time.

Figure 22:
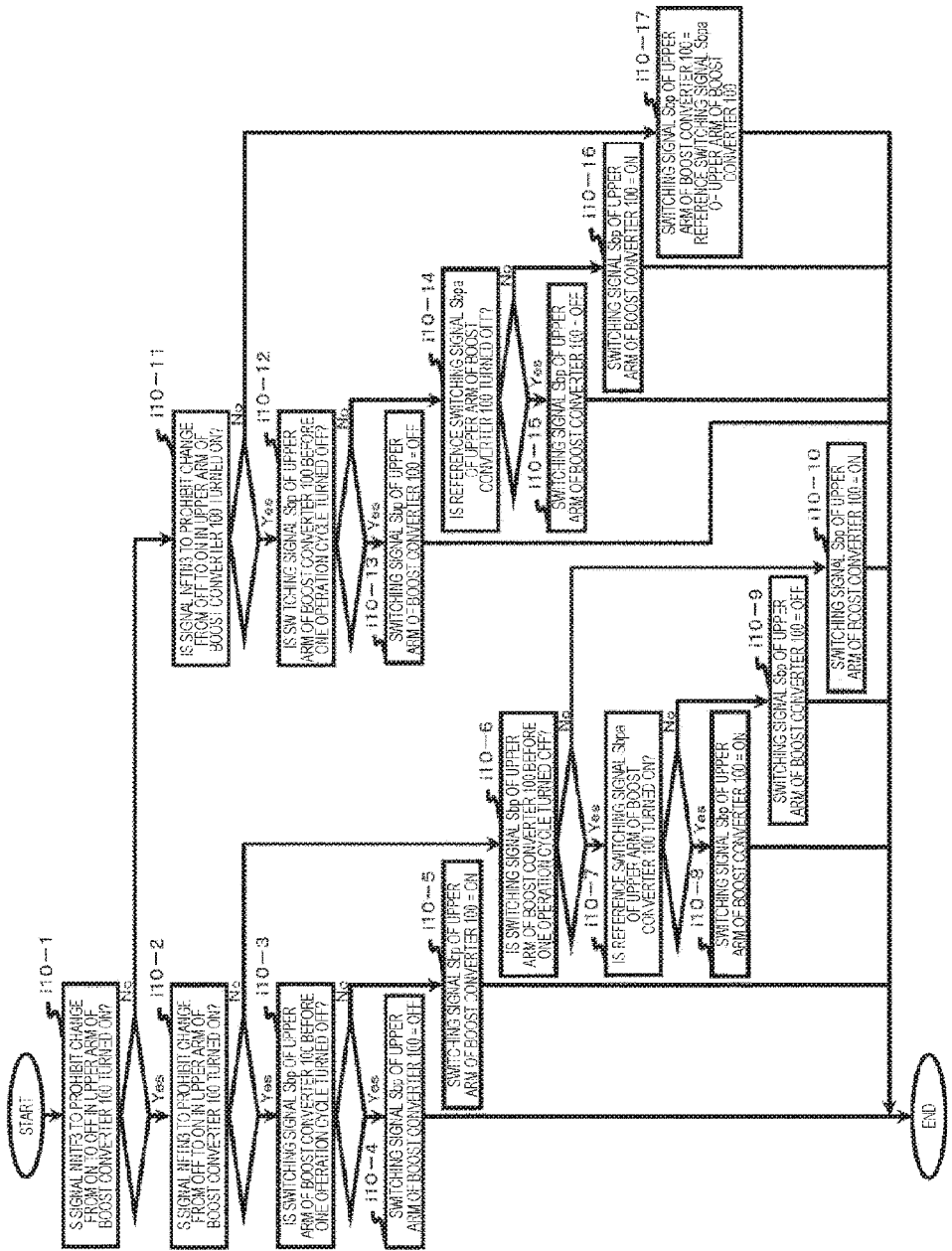
FIG. 22 is a diagram illustrating step i10 of FIG. 19.

FIG. 22 is a diagram illustrating a generation sequence of the switching signal Sbp of the upper arm of the boost converter in the switching change prohibition processing unit 670 for the boost converter illustrated in FIG. 19.

In step i10-1, the switching change prohibition processing unit 670 determines whether the signal NNTF3 to prohibit the change from ON to OFF in the upper arm of the boost converter is turned on. In step i10-1, when the change prohibition signal NNTF3 is turned on, the switching change prohibition processing unit 670 proceeds to step i10-2. Meanwhile, in step i10-1, when the change prohibition signal NNTF3 is not turned on, the switching change prohibition processing unit 670 proceeds to step i10-11.

In step i10-2, the switching change prohibition processing unit 670 determines whether the signal NFTN3 to prohibit the change from OFF to ON in the upper arm of the boost converter is turned on. In step i10-2, when the change prohibition signal NFTN3 is turned on, the switching change prohibition processing unit 670 proceeds to step i10-3. Meanwhile, in step i10-2, when the change prohibition signal NFTN3 is not turned on, the switching change prohibition processing unit 670 proceeds to step i10-6.

In step i10-3, the switching change prohibition processing unit 670 determines whether the switching signal Sbp of the upper arm of the boost converter before one operation cycle is turned off. In step i10-3, when the switching signal Sbp before one operation cycle is turned off, the switching change prohibition processing unit 670 proceeds to step i10-4. Meanwhile, in step i10-3, when the switching signal Sbp before one operation cycle is not turned off, the switching change prohibition processing unit 670 proceeds to step i10-5.

In step i10-4, the switching change prohibition processing unit 670 sets the switching signal Sbp to OFF.

In step i10-5, the switching change prohibition processing unit 670 sets the switching signal Sbp to ON.

In step i10-6, the switching change prohibition processing unit 670 determines whether the switching signal Sbp before one operation cycle is turned off. In step i10-6, when the switching signal Sbp before one operation cycle is turned off, the switching change prohibition processing unit 670 proceeds to step i10-7. Meanwhile, in step i10-6, when the switching signal Sbp before one operation cycle is not turned off, the switching change prohibition processing unit 670 proceeds to step i10-10.

In step i10-7, the switching change prohibition processing unit 670 determines whether the reference switching signal Sbpa of the upper arm of the boost converter is turned on. In step i10-7, when the reference switching signal Sbpa is turned on, the switching change prohibition processing unit 670 proceeds to step i10-8. Meanwhile, in step i10-7, when the reference switching signal Sbpa is not turned on, the switching change prohibition processing unit 670 proceeds to step i10-9.

In step i10-8, the switching change prohibition processing unit 670 sets the switching signal Sbp to ON.

In step i10-9, the switching change prohibition processing unit 670 sets the switching signal Sbp to OFF.

In step i10-10, the switching change prohibition processing unit 670 sets the switching signal Sbp to ON.

In step i10-11, the switching change prohibition processing unit 670 determines whether the change prohibition signal NFTN3 is turned on. In step i10-11, when the chance prohibition signal NFTN3 is turned on, the switching change prohibition processing unit 670 proceeds to step i10-12. Meanwhile, in step i10-11, when the change prohibition signal NFTN3 is not turned on, the switching change prohibition processing unit 670 proceeds to step i10-17.

In step i10-12, the switching change prohibition processing unit 670 determines whether the switching signal Sbp before one operation cycle is turned off. In step i10-12, when the switching signal Sbp before one operation cycle is turned off, the switching change prohibition processing unit 670 proceeds to step i10-13. Meanwhile, in step i10-12, when the switching signal Sbp before one operation cycle is not turned off, the switching change prohibition processing unit 670 proceeds to step i10-14.

In step i10-13, the switching change prohibition processing unit 670 sets the switching signal Sbp to OFF.

In step i10-14, the switching change prohibition processing unit 670 determines whether the reference switching signal Sbpa of the upper arm of the boost converter is turned off. In step i10-14, when the reference switching signal Sbpa is turned off, the switching change prohibition processing unit 670 proceeds to step i10-15. Meanwhile, in step i10-14, when the reference switching signal Sbpa is not turned off, the switching change prohibition processing unit 670 proceeds to step i10-16.

In step i10-15, the switching change prohibition processing unit 670 sets the switching signal Sbp to OFF.

In step i10-16, the switching change prohibition processing unit 670 sets the switching signal Sbp to ON.

In step i10-17, the switching change prohibition processing unit 670 sets the reference switching signal Sbpa to the switching signal Sbp.

The switching change prohibition processing unit 670 executes the processes described above and generates the switching signal Sbp of the upper arm of the boost converter. The generated switching signal Sbp of the upper arm of the boost converter 100 is input to the gate drive circuit 540.

As such, the switching signal Sbp of the upper arm of the boost converter is generated, so that the switching signal Sbp of the upper arm of the boost converter can be prevented from changing from ON to OFF, in a period where the signal NNTF3 to prohibit the change front ON to OFF in the upper arm of the boost converter is turned on, in the case in which the carrier frequency fcarrier2 for the inverters is equal to the carrier frequency fcarrier1 for the boost converter. In addition, the switching signal Sbp of the upper arm of the boost converter can be prevented from changing from OFF to ON, in a period where the signal NFTN3 to prohibit the change from OFF to ON in the upper arm of the boost converter is turned on, in the case in which the carrier frequency fcarrier2 for the inverters is equal to the carrier frequency fcarrier1 for the boost converter.

That is, the switching signal Sbp of the upper arm of the boost converter 100 becomes a signal maintaining ON or OFF, in a period where both the signal NNTF3 to prohibit the change from ON to OFF in the upper arm of the boost converter 100 and the signal NFTN3 to prohibit the change from OFF to ON in the upper arm of the boost converter 100 are turned on, in the case in which the carrier frequency fcarrier2 for the inverters is equal to the carrier frequency fcarrier1 for the boost converter. In addition, the switching signal Sbp becomes a signal of a state in which ON or OFF is maintained or a state in which the change from OFF to ON is made, in a period where the change prohibition signal NNTF3 is turned on and the change prohibition signal NFTN3 is turned off. In addition, the switching signal Sbp becomes a signal of a state in which ON or OFF is maintained or a state in which the change from ON to OFF is made, in a period where the change prohibition signal NNTF3 is turned off and the change prohibition signal NFTN3 is turned on. In addition, the switching signal Sbp becomes a signal of a state in which ON or OFF is maintained, a state in which the change from ON to OFF is made, or a state in which the change from OFF to ON is made, in a period where both the change prohibition signal NNTF3 and the change prohibition signal NFTN3 are turned off.

Figure 23:
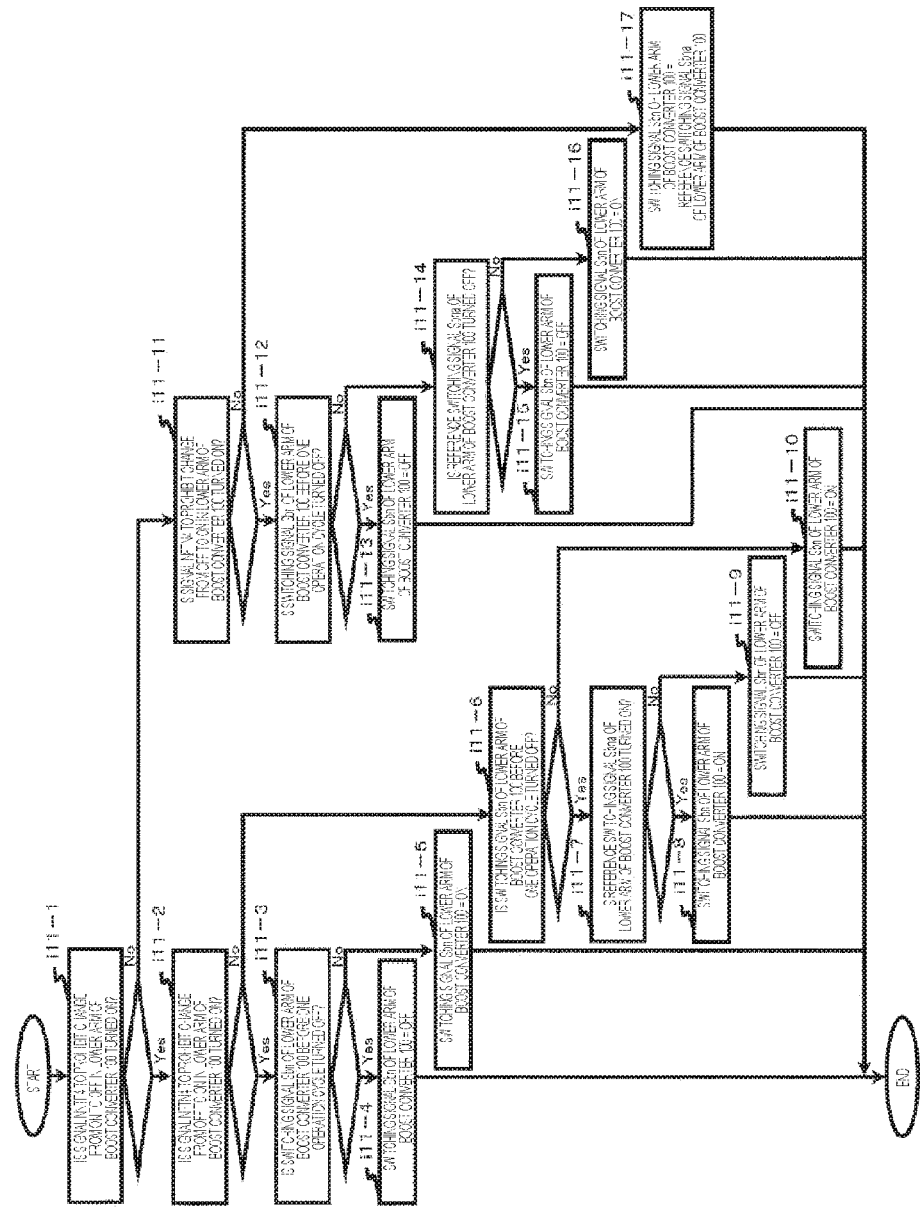
FIG. 23 is a diagram illustrating step i11 of FIG. 19.

FIG. 23 is a diagram illustrating a generation sequence of the switching signal Sbn of the lower arm of the boost converter 100 in the switching change prohibition processing unit 670 for the boost converter illustrated in FIG. 19.

In step i11-1, the switching change prohibition processing unit 670 determines whether the signal NNTF4 to prohibit the change from ON to OFF in the lower arm of the boost converter is turned on. In step i11-1, when the change prohibition signal NNTF4 is turned on, the switching change prohibition processing unit 670 proceeds to step i11-2. Meanwhile, in step i11-1, when the change prohibition signal NNTF4 is not turned on, the switching change prohibition processing unit 670 proceeds to step i11-11.

In step i11-2, the switching change prohibition processing unit 670 determines whether the signal NFTN4 to prohibit the change from OFF to ON in the lower arm of the boost converter is turned on. In step i11-2, when the change prohibition signal NFTN4 is turned on, the switching change prohibition processing unit 670 proceeds to step i11-3. Meanwhile, in step i11-2, when the change prohibition signal NFTN4 is not turned on, the switching change prohibition processing unit 670 proceeds to step i11-6.

In step i11-3, the switching change prohibition processing unit 670 determines whether the switching signal Sbn of the lower arm of the boost converter before one operation cycle is turned off. In step i11-3, when the switching signal Sbn before one operation cycle is turned off, the switching change prohibition processing unit 670 proceeds to step i11-4.

In step i11-4, the switching change prohibition processing unit 670 sets the switching signal Sbn to OFF. In addition, in step i11-3, when the switching signal Sbn before one operation cycle is not turned off, the switching change prohibition processing unit 670 sets the switching signal Sbn to ON, in step i11-5.

In step i11-6, the switching change prohibition processing unit 670 determines whether the switching signal Sbn before one operation cycle is turned off. In step i11-6, when the switching signal Sbn before one operation cycle is turned off, the switching change prohibition processing unit 670 proceeds to step i11-7. Meanwhile, in step i11-6, when the switching signal Sbn before one operation cycle is not turned off, the switching change prohibition processing unit 670 proceeds to step i11-10.

In step i11-1, the switching change prohibition processing unit 670 determines whether the reference switching signal Sbna of the lower arm of the boost converter is turned on. In step i11-7, when the reference switching signal Sbna is turned on, the switching change prohibition processing unit 670 proceeds to step i11-8. Meanwhile, in step i11-7, when the reference switching signal Sbna is not turned on, the switching change prohibition processing unit 670 proceeds to step i11-9.

In step i11-8, the switching change prohibition processing unit 670 sets the switching signal Sbn to ON.

In step i11-9, the switching change prohibition processing unit 670 sets the switching signal Sbn to OFF.

In step i11-10, the switching change prohibition processing unit 670 sets the switching signal Sbn to ON.

In step i11-11, the switching change prohibition processing unit 670 determines whether the change prohibition signal NFTN4 is turned on. In step i11-11, when the change prohibition signal NFTN4 is turned on, the switching change prohibition processing unit 670 proceeds to step i11-12. Meanwhile, in step i11-11, when the change prohibition signal NFTN4 is not turned on, the switching change prohibition processing unit 670 proceeds to step i11-17.

In step i11-12, the switching change prohibition processing unit 670 determines whether the switching signal Sbn before one operation cycle is turned off. In step i11-12, when the switching signal Sbn before one operation cycle is turned off, the switching change prohibition processing unit 670 proceeds to step i11-13. Meanwhile, in step i11-12, when the switching signal Sbn before one operation cycle is not turned off, the switching change prohibition processing unit 670 proceeds to step i11-14.

In step i11-13, the switching change prohibition processing unit 670 sets the switching signal Sbn to OFF.

In step i11-14, the switching change prohibition processing unit 670 determines whether the reference switching signal Sbna is turned off. In step i11-14, when the reference switching signal Sbna is turned off, the switching change prohibition processing unit 670 proceeds to step i11-15.

In step i11-15, the switching change prohibition processing unit 670 sets the switching signal Sbn to OFF. In addition, in step i11-14, when the reference switching signal Sbna is not turned off, the switching change prohibition processing unit 670 proceeds to step i11-16.

In step i11-16, the switching change prohibition processing unit 670 sets the switching signal Sbn to ON.

In step i11-17, the switching change prohibition processing unit 670 sets the reference switching signal Sbna to the switching signal Sbn.

The switching change prohibition processing unit 670 executes the processes described above and generates the switching signal Sbn of the lower arm of the boost converter 100. The generated switching signal Sbn of the lower arm of the boost converter 100 is input to the gate drive circuit 540.

As such, the switching signal Sbn of the lower arm of the boost converter 100 is generated, so that the switching signal Sbn of the lower arm of the boost converter 100 can be prevented from changing from ON to OFF, in a period where the signal NNTF4 to prohibit the change from ON to OFF in the lower arm of the boost converter 100 is turned on, in the case in which the carrier frequency fcarrier2 for the inverters is equal to the carrier frequency fcarrier1 for the boost converter. In addition, the switching signal Sbn of the lower arm of the boost converter 100 can be prevented from changing from OFF to ON, in a period where the signal NFTN4 to prohibit the change from OFF to ON in the lower arm of the boost converter 100 is turned on, in the case in which the carrier frequency fcarrier2 for the inverters is equal to the carrier frequency fcarrier1 for the boost converter.

That is, the switching signal Sbn becomes a signal maintaining ON or OFF, in a period where both the signal NNTF4 to prohibit the change from ON to OFF in the lower arm of the boost converter 100 and the signal NFTN4 to prohibit the change from OFF to ON in the lower arm of the boost converter 100 are turned on, in the case in which the carrier frequency fcarrier2 for the inverters is equal to the carrier frequency fcarrier1 for the boost converter. In addition, the switching signal Sbn becomes a signal of a state in which ON or OFF is maintained or a state in which the change from OFF to ON is made, in a period where the change prohibition signal NNTF4 is turned on and the change prohibition signal NFTN4 is turned off. In addition, the switching signal Sbn becomes a signal of a state in which ON or OFF is maintained or a state in which the change from ON to OFF is made, in a period where the change prohibition signal NNTF4 is turned off and the change prohibition signal NFTN4 are turned on. In addition, the switching signal Sbn becomes a signal of a state in which ON or OFF is maintained, a state in which the change from ON to OFF is made, or a state in which the change from OFF to ON is made, in a period where both the change prohibition signal NNTF4 and the change prohibition signal NFTN4 are turned off.

According to the configuration described above, the switching signals Sup1, Sun1, Svp1, Svn1, Swp1, Swn1, Sup2, Sun2, Svp2, Svn2, Swp2, and Swn2 of the UVW-phase upper and lower arms of the inverters 190 and 260 and the switching signals Sbp and Sbn of the upper and lower arms of the boost converter 100 are generated, so that the simultaneous change from OFF to ON and the simultaneous change from ON to OFF in the switching signals Sup1, Svp1, Swp1, Sup2, Svp2, and Swp2 of the UVW-phase upper arms of the inverters 190 and 260 and the switching signal Sbp of the upper arm of the boost converter 100 can be prevented from being generated, when the carrier frequency fcarrier2 for the inverters is equal to the carrier frequency fcarrier1 for the boost converter. In addition, the simultaneous change from OFF to ON and the simultaneous change from ON to OFF in the switching signals Sun1, Svn1, Swn1, Sun2, Svn2, and Swn2 of the UVW-phase lower arms of the inverters 190 and 260 and the switching signal Sbn of the lower arm of the boost converter 100 can be prevented from being generated, when the carrier frequency fcarrier2 for the inverters is equal to the carrier frequency fcarrier1 for the boost converter.

Next, waveforms of the switching signal Sup1 of the U-phase upper arm of the inverter 190, the switching signal Sbp of the upper arm of the boost converter 100, the switching signal Sun1 of the U-phase lower arm of the inverter 190, and the switching signal Sbn of the lower arm of the boost converter 100, generated by the switching signal generation unit 460, will be described on the assumption that a value of the carrier frequency fcarrier2 for the inverters is equal to a value of the carrier frequency fcarrier1 for the boost converter and a phase of the triangular wave carrier carrier2 for the inverters is different from a phase of the triangular wave carrier carrier1 for the boost converter by 180 degrees.

Figure 24:
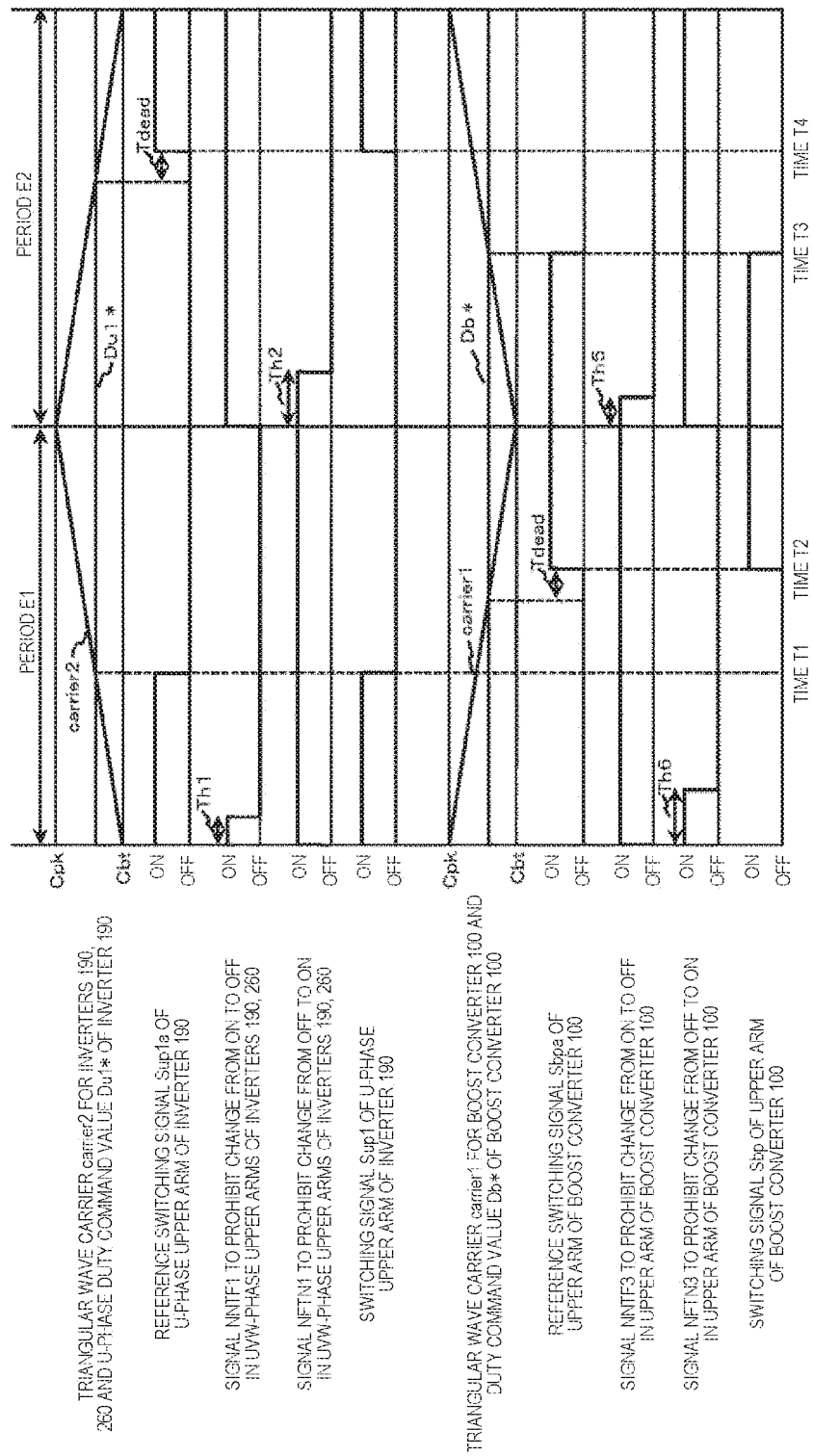
FIG. 24 is a diagram illustrating a first example of waveforms of a switching signal Sup1 of a U-phase upper arm of an inverter and a switching signal Sbp of an upper arm of a boost converter.

FIG. 24 is a diagram illustrating an example of the waveforms of the switching signal Sup1 of the U-phase upper arm of the inverter 190 and the switching signal Sbp of the upper arm of the boost converter 100. In FIG. 24, the U-phase duty command value Du1* of the inverter 190 is almost an intermediate value of the predetermined bottom value Cbt and the predetermined peak value Cpk and the duty command value Db* of the boost converter 100 is almost an intermediate value of the predetermined bottom, value Cbt and the predetermined peak value Cpk.

The waveform of the reference switching signal Sup1a of the U-phase upper arm of the inverter 190 will be described. The reference switching signal Sup1a changes from ON to OFF when the duty command value Du1* becomes smaller than the value of the triangular wave carrier carrier2 for the inverters. In addition, the reference switching signal Sup1a changes from OFF to ON when the predetermined dead time Tdead passes after the duty command value Du1* becomes equal to or larger than the value of the triangular wave carrier carrier2.

A period where the reference switching signal Sup1a changes from ON to OFF is a period E1 where the triangular wave carrier carrier2 for the inverters rises from the predetermined, bottom value Cbt to the predetermined peak value Cpk. A period where the reference switching signal Sup1a changes from OFF to ON is a period E2 where the triangular wave carrier carrier2 for the inverters falls from the predetermined peak value Cpk to the predetermined bottom value Cbt.

The waveform of the signal NNTF1 to prohibit the change from ON to OFF in the UVW-phase upper arms of the inverters will be described. The change prohibition signal NNTF1 maintains ON until the predetermined time Tth1 passes after the triangular wave carrier carrier2 for the inverters starts to rise from the predetermined bottom value Cbt to the predetermined peak value Cpk and changes from ON to OFF after the predetermined time Tth1 passes. The change prohibition signal NNTF1 changes from OFF to ON when the value of the triangular wave carrier carrier2 for the inverters is matched with the predetermined peak value Cpk. Therefore, the change from ON to OFF in the switching signal Sup1 is prohibited during a period until the predetermined time Tth1 passes after the triangular wave carrier carrier2 for the inverters starts to rise from the predetermined bottom value Cbt to the predetermined peak value Cpk and the period E2 where the triangular wave carrier carrier2 for the inverters fails from the predetermined peak value Cpk to the predetermined bottom value Cbt.

The waveform of the signal NFTN1 to prohibit the change from OFF to ON in the UVW-phase upper arms of the inverter 190 will be described. The change prohibition signal NFTN1 changes from OFF to ON when the value of the triangular wave carrier carriers for the inverters is matched with the predetermined bottom value Cbt. The change prohibition signal NFTN1 maintains ON until the predetermined time Tth2 passes after the triangular wave carrier carrier2 for the inverters starts to fall from the predetermined peak value Cpk to the predetermined bottom value Cbt and changes from ON to OFF after the predetermined time Tth2 passes. Therefore, the change from OFF to ON in the switching signal Sup1 is prohibited during the period E1 where the triangular wave carrier carrier2 for the inverters rises from the predetermined bottom value Cbt to the predetermined peak value Cpk and a period until the predetermined time Tth2 passes after the triangular wave carrier carrier2 for the inverters starts to fall from the predetermined peak value Cpk to the predetermined bottom value Cbt.

The waveform of the switching signal Sup1 of the U-phase upper arm of the inverter 190 will be described. As described above, the switching signal Sup1 is generated on the basis of the reference switching signal Sup1a, the change prohibition signal NNTF1, and the change prohibition signal NFTN1. It is known that timing where the reference switching signal Sup1a changes from ON to OFF and timing where the reference switching signal Sup1a changes from ON to OFF when focusing on the change prohibition signal NNTF1 are a period where the change prohibition signal NNTF1 is turned off. Therefore, timing where the switching signal Sup1 changes from ON to OFF becomes the same timing as the timing where the reference switching signal Sup1a changes from ON to OFF and changes at a time T1. In addition, it is known that timing where the reference switching signal Sup1a changes from OFF to ON and timing where the reference switching signal Sup1a changes from OFF to ON when focusing on the change prohibition signal NFTN1 are a period where the change prohibition signal NFTN1 is turned off. Therefore, timing where the switching signal Sup1 changes from OFF to ON becomes the same timing as the timing where the reference switching signal Sup1a changes from OFF to ON and changes at a time T4.

The waveform of the reference switching signal Sbpa of the upper arm of the boost converter 100 will be described. The reference switching signal Sbpa changes from OFF to ON when the predetermined dead time Tdead passes after the duty command value Db* of the boost converter 100 becomes equal to or larger than the value of the triangular wave carrier carrier1 for the boost converter 100. In addition, the reference switching signal Sbpa changes from ON to OFF when the duty command value Db* becomes smaller than the value, of the triangular wave carrier carrier1.

A period where the reference switching signal Sbpa changes from OFF to ON is the period E1 where the triangular wave carrier carrier1 falls from the predetermined peak value Cpk to the predetermined bottom value Cbt. A period where the reference switching signal Sbpa changes from ON to OFF is the period E2 where the triangular wave carrier carrier1 rises from the predetermined bottom value Cbt to the predetermined peak value Cpk.

The waveform of the signal NNTF3 to prohibit the change from ON to OFF in the upper arm of the boost converter 100 will be described. The change prohibition signal NNTF3 changes from OFF to ON when the value of the triangular wave carrier carrier1 is matched, with the predetermined peak value Cbt. In addition, the change prohibition signal NNTF3 maintains ON until the predetermined time Tth5 passes after the triangular wave carrier carrier1 starts to rise from the predetermined bottom value Cbt to the predetermined peak value Cpk and changes from ON to OFF after the predetermined time Tth5 passes. Therefore, the change from ON to OFF in the switching signal Sbp of the upper arm of the boost converter 100 is prohibited during the period E1 where the triangular wave carrier carrier1 falls from the predetermined peak value Cpk to the predetermined bottom value Cbt and a period until the predetermined time Tth5 passes after the triangular wave carrier carrier1 starts to rise from the predetermined bottom value Cbt to the predetermined peak value Cpk.

The waveform of the signal NFTN3 to prohibit the change from OFF to ON in the upper arm of the boost converter 100 will be described. The change prohibition signal NFTN3 maintains ON until the predetermined time Tth8 passes after the triangular wave carrier carrier1 starts to fail from the predetermined peak value Cpk to the predetermined bottom value Cbt and changes from ON to OFF after the predetermined time Tth8 passes. In addition, the change prohibition signal NFTN3 changes from OFF to ON when the value of the triangular wave carrier carrier1 is matched with the predetermined bottom value Cbt. Therefore, the change from OFF to ON in the switching signal Sbp is prohibited during a period where the predetermined time Tth8 passes after the triangular wave carrier carrier1 starts to fall from the predetermined peak, value Cpk to the predetermined bottom value Cbt and the period E2 where the triangular wave carrier carrier1 rises from the predetermined bottom value Cbt to the predetermined peak value Cpk.

Next, the waveform of the switching signal Sbp of the upper arm of the boost converter 100 will be described. As described above, the switching signal Sbt is generated on the basis of the reference switching signal Sbpa, the change prohibition signal NNTF3, and the change prohibition signal NFTN3. It is known that timing where the reference switching signal Sbpa changes from OFF to ON and timing where the reference switching signal Sbpa changes from OFF to ON when focusing on the change prohibition signal NFTN3 are a period where the change prohibition signal NFTN3 is turned off. Therefore, timing where the switching signal Sbp changes from OFF to ON becomes the same timing as the timing where the reference switching signal Sbpa changes from OFF to ON and changes at a time T2. In addition, it is known that timing where the reference switching signal Sbpa changes from ON to OFF and timing where the reference switching signal Sbpa changes from ON to OFF when focusing on the change prohibition signal NNTF3 are a period where the change prohibition signal NNTF3 is turned off. Therefore, timing where the switching signal Sbp changes from ON to OFF becomes the same timing as the timing where the reference switching signal Sbpa changes from ON to OFF and changes at a time T3.

As described above, the timing where the switching signal Sup1 of the U-phase upper arm of the inverter 190 changes from ON to OFF is the time T1 of the period E1 and the timing where the switching signal Sbp of the upper arm of the boost converter 100 changes from ON to OFF is the time T3 of the period E2. In addition, the timing where the switching signal Sup1 of the U-phase upper arm of the inverter 190 changes from OFF to ON is the time T4 of the period E2 and the timing where the switching signal Sbp of the upper arm of the boost converter 100 changes from OFF to ON is the time T2 of the period E1.

That is, a value of the carrier frequency fcarrier2 for the inverters is set to the same value as a value of the carrier frequency fcarrier1 for the boost converter and a phase of the triangular wave carrier carrier2 for the inverters is set to a phase different from a phase of the triangular wave carrier carrier1 for the boost converter by 180 degrees, so that the simultaneous change from OFF to ON and the simultaneous change from ON to OFF in the switching signal Sup1 of the U-phase upper arm of the inverter 130 and the switching signal Sbp of the upper arm of the boost converter 100 can be avoided from being generated.

In addition, the switching signal Sup1 of the U-phase upper arm of the inverter 190 is set to the same signal as the reference switching signal Sup1a obtained by comparing the U-phase duty command value Du1* and the triangular wave carrier carrier2 of the inverter 190. The switching signal Sbp of the upper arm of the boost converter 100 is set to the same signal as the reference switching signal Sbpa obtained by comparing the duty command value Db* and the triangular wave carrier carrier1 of the boost converter 100. That is, a ratio of ON and OFF of the switching element 130 of the U-phase upper arm of the inverter 190 can be matched with the U-phase duty command value Du1* of the inverter 190 and a ratio of ON and OFF of the switching element 80 of the upper arm of the boost converter 100 can be matched with the duty command value Db* of the boost converter. Therefore, a torque ripple of a motor can be suppressed from increasing.

Here, the switching signal Sup1 of the U-phase upper arm of the inverter 190 and the switching signal Sbp of the upper arm of the boost converter 100 have been described. However, even in the switching signals Svp1 and Swp1 of the VW-phase upper arms of the inverter 190 and the switching signal Sbp of the upper arm of the boost converter 100, a simultaneous change from ON to OFF and a simultaneous change from OFF to ON can be avoided from being generated. In addition, even in the switching signals Sup1, Svp2, and Swp2 of the UVW-phase upper arms of the inverter 260 and the switching signal Sbp of the upper arm of the boost converter 100, a simultaneous change from ON to OFF and a simultaneous change from OFF to ON can be avoided from being generated.

Figure 25:
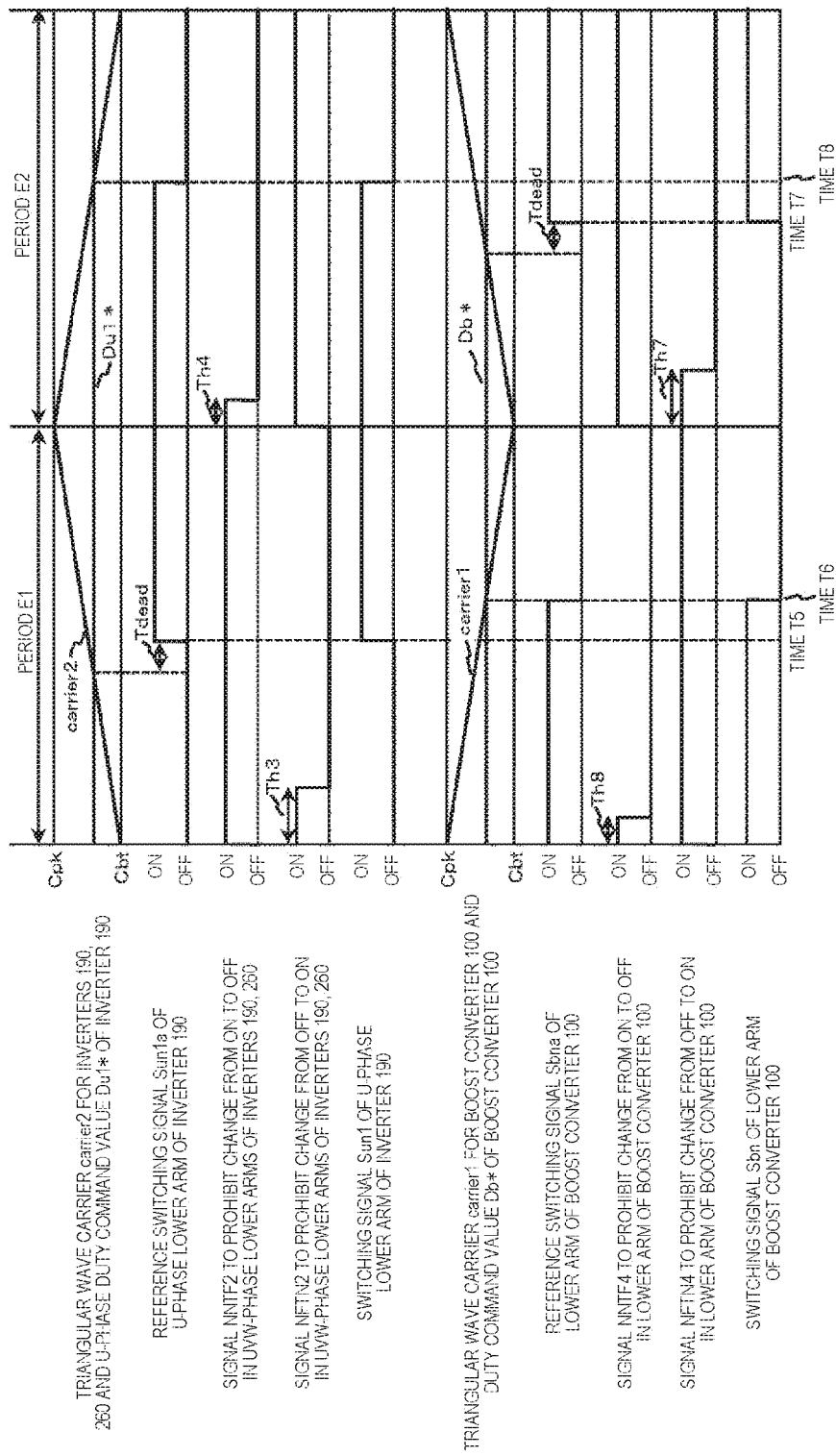
FIG. 25 is a diagram illustrating a first example of waveforms of a switching signal Sun1 of a U-phase lower arm of an inverter and a switching signal Sbn of a lower arm of a boost converter.

FIG. 25 is a diagram illustrating an example of waveforms of the switching signal Sun1 of the U-phase lower arm of the inverter 190 and the switching signal Sbn of the lower arm of the boost converter 100. Similar to FIG. 24, in FIG. 25, the U-phase duty command value Du1* of the inverter 190 is almost an intermediate value of the predetermined bottom value Cbt and the predetermined peak value Cpk and the duty command value Db* of the boost converter 100 is almost an intermediate value of the predetermined bottom value Cbt and the predetermined peak value Cpk.

The waveform of the reference switching signal Sun1a of the U-phase lower arm of the inverter 190 will be described. The reference switching signal Sun1a changes from OFF to ON when the predetermined dead time Tdead passes after the duty command value Du1* becomes smaller than the value of the triangular wave carrier carrier2 for the inverters. In addition, the reference switching signal Sun1a changes from ON to OFF when the duty command value Du1* becomes equal to or larger than the value of the triangular wave carrier carriers.

A period where the reference switching signal Sun1a changes from OFF to ON is a period E1 where the triangular wave carrier carrier2 for the inverters rises from the predetermined bottom value Cbt to the predetermined peak value Cpk. A period where the reference switching signal Sun1a changes from ON to OFF is a period E2 where the triangular wave carrier carrier2 for the inverters falls from the predetermined peak value Cpk to the predetermined bottom value Cbt.

The waveform of the signal NNTF2 to prohibit the change from ON to OFF in the UVW-phase lower arms of the inverters will be described. The change prohibition signal NNTF2 changes from OFF to ON when the value of the triangular wave carrier carrier2 for the inverters is matched with the predetermined bottom value Cbt. In addition, the change prohibition signal NNTF2 maintains ON until the predetermined time Tth4 passes after the triangular wave carrier carrier2 starts to fall from the predetermined peak value Cpk to the predetermined bottom value Cbt and changes from ON to OFF after the predetermined time Tth4 passes. Therefore, the change from ON to OFF in the switching signal Sun1 is prohibited during the period E1 where the triangular wave carrier carrier2 rises from the predetermined bottom value Cbt to the predetermined peak value Cpk and a period until the predetermined time Tth4 passes after the triangular wave carrier carrier2 starts to fall from the predetermined peak value Cpk to the predetermined bottom value Cbt.

The waveform of the signal NFTN2 to prohibit the change from OFF to ON in the UVW-phase lower arms of the inverters will be described. The change prohibition signal NFTN2 maintains ON until the predetermined time Tth3 passes after the triangular wave carrier carrier2 for the inverters starts to rise from the predetermined bottom value Cbt to the predetermined peak value Cpk and changes from ON to OFF after the predetermined time Tth3 passes. In addition, the change prohibition signal NFTN2 changes from OFF to ON when the value of the triangular wave carrier carrier2 is matched with the predetermined peak value Cpk. Therefore, the change from OFF to ON in the switching signal Sun1 is prohibited during a period until the predetermined time Tth3 passes after the triangular wave carrier carrier2 starts to rise from the predetermined bottom value Cbt to the predetermined peak value Cpk and the period E2 where the triangular wave carrier carrier2 falls from the predetermined peak value Cpk to the predetermined bottom value Cbt.

The waveform of the switching signal Sun1 of the U-phase lower arm of the inverter 190 will be described. As described above, the switching signal Sun1 is generated on the basis of the reference switching signal Sun1a, the change prohibition signal NNTF2, and the change prohibition signal NFTN2. First, it is known that timing where the reference switching signal Sun1a changes from OFF to ON and timing where the reference switching signal Sun1a changes from OFF to ON when focusing on the change prohibition signal NFTN2 are a period where the change prohibition signal NFTN2 is turned off. Therefore, timing where the switching signal Sun1 changes from OFF to ON becomes the same timing as the timing where the reference switching signal Sun1a changes from OFF to ON and changes at a time T5. In addition, it is known that timing where the reference switching signal Sun1a changes from ON to OFF and timing where the reference switching signal Sun1a changes from ON to OFF when focusing on the change prohibition signal NNTF2 are a period where the change prohibition signal NNTF2 is turned off. Therefore, timing where the switching signal Sun1 changes from ON to OFF becomes the same timing as the timing where the reference switching signal Sun1a changes from ON to OFF and changes at a time T8.

The waveform of the reference switching signal Sbna of the lower arm of the boost converter 100 will be described. The reference switching signal Sbna changes from ON to OFF when the duty command value Db* of the boost converter becomes equal to or larger than the value of the triangular wave carrier carrier1. In addition, the reference switching signal Sbna changes from OFF to ON when the predetermined dead time Tdead passes after the duty command value Db* becomes smaller than the value of the triangular wave carrier carrier1.

A period where the reference switching signal Sbna changes from ON to OFF is the period E1 where the triangular wave carrier carrier1 for the boost converter falls from the predetermined peak value Cpk to the predetermined bottom value Cbt and a period where the reference switching signal Sbna changes from OFF to ON is the period E2 where the triangular wave carrier carrier1 rises from the predetermined bottom value Cbt to the predetermined peak value Cpk.

The waveform of the signal NNTF4 to prohibit the change from ON to OFF in the lower arm of the boost converter 100 will be described. The change prohibition signal NNTF4 maintains ON until the predetermined time Tth8 passes after the triangular wave carrier carrier1 starts to fall from the predetermined peak value Cpk to the predetermined bottom value Cbt and changes from ON to OFF after the predetermined time Tth8 passes. In addition, the change prohibition signal NNTF4 changes from OFF to ON when the value of the triangular wave carrier carrier1 is matched with the predetermined bottom value Cbt. Therefore, the change from ON to OFF in the switching signal Sbn is prohibited during a period until the predetermined time Tth8 passes after the triangular wave carrier carrier1 starts to fall from the predetermined peak value Cpk to the predetermined bottom value Cbt and the period E2 where the triangular wave carrier carrier1 rises from the predetermined bottom value Cbt to the predetermined peak value Cpk.

The waveform of the signal NFTN4 to prohibit the change from OFF to ON in the lower arm of the boost converter 100 will be described. The change prohibition signal NFTN4 changes from OFF to ON when the value of the triangular wave carrier carrier1 is matched with the predetermined peak value Cpk. In addition, the change prohibition signal NFTN4 maintains ON until the predetermined time Tth7 passes after the triangular wave carrier carrier1 starts to rise from the predetermined bottom value Cbt to the predetermined peak value Cpk and changes from ON to OFF after the predetermined time Tth7 passes. Therefore, the change from OFF to ON in the switching signal Sbn is prohibited during the period E1 where the triangular wave carrier carrier1 starts to fail from the predetermined peak value Cpk to the predetermined bottom value Cbt and a period where the predetermined time Tth7 passes after the triangular wave carrier carrier1 starts to rise from the predetermined bottom value Cbt to the predetermined peak value Cpk.

The waveform of the switching signal Sbn of the lower arm of the boost converter 100 will be described. As described above, the switching signal Sbn is generated on the basis of the reference switching signal Sbna, the change prohibition signal NNTF4, and the change prohibition signal NFTN4. First, it is known that timing where the reference switching signal Sbna changes from ON to OFF and timing where the reference switching signal Sbna changes from ON to OFF when focusing on the change prohibition signal NNTF4 are a period where the change prohibition signal NNTF4 is turned off. Therefore, timing where the switching signal Sbn changes from ON to OFF becomes the same timing as the timing where the reference switching signal Sbna changes from ON to OFF and changes at a time T6. In addition, it is known that timing where the reference switching signal Sbna changes from OFF to ON and timing where the reference switching signal Sbna changes from OFF to ON when focusing on the change prohibition signal NFTN4 are a period where the change prohibition signal NFTN4 is turned off. Therefore, timing where the switching signal Sbn changes from OFF to ON becomes the same timing as the timing where the reference switching signal Sbna changes from OFF to ON and changes at a time T7.

As described above, the timing where the switching signal Sun1 of the U-phase lower arm of the inverter 190 changes from OFF to ON is the time T5 of the period E1 and the timing where the switching signal Sbn of the lower arm of the boost converter 100 changes from OFF to ON is the time T7 of the period E2. In addition, the timing where the switching signal Sun1 of the U-phase lower arm of the inverter 190 changes from ON to OFF is the time T8 of the period E2 and the timing where the switching signal Sbn of the lower arm of the boost converter 100 changes from ON to OFF is the time T6 of the period E1.

That is, the value of the carrier frequency fcarrier2 for the inverters is set to the same value as the value of the carrier frequency fcarrier1 for the boost converter and the phase of the triangular wave carrier carrier2 for the inverters is set to the phase different from the phase of the triangular wave carrier carrier1 for the boost converter by 180 degrees, so that a simultaneous change from OFF to ON and a simultaneous change from ON to OFF in the switching signal Sun1 of the U-phase lower arm of the inverter 190 and the switching signal Sbn of the lower arm of the boost converter 100 can be avoided from being generated.

In addition, the switching signal Sun1 of the U-phase lower arm of the inverter 190 is set to the same signal as the reference switching signal Sun1a obtained by comparing the U-phase duty command value Du1* and the triangular wave carrier carrier2 of the inverter 190. The switching signal Sbn of the lower arm of the boost converter 100 is set to the same signal as the reference switching signal Sbna obtained by comparing the duty command value Db* and the triangular wave carrier carrier1 of the boost converter 100. That is, a ratio of ON and OFF of the switching element 149 of the U-phase lower arm of the inverter 190 can be matched with the U-phase duty command value Du1* of the inverter 190 and a ratio of ON and OFF of the switching element 90 of the lower arm of the boost converter 100 can be matched with the duty command value Db* of the boost converter. Therefore, a torque ripple of the motor can be suppressed from increasing.

Here, the switching signal Sun1 of the U-phase lower arm of the inverter 190 and the switching signal Sbn of the lower arm of the boost, converter 100 have been described. However, even in the switching signals Svn1 and Swn1 of the VW-phase lower arms of the inverter 190 and the switching signal Sbn of the lower arm of the boost converter 100, a simultaneous change from ON to OFF and a simultaneous change from OFF to ON can be avoided from being generated. In addition, even in the switching signals Sun2, Svn2, and Swn2 of the UVW-phase lower arms of the inverter 260 and the switching signal Sbn of the lower arm of the boost converter 100, a simultaneous change from ON to OFF and a simultaneous change from OFF to ON can be avoided from being generated.

Figure 26:
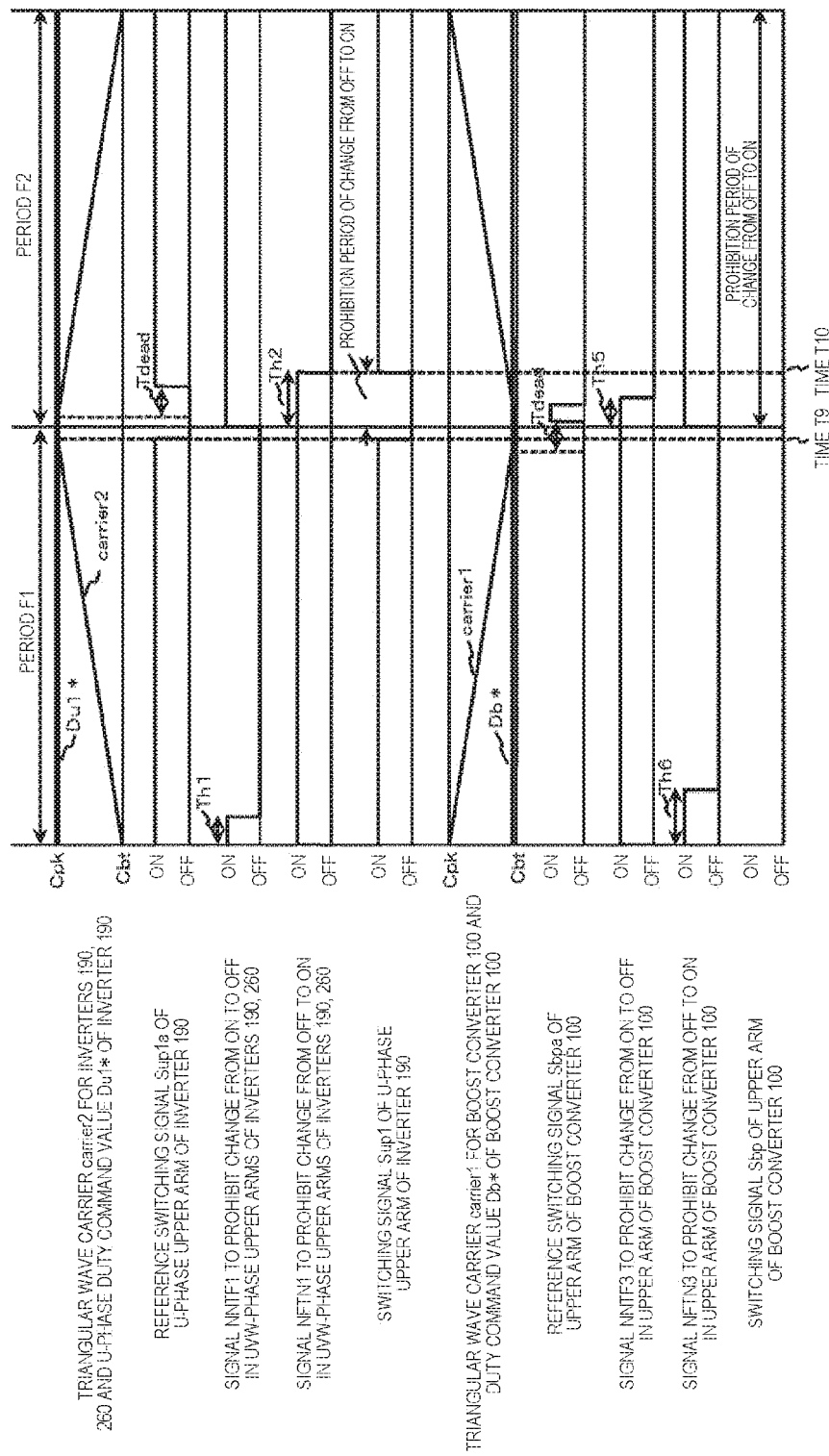
FIG. 26 is a diagram illustrating a second example of waveforms of a switching signal Sup1 of a U-phase upper arm of an inverter and a switching signal Sbp of an upper arm of a boost converter.

FIG. 26 is a diagram illustrating an example of waveforms of the switching signal Sup1 of the U-phase upper arm of the inverter 190 and the switching signal Sbp of the upper arm of the boost converter 100, different from FIG. 24. In FIG. 26, the U-phase duty command value Du1* of the inverter 190 is a value approaching the predetermined peak value Cpk and the duty command value Db* of the boost converter 100 is a value approaching the predetermined bottom value Cbt.

Because the waveforms of the reference switching signals Sup1a and Sbpa and the waveforms of the change prohibition signals NNTF1, NFTN1, NNTF3, and NFTN3 are as described in FIG. 24, description thereof is omitted herein.

Here, the waveform of the switching signal Sup1 will be described. It is known that timing where the reference switching signal Sup1a changes from ON to OFF and timing where the reference switching signal Sup1a changes from ON to OFF when focusing on the change prohibition signal NNTF1 are a period where the change prohibition signal NNTF1 is turned off. Therefore, timing where the switching signal Sup1 changes from ON to OFF becomes the same timing as the timing where the reference switching signal Sup1a changes from ON to OFF and changes at a time T9. In addition, it is known that timing where the reference switching signal Sup1a changes from OFF to ON and timing where the reference switching signal Sup1a changes from OFF to ON when focusing on the change prohibition signal NFTN1 are a period where the change prohibition signal NFTN1 is turned on. Therefore, because the change, from OFF to ON in the switching signal Sup1 is prohibited during a period where the change prohibition signal NFTN1 is turned on, timing where the switching signal Sup1 changes from OFF to ON is delayed as compared with the timing where the reference switching signal Sup1a changes from OFF to ON and changes at a time T10 when the change prohibition signal NFTN1 is turned off.

The waveform of the switching signal Sbp of the upper arm of the boost converter 100 will be described. It is known that timing where the reference switching signal Sbpa changes from OFF to ON and timing where the reference switching signal Sbpa changes from OFF to ON when focusing on the change prohibition signal NNTF3 are a period where the change prohibition signal NFTN3 is turned on. Therefore, the change from OFF to ON in the switching signal Sbp is prohibited and the switching signal becomes a signal maintaining OFF. In addition, timing where the reference switching signal Sbpa changes from ON to OFF and timing where the reference switching signal Sbpa changes from ON to OFF when focusing on the change prohibition signal NFTN3 are a period where the change prohibition signal NNTF3 is tuned on. However, because the switching signal Sbp before one operation cycle is turned off, the switching signal Sbp maintains OFF, regardless of the reference switching signal Sbpa and the change prohibition signal NNTF3.

As described above, the timing where the switching signal Sup1 of the inverter changes from ON to OFF is the time T9 of a period F1 and the switching signal Sbp of the boost converter is a signal maintaining OFF. In addition, the timing where the switching signal Sup1 of the inverter changes from OFF to ON is the time T10 of a period F2 and the switching signal Sbp of the boost converter is a signal maintaining OFF. That is, it is known that a simultaneous change from OFF to ON and a simultaneous change from ON to OFF in the switching signal Sup1 of the inverter and the switching signal Sbp of the boost converter can be avoided from being generated.

In addition, when focusing on the timing where the reference switching signal Sup1a of the inverter 190 changes from ON to OFF and the timing where the reference switching signal Sbpa of the boost converter changes from ON to OFF, the timing where the reference switching signal Sbpa of the boost converter changes from ON to OFF is delayed slightly as compared with the timing where the reference switching signal Sup1a of the inverter changes from ON to OFF and a simultaneous change from ON to OFF is not generated. However, because the timing where the reference switching signal Sup1a of the inverter changes from ON to OFF and the timing where the reference switching signal Sbpa of the boost converter changes from ON to OFF significantly approach each other, the switching element 80 of the upper arm of the boost converter 100 may start to be turned off before the switching element 130 of the U-phase upper arm of the inverter 190 is completely turned off and surge voltages may be superposed.

In addition, when focusing on the timing where the reference switching signal Sup1a of the inverter 190 changes from OFF to ON and the timing where the reference switching signal Sbpa of the boost converter 100 changes from OFF to ON, the timing where the reference switching signal Sup1a of the inverter 190 changes from OFF to ON is delayed slightly as compared with the timing where the reference switching signal Sbpa of the boost converter 100 changes from OFF to ON and a simultaneous change from OFF to ON is not generated. However, because the timing where the reference switching signal Sup1a of the inverter changes from OFF to ON and the timing where the reference switching signal Sbpa of the boost converter changes from OFF to ON significantly approach each other, the switching element 130 of the inverter may start to be turned on before the switching element 80 of the boost converter is completely turned on and surge voltages may be superposed.

In the present invention, in the above case, ON of the switching signal of the upper arm turned on for only a short time is prohibited and OFF is maintained, so that the timing where the switching signal Sup1 of the U-phase upper arm of the inverter 190 and the switching signal Sbp of the upper arm of the boost converter 100 change from OFF to ON and the timing where the switching signal Sup1 and the switching signal Sbp change from ON to OFF are avoided from approaching each other. Here, the switching signal Sup1 of the U-phase upper arm of the inverter 190 and the switching signal Sbp of the upper arm of the boost converter 100 have been described. However, even in the switching signals Svp1 and Swp1 of the VW-phase upper arms of the inverter 190 and the switching signal Sbp of the upper arm of the boost converter 100, change timing from ON to OFF and change timing from ON to OFF can be avoided from approaching each other. In addition, even in the switching signals Sup1, Svp2, and Swp2 of the UVW-phase upper arms of the inverter 260 and the switching signal Sbp of the upper arm of the boost converter 100, change timing from ON to OFF and change timing from OFF to ON can be avoided from approaching each other.

Figure 27:
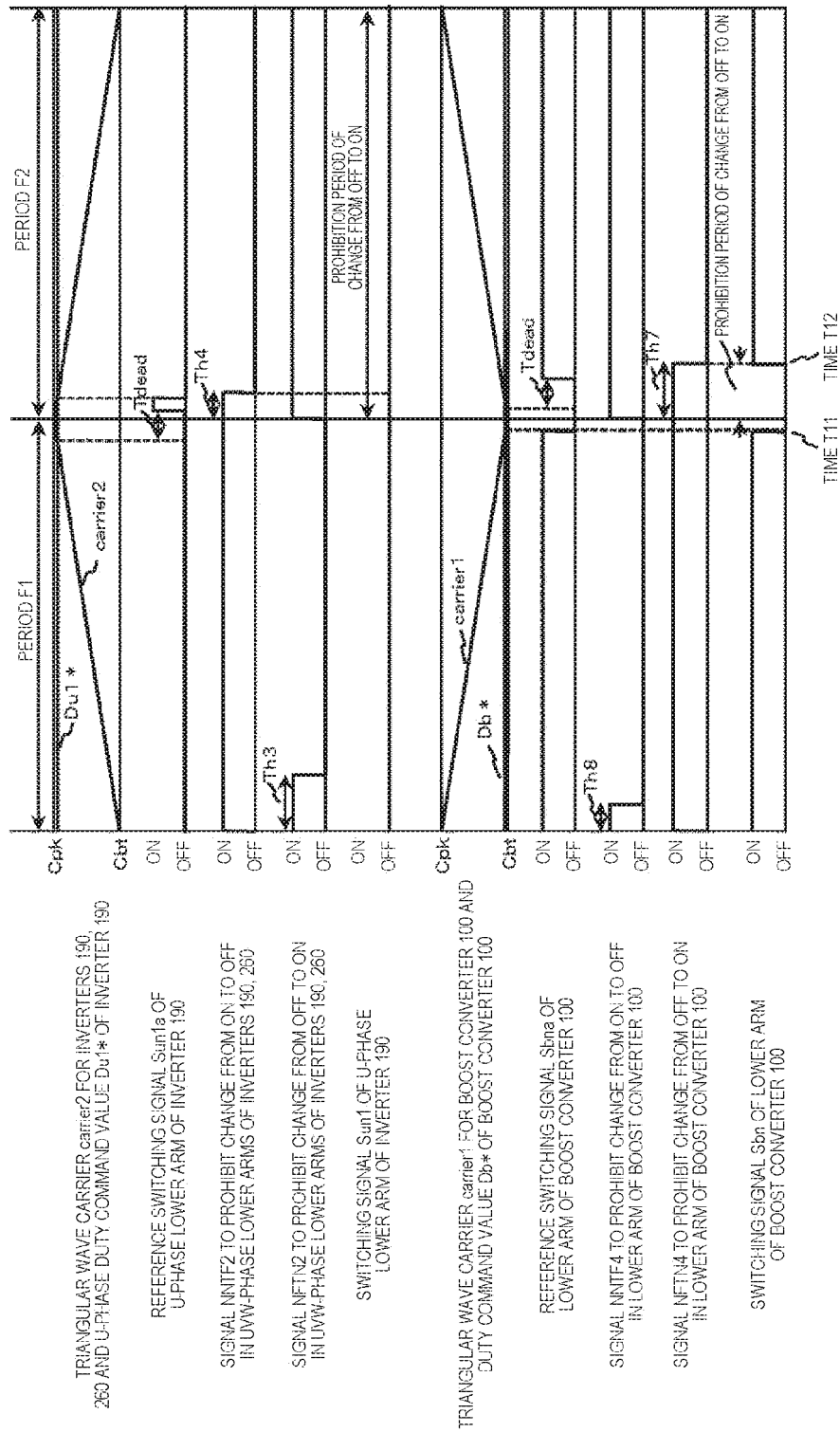
FIG. 27 is a diagram illustrating a second example of waveforms of a switching signal Sun1 of a U-phase lower arm of an inverter and a switching signal Sbn of a lower arm of a boost converter.

FIG. 27 is a diagram illustrating an example of waveforms of the switching signal Sun1 of the U-phase lower arm of the inverter 190 and the switching signal Sbn of the lower arm of the boost converter 100, different from FIG. 25. Similar to FIG. 26, in FIG. 27, the U-phase duty command value Du1* of the inverter 190 is a value approaching the predetermined peak value Cpk and the duty command value Db* of the boost converter 100 is a value approaching the predetermined bottom value Cbt.

The waveform of the switching signal Sun1 of the U-phase lower arm of the Inverter 190 will be described. First, it is known that timing where the reference switching signal Sun1a of the U-phase lower arm of the inverter 190 changes from OFF to ON and timing where the reference switching signal Sun1a of the U-phase lower arm of the inverter 190 changes from OFF to ON when focusing on the signal NFTN2 to prohibit the change from OFF to ON in the UVW-phase lower arms of the inverters 190 and 260 are a period where the signal NFTN2 to prohibit the change from OFF to ON in the UVW-phase lower arms of the inverters 190 and 260 is turned on. Therefore, a change from OFF to ON in the switching signal Sun1 of the U-phase lower arm of the inverter 190 is prohibited and the switching signal becomes a signal maintaining OFF.

Timing where the reference switching signal Sun1a of the U-phase lower arm of the inverter 190 changes from ON to OFF and timing where the reference switching signal Sun1a of the U-phase lower arm of the inverter 190 changes from ON to OFF when focusing on the signal NNTF2 to prohibit the change from ON to OFF in the UVW-phase lower arms of the inverters 190 and 260 are a period where the signal NNTF2 to prohibit the change from ON to OFF in the UVW-phase lower arms of the inverters 190 and 260 is turned on. However, because the switching signal Sun1 of the U-phase lower arm of the inverter 190 before one operation cycle is turned off, the switching signal Sun1 of the U-phase lower arm of the inverter 190 maintains OFF, regardless of the reference switching signal Sun1a of the U-phase lower arm of the inverter 190 and the signal NNTF2 to prohibit the change from ON to OFF in the UVW-phase lower arms of the inverters 190 and 260.

The waveform of the switching signal Sbn of the lower arm of the boost converter 100 will be described. First, it is known that, timing where the reference switching signal Sbna of the lower arm of the boost converter 100 changes from ON to OFF and timing where the reference switching signal Sbna of the lower arm of the boost converter 100 changes from ON to OFF when focusing on the signal NNTF4 to prohibit the change from ON to OFF in the lower arm of the boost converter 100 are a period where the signal NNTF4 to prohibit the change from ON to OFF in the lower arm of the boost converter 100 is turned off. Therefore, the timing where the switching signal Sbn of the lower arm of the boost converter 100 changes from ON to OFF becomes the same timing as the timing where the reference switching signal Sbna of the lower arm of the boost converter 100 changes from ON to OFF and changes at a time T11.

It is known that timing where the reference switching signal Sbna of the lower arm of the boost converter 100 changes from OFF to ON and timing where the reference switching signal Sbna of the lower arm of the boost converter 100 changes from OFF to ON when focusing on the signal NFTN4 to prohibit the change from OFF to ON in the lower arm of the boost converter 100 are a period where the signal NFTN4 to prohibit the change from OFF to ON in the lower arm of the boost converter 100 is turned on. Therefore, because the change from OFF to ON in the switching signal Sun1 of the lower arm of the boost converter 100 is prohibited in a period where the signal NFTN4 to prohibit the change from OFF to ON in the lower arm of the boost converter 100 is turned on, the timing where the switching signal Sun1 of the lower arm of the boost converter 100 changes from OFF to ON is delayed as compared with the timing where the reference switching signal Sun1a of the lower arm of the boost converter 100 changes from OFF to ON and changes at a time T12 when the signal NFTN4 to prohibit the change from OFF to ON in the lower arm of the boost converter 100 is turned off.

As described above, the switching signal Sun1 of the U-phase lower arm of the inverter 190 is a signal maintaining OFF and the timing where the switching signal Sbn of the lower arm of the boost converter 100 changes from ON to OFF is a time T11 of a period F1 where the triangular wave carrier carrier1 for the boost converter 100 falls from the predetermined peak value Cpk to the predetermined bottom value Cbt. In addition, the switching signal Sun1 of the U-phase lower arm of the inverter 190 is a signal maintaining OFF and the timing where the switching signal Sbn of the lower arm of the boost converter 100 changes from OFF to ON is a time T12 of a period F2 where the triangular wave carrier carrier1 for the boost converter 100 rises from the predetermined bottom value Cbt to the predetermined peak value Cpk.

That is, it is known that a simultaneous change from OFF to ON and a simultaneous change from ON to OFF in the switching signal Sun1 of the U-phase lower arm of the inverter 190 and the switching signal Sbn of the lower arm of the boost converter 100 can be avoided from being generated. In addition, it is known that when focusing on the timing where the reference switching signal Sun1a of the U-phase lower arm of the inverter 190 changes from ON to OFF and the timing where the reference switching signal Sbna of the lower arm of the boost converter 100 changes from ON to OFF, the timing where the reference switching signal Sun1a of the U-phase lower arm of the inverter 190 changes from ON to OFF is delayed slightly as compared with the timing where the reference switching signal Sbna of the lower arm of the boost converter 100 changes from ON to OFF and a simultaneous change from ON to OFF is not generated.

However, because the timing where the reference switching signal Sun1a of the U-phase lower arm of the inverter 190 changes from ON to OFF and the timing where the reference switching signal Sbna of the lower arm of the boost converter 100 changes from ON to OFF significantly approach each other, the switching element 90 of the lower arm of the boost converter 100 may start to be turned off before the switching element 130 of the U-phase lower arm of the inverter 190 is completely turned off and surge voltages may be superposed. In addition, when focusing on the timing where the reference switching signal Sun1a of the U-phase lower arm of the inverter 190 changes from OFF to ON and the timing where the reference switching signal Sbna of the lower arm of the boost converter 100 changes from OFF to ON, the timing where the reference switching signal Sbna of the lower arm of the boost converter 100 changes from OFF to ON is delayed slightly as compared with the timing where the reference switching signal Sun1a of the U-phase lower arm of the inverter 190 changes from OFF to ON and a simultaneous change from OFF to ON is not generated. However, because the timing where the reference switching signal Sun1a of the U-phase lower arm of the inverter 190 changes from OFF to ON and the timing where the reference switching signal Sbna of the lower arm of the boost converter 100 changes from OFF to ON significantly approach each other, the switching element 90 of the lower arm of the boost converter 100 may start to be turned on before the switching element 130 of the U-phase lower arm of the inverter 190 is completely turned on and surge voltages may be superposed. In the present invention, in the above case, ON of the switching signal of the lower arm turned on for only a short time is prohibited and OFF is maintained, so that the timing where the switching signal Sun1 of the U-phase lower arm of the inverter 190 and the switching signal Sbn of the lower arm of the boost converter 100 change from OFF to ON and the timing where the switching signal Sun1 and the switching signal Sbn change from ON to OFF are avoided from approaching each other.

Here, the switching signal Sun1 of the U-phase lower arm of the inverter 190 and the switching signal Sbn of the lower arm of the boost converter 100 have been described. However, even in the switching signals Svn1 and Swn1 of the VW-phase lower arms of the inverter 190 and the switching signal Sbn of the lower arm of the boost converter 100, change timing from ON to OFF and change timing from ON to OFF can be avoided from approaching each other. In addition, even in the switching signals Sun2, Svn2, and Swn2 of the UVW-phase lower arms of the inverter 260 and the switching signal Sbn of the lower arm of the boost converter 100, change timing from ON to OFF and change timing from OFF to ON can be avoided from approaching each other.

Figure 28:
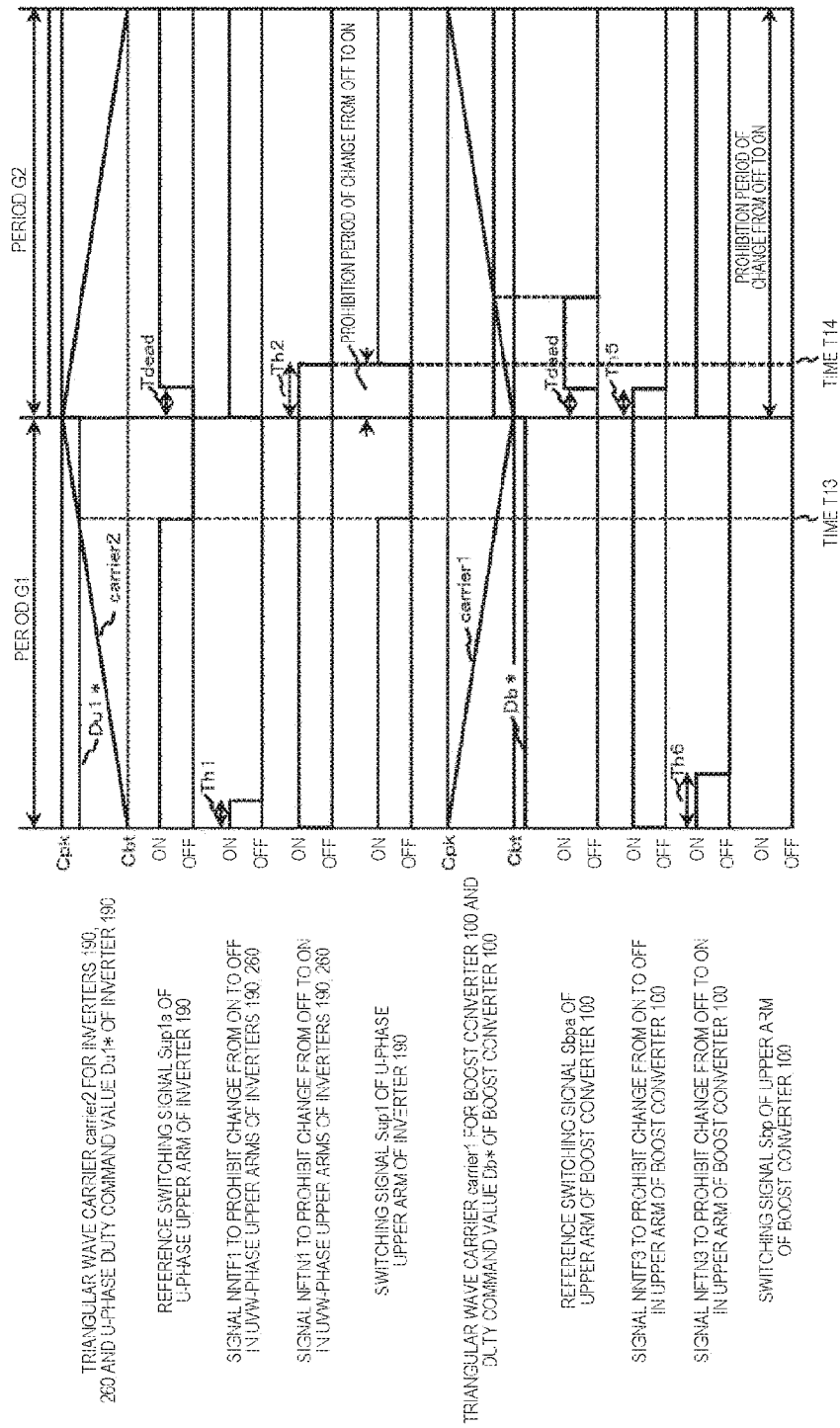
FIG. 28 is a diagram illustrating a third example of waveforms of a switching signal Sup1 of a U-phase upper arm of an inverter and a switching signal Sbp of an upper arm of a boost converter.

FIG. 28 is a diagram illustrating an example of waveforms of the switching signal Sup1 of the U-phase upper arm of the inverter 190 and the switching signal Sbp of the upper arm of the boost converter 100, different from FIGS. 24 and 25.

In FIG. 28, the U-phase duty command value Du1* of the inverter 190 changes from a value smaller than the predetermined peak value Cpk to a value larger than the predetermined peak value at the time of the peak of the triangular wave carrier carrier2 for the inverters 190 and 260 and the duty command value Db* of the boost converter 100 changes from a value smaller than the predetermined bottom value to a value larger than the predetermined bottom value at the time of the bottom of the triangular wave carrier carrier1 for the boost converter 100.

The waveform of the switching signal Sup1 of the U-phase upper arm of the inverter 190 will be described. First, it is known that timing where the reference switching signal Sup1a of the U-phase upper arm of the inverter 190 changes from ON to OFF and timing where the reference switching signal Sup1a of the U-phase upper arm of the inverter 190 changes from ON to OFF when focusing on the signal NNTF1 to prohibit the change from ON to OFF in the UVW-phase upper arms of the inverters 190 and 260 are a period where the signal NNTF1 to prohibit the change from ON to OFF in the UVW-phase upper arms of the inverters 190 and 260 is turned off. Therefore, the timing where the switching signal Sup1 of the U-phase upper arm of the inverter 190 changes from ON to OFF becomes the same timing as the timing where the reference switching signal Sup1a of the U-phase upper arm of the inverter 190 changes from ON to OFF and changes at a time T13.

It is known that timing where the reference switching signal Sup1a of the U-phase upper arm of the inverter 190 changes from OFF to ON and timing where the reference switching signal Sup1a of the U-phase upper arm of the inverter 190 changes from OFF to ON when focusing on the signal NFTN1 to prohibit the change from OFF to ON in the UVW-phase upper arms of the inverters 190 and 260 are a period where the signal NFTN1 to prohibit the change from OFF to ON in the UVW-phase upper arms of the inverters 190 and 260 is turned on. Therefore, because the change from OFF to ON in the switching signal Sup1 of the U-phase upper arm of the inverter 190 is prohibited in a period where the signal NFTN1 to prohibit the change from OFF to ON in the UVW-phase upper arms of the inverters 190 and 260 is turned on, the timing where the switching signal Sup1 of the U-phase upper arm of the inverter 190 changes from OFF to ON is delayed as compared with the timing where the reference switching signal Sup1a of the U-phase upper arm of the inverter 190 changes from OFF to ON and changes at a time T14 when the signal NFTN1 to prohibit the change from OFF to ON in the UVW-phase upper arms of the inverters 190 and 260 is turned off.

The waveform of the switching signal Sbp of the upper arm of the boost converter 100 will be described. First, it is known that timing where the reference switching signal Sbpa of the upper arm of the boost converter 100 changes from OFF to ON and timing where the reference switching signal Sbpa of the upper arm of the boost converter 100 changes from OFF to ON when focusing on the signal NFTN3 to prohibit the change from OFF to ON in the upper arm of the boost converter 100 are a period where the signal NFTN3 to prohibit the change from OFF to ON in the upper arm of the boost converter 100 is turned on. Therefore, the change from OFF to ON in the switching signal Sbp of the upper arm of the boost converter 100 is prohibited and the switching signal becomes a signal maintaining OFF.

Timing where the reference switching signal Sbpa of the upper arm of the boost converter 100 changes from ON to OFF and timing where the reference switching signal Sbpa of the upper arm of the boost converter 100 changes from ON to OFF when focusing on the signal NNTF3 to prohibit the change from ON to OFF in the upper arm of the boost converter 100 are a period where the signal NNTF3 to prohibit the change from ON to OFF in the upper arm of the boost converter 100 is turned off. However, because the switching signal Sbp of the upper arm of the boost converter 100 before one operation cycle is turned off, the switching signal Sbp of the upper arm of the boost converter 100 maintains OFF, regardless of the reference switching signal Sbpa of the upper arm of the boost converter 100 and the signal NNTF3 to prohibit the change from ON to OFF in the upper arm of the boost converter 100.

As described above, the timing where the switching signal Sup1 of the U-phase upper arm of the inverter 190 changes from ON to OFF is a time T13 of a period G1 where the triangular wave carrier carrier2 for the inverters 190 and 260 rises from the predetermined bottom value Cbt to the predetermined peak, value Cpk and the switching signal Sbp of the upper arm of the boost converter 100 becomes a signal maintaining OFF. In addition, the timing where the switching signal Sup1 of the U-phase upper arm of the inverter 190 changes from OFF to ON is a time T14 of a period G2 where the triangular wave carrier carrier2 for the inverters 190 and 260 falls from the predetermined peak value Cpk to the predetermined bottom value Cbt and the switching signal Sbp of the upper arm of the boost converter 100 becomes a signal maintaining OFF.

That is, it is known that a simultaneous change from OFF to ON and a simultaneous change from ON to OFF in the switching signal Sup1 of the U-phase upper arm of the inverter 190 and the switching signal Sbp of the upper arm of the boost converter 100 can be avoided, from being generated. In addition, when focusing on the reference switching signal Sup1a of the U-phase upper arm of the inverter 190 and the reference switching signal Sbpa of the upper arm of the boost converter 100, the reference switching signal Sup1a of the U-phase upper arm of the inverter 190 and the reference switching signal Sbpa of the upper arm of the boost converter 100 change from OFF to ON at the same time and the surge voltage increases in normal control. Here, the switching signal Sup1 of the U-phase upper arm of the inverter 190 and the switching signal Sbp of the upper arm of the boost converter 100 have been described. However, even in the switching signals Svp1 and Swp1 of the VW-phase upper arms of the inverter 190 and the switching signal Sbp of the upper arm of the boost converter 100, a simultaneous change from OFF to ON and a simultaneous change from ON to OFF can be avoided from being generated. In addition, even in the switching signals Sup2, Svp2, and Swp2 of the UVW-phase upper arms of the inverter 260 and the switching signal Sbp of the upper arm of the boost converter 100, a simultaneous change from OFF to ON and a simultaneous change from ON to OFF can be avoided from being generated.

FIG. 29 is a diagram illustrating an example of waveforms of the switching signal Sun1 of the U-phase lower arm of the inverter 190 and the switching signal Sbn of the lower arm of the boost converter 100, different from FIGS. 25 and 27. Similar to FIG. 28, in FIG. 29, the U-phase duty command value Du1* of the inverter 190 chances from a value smaller than the predetermined peak value Cpk to a value larger than the predetermined peak value at the time of the peak of the triangular wave carrier carrier2 for the inverters 190 and 260 and the duty command value Db* of the boost converter 100 changes from a value smaller than the predetermined bottom, value to a value larger than the predetermined bottom value at the time of the bottom, of the triangular wave carrier carrier1 for the boost converter 100.

The waveform of the switching signal Sun1 of the U-phase lower arm of the inverter 190 will be described. First, it is known that timing where the reference switching signal Sun1a of the U-phase lower arm of the inverter 190 changes from OFF to ON and timing where the reference switching signal Sun1a of the U-phase lower arm of the inverter 190 changes from OFF to ON when focusing on the signal NFTN2 to prohibit the change from OFF to ON in the UVW-phase lower arms of the inverters 190 and 260 are a period where the signal NFTN2 to prohibit the change from OFF to ON in the UVW-phase lower arms of the inverters 190 and 260 is turned off. Therefore, the timing where the switching signal Sun of the U-phase lower arm of the inverter 190 changes from OFF to ON becomes the same timing as the timing where the reference switching signal Sun1a of the U-phase lower arm of the inverter 190 changes from OFF to ON and changes at a time T15.

It is known that timing where the reference switching signal Sun1a of the U-phase lower arm of the inverter 190 changes from ON to OFF and timing where the reference switching signal Sun1a of the U-phase lower arm of the inverter 190 changes from ON to OFF when focusing on the signal NNTF2 to prohibit the change from ON to OFF in the UVW-phase lower arms of the inverters 190 and 260 are a period where the signal NNTF2 to prohibit the change from ON to OFF in the UVW-phase lower arms of the inverters 190 and 260 is turned on. Therefore, because the change from ON to OFF in the switching signal Sun1 of the U-phase lower arm of the inverter 190 is prohibited in a period where the signal NNTF2 to prohibit the change from ON to OFF in the UVW-phase lower arms of the inverters 190 and 260 is turned on, the timing where the switching signal Sun1 of the U-phase lower arm of the inverter 190 changes from ON to OFF is delayed as compared with the timing where the reference switching signal Sun1a of the U-phase lower arm of the inverter 190 changes from ON to OFF and changes at a time 16 when the signal NNTF2 to prohibit the change from ON to OFF in the UVW-phase lower arms of the inverters 190 and 260 is turned off.

The waveform of the switching signal Sbn of the lower arm of the boost converter 100 will be described. First, it is known that timing where the reference switching signal Sbna of the lower arm of the boost converter 100 changes from ON to OFF and timing where the reference switching signal Sbna of the lower arm of the boost converter 100 changes from ON to OFF when focusing on the signal NNTF4 to prohibit the change from ON to OFF in the lower arm of the boost converter 100 are a period where the signal NNTF4 to prohibit the change from ON to OFF in the lower arm of the boost converter 100 is turned on. Therefore, the change from ON to OFF in the switching signal Sbn of the lower arm of the boost converter 100 is prohibited and the switching signal becomes a signal maintaining ON. In addition, timing where the reference switching signal Sbna of the lower arm of the boost converter 100 changes from OFF to ON and timing where the reference switching signal Sbna of the lower arm of the boost converter 100 changes from OFF to ON when focusing on the signal. NFTN4 to prohibit the change from OFF to ON in the lower arm of the boost converter 100 are a period where the signal NFTN4 to prohibit the change from OFF to ON in the lower arm of the boost converter 100 is turned off. However, because the switching signal Sbn of the lower arm of the boost converter 100 before one operation cycle is turned on, the switching signal Sbn of the lower arm of the boost converter 100 maintains ON, regardless of the reference switching signal Sbna of the lower arm of the boost converter 100 and the signal NFTN4 to prohibit the change from OFF to ON in the lower arm of the boost converter 100.

As described above, the timing where the switching signal Sun1 of the U-phase lower arm of the inverter 190 changes from OFF to ON is a time T15 of the period G1 where the triangular wave carrier carrier2 for the inverters 190 and 260 rises from the predetermined bottom value Cbt to the predetermined peak value Cpk and the switching signal Sbn of the lower arm of the boost converter 100 is a signal maintaining ON. In addition, the timing where the switching signal Sun1 of the U-phase lower arm of the inverter 190 changes from ON to OFF is a time T16 of the period G2 where the triangular wave carrier carrier2 for the inverters 190 and 260 falls from the predetermined peak value Cpk to the predetermined bottom value Cbt and the switching signal Sbn of the lower arm of the boost converter 100 is a signal maintaining ON.

That is, it is known that a simultaneous change from OFF to ON and a simultaneous change from ON to OFF in the switching signal Sun1 of the U-phase lower arm of the inverter 190 and the switching signal Sbn of the lower arm of the boost converter 100 can be avoided from being generated. In addition, when focusing on the reference switching signal Sun1a of the U-phase lower arm of the inverter 190 and the reference switching signal Sbna of the lower arm of the boost converter 100, the reference switching signal Sun1a of the U-phase lower arm of the inverter 190 and the reference switching signal Sbna of the lower arm of the boost converter 100 change from ON to OFF at the same time and the surge voltage increases in normal control. Here, the switching signal Sun1 of the U-phase lower arm of the inverter 190 and the switching signal Sbn of the lower arm of the boost converter 100 have been described. However, even in the switching signals Svn1 and Swn1 of the VW-phase lower arms of the inverter 190 and the switching signal Sbn of the lower arm of the boost converter 100, a simultaneous change from OFF to ON and a simultaneous change from ON to OFF can be avoided from being generated. In addition, even in the switching signals Sun2, Svn2, and Swn2 of the UVW-phase lower arms of the inverter 260 and the switching signal Sbn of the lower arm of the boost converter 100, a simultaneous change from OFF to ON and a simultaneous change from ON to OFF can be avoided from being generated.

REFERENCE SIGNS LIST 1 battery
10 chassis ground
20 Y capacitor
30 Y capacitor
40 filter capacitor
110 smoothing capacitor
70 reactor
50 voltage sensor
120 voltage sensor
60 current sensor
270 current sensor
280 current sensor
310 angle detector
350 angle detector
100 boost converter
80 switching element of upper arm of boost converter 100
90 switching element of lower arm of boost converter 100
440 inter-P-Q voltage command generation unit of boost converter 100
450 duty command generation unit of boost converter 100
580 carrier generation unit for boost converter 100
590 carrier frequency setting unit for boost converter 100
620 duty command operation unit of boost converter 100
630 duty command update unit of boost converter 100
650 comparison unit for boost converter 100
670 switching change prohibition processing unit for boost converter 100
190 inverter
260 inverter
130 switching element of U-phase upper arm of inverter 190
140 switching element of U-phase lower arm of inverter 190
150 switching element of V-phase upper arm of inverter 190
160 switching element of V-phase lower arm of inverter 190
170 switching element of W-phase upper arm of inverter 190
180 switching element of W-phase lower arm of inverter 190
200 switching element of U-phase upper arm of inverter 260
210 switching element of U-phase lower arm of inverter 260
220 switching element of V-phase upper arm of inverter 260
230 switching element of V-phase lower arm of inverter 260
240 switching element of W-phase upper arm of inverter 260
250 switching element of W-phase lower arm of inverter 260
470 UVW-phase duty command generation unit of inverters 190 and 260
480 UVW-phase voltage command generation unit of inverters 190 and 260
560 carrier frequency setting unit for inverters 190 and 260
570 carrier generation unit for inverters 190 and 260
600 UVW-phase duty command generation unit of inverters 190 and 260
610 UVW-phase duty command update unit of inverters 190 and 260
640 comparison unit for inverters 190 and 260
660 switching change prohibition processing unit for inverters 190 and 260
290 three-phase winding wound around stator of motor generator 320
330 three-phase winding wound around stator of motor generator 360
300 rotor of motor generator 320
340 rotor of motor generator 360
320 motor generator
360 motor generator
370 motor generator shaft of motor generator 320
375 motor generator shaft of motor generator 360
460 switching signal generation unit
500 dq-axis current command generation unit
520 carrier generation unit
490 UVW-phase dq-axis conversion unit
510 rotation speed operation unit
530 control device
540 gate drive circuit
550 phase current maximum value operation unit
430 drive wheel of vehicle
385 engine
390 crank shaft
400 propeller shaft
420 drive shaft
380 transmission
410 differential gear
iL current value flowing to reactor 70
θ1 magnetic pole position of rotor 300 of motor generator 320

θ2 magnetic pole position of rotor 340 of motor generator 360
ω1 rotation speed of rotor 300 of motor generator 320
ω2 rotation speed of rotor 340 of motor generator 360
α1 up-down value
α2 up-down value
Cbt predetermined bottom value
Cpk predetermined peak value
Vth predetermined voltage
vcs voltage value of both ends of smoothing capacitor 110
Db* duty command value of boost converter 100
Sbp switching signal of upper arm of boost converter 100
Sbn switching signal of lower arm of boost converter 100
id1 d-axis current value of motor generator 320
iq1 q-axis current value of motor generator 320
id2 d-axis current value of motor generator 360
iq2 q-axis current value of motor generator 360
vcin voltage value of both ends of filter capacitor 40
Tth1 predetermined time
Tth2 predetermined time
Tth3 predetermined time
Tth4 predetermined time
Tth5 predetermined time
Tth6 predetermined time
Tth7 predetermined time
Tth8 predetermined time
Cud1 carrier up-down
Cud2 carrier up-down
Cud3 carrier up-down
Cud4 carrier up-down
Sbpa reference switching signal of upper arm of boost converter 100
Sbna reference switching signal of lower arm of boost converter 100
Sup1 switching signal of U-phase upper arm of inverter 190
Sun1 switching signal of U-phase lower arm of inverter 190
Svp1 switching signal of V-phase upper arm of inverter 190
Svn1 switching signal of V-phase lower arm of inverter 190
Swp1 switching signal of W-phase upper arm of inverter 190
Swn1 switching signal of W-phase lower arm of inverter 190
Sup2 switching signal of U-phase upper arm of inverter 260
Sun2 switching signal of U-phase lower arm of inverter 260
Svp2 switching signal of V-phase upper arm of inverter 260
Svn2 switching signal of V-phase lower arm of inverter 260
Swp2 switching signal of W-phase upper arm of inverter 260
Swn2 switching signal of W-phase lower arm of inverter 260
iud1 current value flowing to U-phase winding of motor generator 320
ivd1 current value flowing to V-phase winding of motor generator 320
iwd1 current value flowing to W-phase winding of motor generator 320
iud2 current value flowing to U-phase winding of motor generator 360
ivd2 current value flowing to V-phase winding of motor generator 360
iwd2 current value flowing to W-phase winding of motor generator 360
id1* d-axis current command value of motor generator 320
iq1* q-axis current command value of motor generator 320
id2* d-axis current command value of motor generator 360
iq2* q-axis current command value of motor generator 360
vcs* output voltage command of boost converter 100
vpq* inter-P-Q voltage command value
vu1* U-phase voltage command value of inverter 190
vv1* V-phase voltage command value of inverter 190
vw1* W-phase voltage command value of inverter 190
vu2* U-phase voltage command value of inverter 260
vv2* V-phase voltage command value of inverter 260
vw2* W-phase voltage command value of inverter 260
Du1* U-phase duty command value of inverter 190
Dv1* V-phase duty command value of inverter 190
Dw1* W-phase duty command value of inverter 190
Du2* U-phase duty command value of inverter 260
Dv2* V-phase duty command value of inverter 260
Dw2* W-phase duty command value of inverter 260
Tdead predetermined dead time
Tcal1 operation cycle of carrier generation unit 520
Tcal2 operation cycle of switching signal generation unit 460
Trq1* torque command of motor generator 320
Trq2* torque command of motor generator 360
Sup1a reference switching signal of U-phase upper arm of inverter 190
Sun1a reference switching signal of U-phase lower arm of inverter 190
Svp1a reference switching signal of V-phase upper arm of inverter 190
Svn1a reference switching signal of V-phase lower arm of inverter 190
Swp1a reference switching signal of W-phase upper arm of inverter 190
Swn1a reference switching signal of W-phase lower arm of inverter 190
Sup2a reference switching signal of U-phase upper arm of inverter 260
Sun2a reference switching signal of U-phase lower arm of inverter 260
Svp2a reference switching signal of V-phase upper arm of inverter 260
Svn2a reference switching signal of V-phase lower arm of inverter 260
Swp2a reference switching signal of W-phase upper arm of inverter 260
Swn2a reference switching signal of W-phase lower arm of inverter 260
NFTN1 signal to prohibit change from OFF to ON in upper arms of inverters 190 and 260
NNTF1 signal to prohibit change from ON to OFF in upper arms of inverters 190 and 260
NFTN2 signal to prohibit change from OFF to ON in lower arms of inverters 190 and 260
NNTF2 signal to prohibit change from ON to OFF in lower arms of inverters 190 and 260
NFTN3 signal to prohibit change from OFF to ON in upper arm of boost converter 100
NNTF3 signal to prohibit change from ON to OFF in upper arm of boost converter 100
NFTN4 signal to prohibit change from OFF to ON in lower arm of boost converter 100
NNTF4 signal to prohibit change from ON to OFF in lower arm of boost converter 100
Dbcal duty command operation value of boost converter 100
Du1cal U-phase duty command operation value of inverter 190
Dv1cal V-phase duty command operation value of inverter 190
Dw1cal W-phase duty command operation value of inverter 190
Du2cal U-phase duty command operation value of inverter 260
Dv2cal V-phase duty command operation value of inverter 260

Dw2cal W-phase duty command operation value of inverter 260
Vworst worst value of voltage value applied to switching element
iphmax1 maximum value of phase current of motor generator 320
iphmax2 maximum value of phase current of motor generator 360
Tcount1 time count
Tcount2 time count
Tcount3 time count
Tcount4 time count
Tcount5 time count
Tcount6 time count
Tcount7 time count
Tcount8 time count
Tcount9 time count
Tcount10 time count
Tcount11 time count
Tcount12 time count
carrier1 triangular wave carrier for boost converter 100
carrier2 triangular wave carrier for inverters 190 and 260
fcarrier1 carrier frequency for boost converter 100
fcarrier2 carrier frequency for inverters 190 and 260
Tcarrier1 cycle of triangular wave carrier carrier1
Tcarrier2 cycle of triangular wave carrier carrier2

The invention claimed is:

1. A power conversion system, comprising:
a boost converter which boosts a direct-current voltage;
an inverter which converts an output voltage of the boost converter into an alternating-current voltage; and
a control device which controls switching of the boost converter and the inverter;
wherein the control device has a switching signal generation unit which generates a first switching signal to control the switching of the boost converter and a second switching signal to control a switching operation of the inverter,
the switching signal generation unit generates the first switching signal and the second switching signal, such that the first switching signal is turned on and the second switching signal is turned off, during a first period to be a period of a half of a carrier cycle, and
the switching signal generation unit generates the first switching signal and the second switching signal, such that the first switching signal is turned off and the second switching signal is turned on, during a second period to be a period of the half of the carrier cycle and to be continuous to the first period,
the power conversion system further comprising:
a carrier generation unit which generates a first carrier for the boost converter and a second carrier for the inverter,
wherein the carrier generation unit generates a carrier of a phase opposite to a phase of the first carrier as the second carrier, and
the switching signal generation unit generates the first switching signal based on the first carrier and generates the second switching signal based on the second carrier,
wherein the carrier generation unit changes the carrier frequency of the second carrier, when the first carrier is matched with a predetermined peak value or the first carrier is matched with a predetermined bottom value.

2. The power conversion system according to claim 1, wherein
the carrier generation unit calculates a worst voltage value assumed to be applied to a switching element when the boost converter and the inverter execute switching operations at the same time, and
the carrier generation unit generates the carrier of the phase opposite to the phase of the first carrier as the second carrier, when the worst voltage value is equal to or larger than a predetermined value.

3. The power conversion system according to claim 2, wherein
the carrier generation unit generates the second carrier, such that a carrier frequency of the second carrier becomes lower than a carrier frequency of the first carrier, when the worst voltage value is smaller than the predetermined value.

4. The power conversion system according to claim 1, wherein
the carrier generation unit generates the second carrier, such that the second carrier when the carrier frequency of the second carrier changes becomes the predetermined bottom value, in a case in which the carrier frequency of the second carrier changes when the first carrier is matched with the predetermined peak value, and
the carrier generation unit generates the second carrier, such that the second carrier when the carrier frequency of the second carrier changes becomes the predetermined peak value, in a case in which the carrier frequency of the second carrier changes when the first carrier is matched with the predetermined bottom value.

5. A power conversion system, comprising:
a boost converter which boosts a direct-current voltage;
an inverter which converts an output voltage of the boost converter into an alternating-current voltage; and
a control device which controls switching of the boost converter and the inverter;
wherein the control device has a switching signal generation unit which generates a first switching signal to control the switching of the boost converter and a second switching signal to control a switching operation of the inverter,
the switching signal generation unit generates the first switching signal and the second switching signal, such that the first switching signal is turned on and the second switching signal is turned off, during a first period to be a period of a half of a carrier cycle, and
the switching signal generation unit generates the first switching signal and the second switching signal, such that the first switching signal is turned off and the second switching signal is turned on, during a second period to be a period of the half of the carrier cycle and to be continuous to the first period, wherein
the switching signal generation unit has a first switching change prohibition processing unit which prohibits a change from ON to OFF in the switching operation of the boost converter or a change from OFF to ON in the switching operation of the boost converter, and
the first switching change prohibition processing unit generates the first switching signal in which a change from ON to OFF or a change from OFF to ON is prohibited during a period until a first predetermined time passes from when a waveform of the first carrier changes from a fall to a rise at the predetermined bottom value.

6. The power conversion system according to claim 5, wherein
the switching signal generation unit generates a third switching signal to control switching of a lower arm of the boost converter, based on a comparison of the first duty command value and the first carrier, and the first switching change prohibition processing unit generates the third switching signal in which a change from ON to OFF or a change from OFF to ON is prohibited during a period until a second predetermined time passes from when the waveform of the first triangular wave carrier changes from a fall to a rise at the predetermined bottom value.

7. The power conversion system according to claim 5, wherein the first switching change prohibition processing unit generates the first switching signal in which a change from ON to OFF or a change from OFF to ON is prohibited during a period until a third predetermined time passes from when the waveform of the first triangular wave carrier changes from a rise to a fall at the predetermined peak value.

8. The power conversion system according to claim 7, wherein the switching signal generation unit generates the third switching signal to control the switching of the lower arm of the boost converter, based on the comparison of the first duty command value and the first carrier, and the first switching change prohibition processing unit generates the third switching signal in which a change from ON to OFF or a change from OFF to ON is prohibited during a period until a fourth predetermined time passes from when the waveform of the first triangular wave carrier changes from a rise to a fall at the predetermined peak value.

9. A power conversion system, comprising:

a boost converter which boosts a direct-current voltage;
an inverter which converts an output voltage of the boost converter into an alternating-current voltage; and
a control device which controls switching of the boost converter and the inverter;
wherein the control device has a switching signal generation unit which generates a first switching signal to control the switching of the boost converter and a second switching signal to control a switching operation of the inverter, the switching signal generation unit generates the first switching signal and the second switching signal, such that the first switching signal is turned on and the second switching signal is turned off, during a first period to be a period of a half of a carrier cycle, and the switching signal generation unit generates the first switching signal and the second switching signal, such that the first switching signal is turned off and the second switching signal is turned on, during a second period to be a period of the half of the carrier cycle and to be continuous to the first period, wherein the switching signal generation unit has a second switching change prohibition processing unit which prohibits a change from ON to OFF in the switching operation of the inverter or a change from OFF to ON in the switching operation of the inverter, and the second switching change prohibition processing unit generates the second switching signal in which a change from ON to OFF or a change from OFF to ON is prohibited during a period until a fifth predetermined time passes from when a waveform of the second carrier changes from a fall to a rise at the predetermined bottom value.

10. The power conversion system according to claim 9, wherein the switching signal generation unit generates a fourth switching signal to control switching of a lower arm of each phase of the inverter, based on a comparison of the second duty command value and the second carrier, and the second switching change prohibition processing unit generates the fourth switching signal in which a change from ON to OFF or a change from OFF to ON is prohibited during a period until a sixth predetermined time passes from when the waveform of the second carrier changes from a fall to a rise at the predetermined bottom value.

11. The power conversion system according to claim 9, wherein the second switching change prohibition processing unit generates the second switching signal in which a change from ON to OFF or a change from OFF to ON is prohibited during a period until a seventh predetermined time passes from when the waveform of the second carrier changes from a rise to a fall at the predetermined peak value.

12. The power conversion system according to claim 11, wherein the switching signal generation unit generates the fourth switching signal to control the switching of the lower arm of each phase of the inverter, based on the comparison of the second duty command value and the second carrier, and the second switching change prohibition processing unit generates the fourth switching signal in which a change from ON to OFF or a change from OFF to ON is prohibited during a period until an eighth predetermined time passes from when the waveform of the second carrier changes from a rise to a fall at the predetermined peak value.

* * * * *